US009625711B2

United States Patent
Watanabe et al.

(10) Patent No.: US 9,625,711 B2
(45) Date of Patent: Apr. 18, 2017

(54) OPTICAL SCANNING APPARATUS AND IMAGE FORMING DEVICE

(71) Applicants: Naoto Watanabe, Kanagawa (JP); Toshiaki Tokita, Kanagawa (JP); Kohji Sakai, Tokyo (JP); Nobuaki Kubo, Tokyo (JP); Masayuki Muranaka, Kanagawa (JP)

(72) Inventors: Naoto Watanabe, Kanagawa (JP); Toshiaki Tokita, Kanagawa (JP); Kohji Sakai, Tokyo (JP); Nobuaki Kubo, Tokyo (JP); Masayuki Muranaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 643 days.

(21) Appl. No.: 13/718,514

(22) Filed: Dec. 18, 2012

(65) Prior Publication Data
US 2013/0155166 A1    Jun. 20, 2013

(30) Foreign Application Priority Data

Dec. 19, 2011  (JP) ................................ 2011-277161
Feb. 7, 2012   (JP) ................................ 2012-023572
Dec. 4, 2012   (JP) ................................ 2012-265706

(51) Int. Cl.
*G02B 26/12*     (2006.01)
*B41J 2/47*      (2006.01)

(52) U.S. Cl.
CPC ............ *G02B 26/127* (2013.01); *B41J 2/471* (2013.01); *B41J 2/473* (2013.01); *G02B 26/123* (2013.01); *G02B 26/129* (2013.01)

(58) Field of Classification Search
CPC ........... G02B 5/09; G02B 26/122; B41J 2/471
See application file for complete search history.

(56) References Cited

U.S. PATENT DOCUMENTS 5,831,758 A    11/1998  Sakai et al.
5,999,345 A    12/1999  Nakajima et al.
(Continued)

FOREIGN PATENT DOCUMENTS

CN    101131476 A    2/2008
CN    102081323 A    6/2011
(Continued)

OTHER PUBLICATIONS

Combined Chinese Office Action and Search Report issued Oct. 15, 2014 in Patent Application No. 201210555717.3 (with English language translation).
(Continued)

*Primary Examiner* — Kristal Feggins
*Assistant Examiner* — Kendrick Liu
(74) *Attorney, Agent, or Firm* — Oblon, McClelland, Maier & Neustadt, L.L.P.

(57) ABSTRACT

An optical scanning apparatus includes a light source, an optical deflector having a rotary polygon mirror to deflect a light beam from the light source, a scanning optical system configured to focus the light beam deflected by the optical deflector on a target surface, a sync detecting sensor configured to determine a write start timing on the target surface, and a processing unit configured to correct detection data of the sync detecting sensor based on a measured value of a time needed for one revolution of the rotary polygon mirror.

14 Claims, 40 Drawing Sheets

(56) References Cited

U.S. PATENT DOCUMENTS

| | | | |
|---|---|---|---|
| 6,166,842 A | 12/2000 | Aoki et al. |
| 6,256,133 B1 | 7/2001 | Suzuki et al. |
| 6,347,004 B1 | 2/2002 | Suzuki et al. |
| 6,366,384 B1 | 4/2002 | Aoki et al. |
| 6,376,837 B1 | 4/2002 | Itabashi et al. |
| 6,388,792 B1 | 5/2002 | Atsuumi et al. |
| 6,448,998 B1 | 9/2002 | Suzuki et al. |
| 6,509,995 B1 | 1/2003 | Suzuki et al. |
| 6,596,985 B2 | 7/2003 | Sakai et al. |
| 6,856,338 B2 | 2/2005 | Takahashi et al. |
| 7,057,782 B2 | 6/2006 | Kudo |
| 7,215,354 B1 | 5/2007 | Sakai et al. |
| 7,411,712 B2 | 8/2008 | Nakajima et al. |
| 7,417,757 B2 | 8/2008 | Shinohara |
| 7,791,634 B2 | 9/2010 | Masui et al. |
| 8,009,342 B2 | 8/2011 | Sakai |
| 2002/0080428 A1 | 6/2002 | Suzuki et al. |
| 2003/0107788 A1 | 6/2003 | Hayashi et al. |
| 2003/0128413 A1 | 7/2003 | Suzuki et al. |
| 2003/0173508 A1* | 9/2003 | Tanaka et al. | 250/234 |
| 2003/0179429 A1 | 9/2003 | Takanashi et al. |
| 2003/0214694 A1 | 11/2003 | Sakai |
| 2003/0218788 A1 | 11/2003 | Sakai et al. |
| 2004/0037584 A1* | 2/2004 | Takahashi et al. | 399/100 |
| 2004/0090520 A1 | 5/2004 | Sakai et al. |
| 2004/0125193 A1 | 7/2004 | Kubo |
| 2004/0196507 A1 | 10/2004 | Sakai |
| 2004/0263968 A1 | 12/2004 | Kobayashi et al. |
| 2006/0077500 A1 | 4/2006 | Hayashi et al. |
| 2006/0187294 A1 | 8/2006 | Saisho et al. |
| 2007/0091398 A1 | 4/2007 | Ueda et al. |
| 2007/0211324 A1 | 9/2007 | Sakai et al. |
| 2007/0211326 A1 | 9/2007 | Saisho et al. |
| 2007/0216316 A1 | 9/2007 | Hirano et al. |
| 2007/0253048 A1 | 11/2007 | Sakai et al. |
| 2008/0025759 A1 | 1/2008 | Ichii et al. |
| 2008/0049094 A1 | 2/2008 | Kato et al. |
| 2008/0055672 A1 | 3/2008 | Watanabe et al. |
| 2008/0055692 A1 | 3/2008 | Saisho et al. |
| 2008/0068689 A1 | 3/2008 | Saisho et al. |
| 2008/0068693 A1 | 3/2008 | Hayashi et al. |
| 2008/0100895 A1 | 5/2008 | Hayashi et al. |
| 2008/0123159 A1 | 5/2008 | Hayashi et al. |
| 2008/0192319 A1 | 8/2008 | Miyatake et al. |
| 2008/0204840 A1 | 8/2008 | Watanabe et al. |
| 2008/0218827 A1 | 9/2008 | Watanabe et al. |
| 2008/0219601 A1 | 9/2008 | Arai et al. |
| 2008/0285104 A1 | 11/2008 | Arai et al. |
| 2009/0052944 A1 | 2/2009 | Kubo et al. |
| 2009/0059333 A1 | 3/2009 | Sakai |
| 2009/0060583 A1 | 3/2009 | Amada et al. |
| 2009/0065685 A1 | 3/2009 | Watanabe et al. |
| 2009/0080907 A1 | 3/2009 | Hagiya et al. |
| 2009/0195636 A1 | 8/2009 | Arai et al. |
| 2009/0220256 A1 | 9/2009 | Suhara et al. |
| 2009/0231557 A1 | 9/2009 | Kubo |
| 2009/0303561 A1* | 12/2009 | Kiyama | 359/198.1 |
| 2009/0314927 A1 | 12/2009 | Tatsuno et al. |
| 2010/0060710 A1 | 3/2010 | Kubo |
| 2010/0060963 A1 | 3/2010 | Miyake et al. |
| 2010/0091083 A1 | 4/2010 | Itami et al. |
| 2010/0118366 A1 | 5/2010 | Tokita et al. |
| 2010/0183337 A1 | 7/2010 | Kubo et al. |
| 2010/0194843 A1 | 8/2010 | Sakai et al. |
| 2010/0328417 A1 | 12/2010 | Saisho et al. |
| 2011/0002025 A1 | 1/2011 | Tokita et al. |
| 2011/0063594 A1 | 3/2011 | Sakai |
| 2011/0129244 A1 | 6/2011 | Shoji et al. |
| 2011/0216386 A1 | 9/2011 | Watanabe et al. |
| 2011/0235132 A1 | 9/2011 | Saisho et al. |
| 2011/0316959 A1 | 12/2011 | Saisho et al. |
| 2011/0318057 A1 | 12/2011 | Watanabe |
| 2012/0050444 A1 | 3/2012 | Sakai |
| 2012/0177409 A1 | 7/2012 | Arai et al. |

FOREIGN PATENT DOCUMENTS

| | | |
|---|---|---|
| JP | 2003-185952 | 7/2003 |
| JP | 2005-208323 | 8/2005 |
| JP | 3773884 | 5/2006 |
| JP | 2006-305780 | 11/2006 |
| JP | 2007-083601 | 4/2007 |
| JP | 2007-229963 | 9/2007 |
| JP | 2009175470 A * | 8/2009 |
| JP | 4393133 | 1/2010 |
| JP | 2011-011504 | 1/2011 |

OTHER PUBLICATIONS

Office Action issued Sep. 6, 2016, in Japanese Patent Application No. 2012-265706.

* cited by examiner

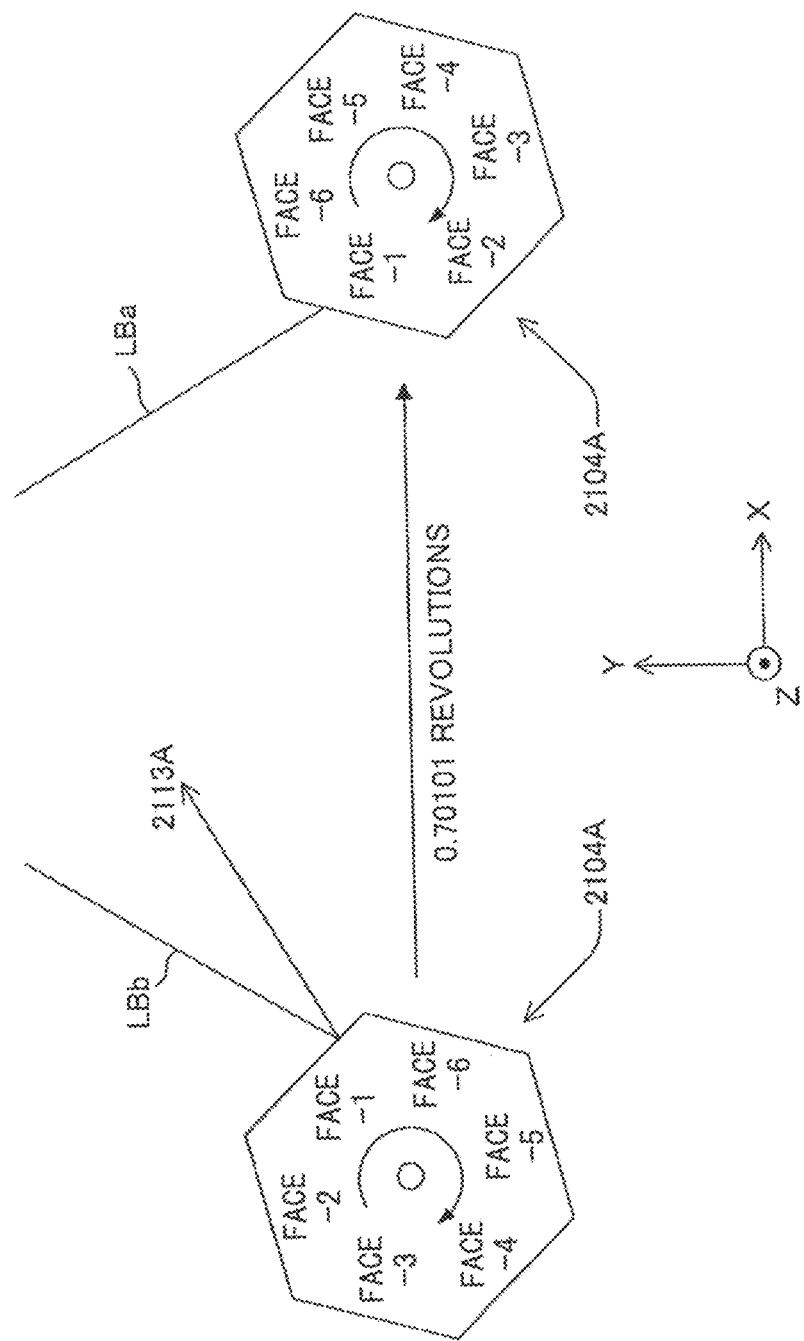

OPTICAL SCANNING APPARATUS AND IMAGE FORMING DEVICE

BACKGROUND OF THE INVENTION

1. Field of the Invention

The present disclosure relates to an optical scanning apparatus which scans a target surface by light, and an image forming device including the optical scanning apparatus provided therein.

2. Description of the Related Art

Image forming devices, such as digital multi-functional peripherals or laser printers, are provided with an optical scanning apparatus. In the optical scanning apparatus, a light beam emitted from a light source is deflected by an optical deflector having a rotary polygon mirror, so that a photoconductor drum surface is scanned by the deflected light beam.

Generally, an image forming device including plural photoconductor drums uses an optical scanning apparatus having two scanning lenses arranged in two opposed positions that confront opposite sides of the optical deflector respectively. In the following, the optical scanning apparatus of this type will be called an opposed scanning type optical scanning apparatus.

The optical scanning apparatus may include a sync detecting sensor arranged at a predetermined position where a light beam prior to a write start time is received, in order to equalize write start positions for plural scanning lines in a main scanning direction on the photoconductor drum surface. In the following, an output signal of the sync detecting sensor will be called a sync detection signal.

In the opposed scanning type optical scanning apparatus, a single sync detecting sensor may be arranged at a position confronting one of the photoconductor drums. In this case, a false sync signal (or pseudo sync signal) for the other photoconductor drums is generated based on the sync detection signal output from the sync detecting sensor confronting the one of the photoconductor drums.

Mirror surfaces of the rotary polygon mirror in the above-mentioned optical deflector are formed by cutting. However, at a result of a normal cutting process, the angle between two adjacent ones of the mirror surfaces may not be uniform. In such a case, when the photoconductor drum surface is scanned by the light beam deflected on a mirror surface different from the mirror surface from which the sync detection signal is obtained, if a write start timing of an image is determined from a false sync signal generated based on the sync detection signal, the write start position of the image will deviate from the correct position. If the precision of cutting is improved, the irregularity of the angle may be reduced. However, the process cost will increase conversely.

For example, Japanese Patent No. 4,393,133 discloses an image forming device which is arranged to include a detection unit arranged at a position corresponding to a first light emitting device to detect a laser beam from the first light emitting device scanned by a rotary polygon mirror. A signal generating unit generates a horizontal sync signal for determining the timing to form an electrostatic latent image in a main scanning direction on an image support object with the laser beam from the first light emitting device according to a result of the detection by the detection unit. A measuring unit measures an interval of the detection times that the laser beams of the first light emitting device scanned by the faces of the polygon mirror are detected by the detection unit sequentially. A timing determination unit determines the timing to form the electrostatic latent image on the image support object by a laser beam of a second light emitting device scanned by a face of the polygon mirror different from the face by which the laser beam of the first light emitting device is scanned, based on the detection of the laser beam of the first light emitting device by the detection unit when generating the horizontal sync signal, and the interval measured by the measuring part, without detecting the laser beam of the second light emitting device to be scanned by the polygon mirror.

Japanese Laid-Open Patent Publication No. 2003-185952 discloses an optical scanning apparatus in which two or more of plural scanning units share a polygonal deflector. The two or more scanning units use the light beams deflected by different deflection surfaces of the polygonal deflector. A single write start position detecting unit is arranged to detect the light beams from the different deflection surfaces of the polygonal deflector. The write start timing for the scanning units to the target surface is determined by using an output signal of this write start position detecting part.

Moreover, Japanese Laid-Open Patent Publication No. 2004-102276, Japanese Laid-Open Patent Publication No. 2006-305780, Japanese Patent No. 3,773,884, and Japanese Laid-Open Patent Publication No. 2011-011504 disclose the related technology similar to that of the above-mentioned related art documents.

However, in these years, the requirements for increasingly high image quality of image forming devices are present, and there has been a problem that the image forming device disclosed in Japanese Patent No. 4,393,133 and the image forming device using the optical scanning apparatus disclosed in Japanese Laid-Open Patent Publication No. 2003-185952 have difficulty in satisfying the requirements.

The inventors of the present application have examined the image quality of an image forming device including an optical scanning apparatus in which a false sync signal is generated to determine a write start timing, and have discovered that the image quality is affected by the rotation irregularity of the rotary polygon mirror.

Moreover, as known conventionally, the error (the face-by-face error) for the deflection reflective surfaces of the polygon mirror is also a problem that affects the image quality.

The main factor of the face-by-face error is the variations in the distance from the rotation axis of the polygon mirror to the deflection reflective surfaces of the optical deflector (or eccentricity of the polygon mirror and profile irregularities of the faces of the polygon mirror).

One of the causes of the irregularity of the write end position is that the scanning irregularity is produced when two or more light sources are used. The main factor of this scanning irregularity is that there is a difference in the oscillation wavelength of the light sources, and the scanning speed is varied according to the chromatic aberration of the scanning optical system.

SUMMARY OF THE INVENTION

Accordingly, in one aspect, the present disclosure provides an optical scanning apparatus including: a light source; an optical deflector having a rotary polygon mirror to deflect a light beam from the light source; a scanning optical system arranged to focus the light beam deflected by the optical deflector on a target surface; a sync detecting sensor arranged to determine a write start timing on the target surface; and a processing unit configured to correct detection data of the sync detecting sensor based on a measured value of a time needed for one revolution of the rotary polygon mirror.

Other objects, features and advantages of the present disclosure will become more apparent from the following detailed description when read in conjunction with the accompanying drawings.

BRIEF DESCRIPTION OF THE DRAWINGS

FIG. 12 is a diagram for explaining the computation result of ΔT2 and ΔT2a.

FIG. 13A and FIG. 13B are diagrams for explaining a false sync signal when taking the rotation irregularity into consideration.

DETAILED DESCRIPTION OF THE PREFERRED EMBODIMENTS

A description will be given of embodiments of the present disclosure with reference to the accompanying drawings.

Figure 1:
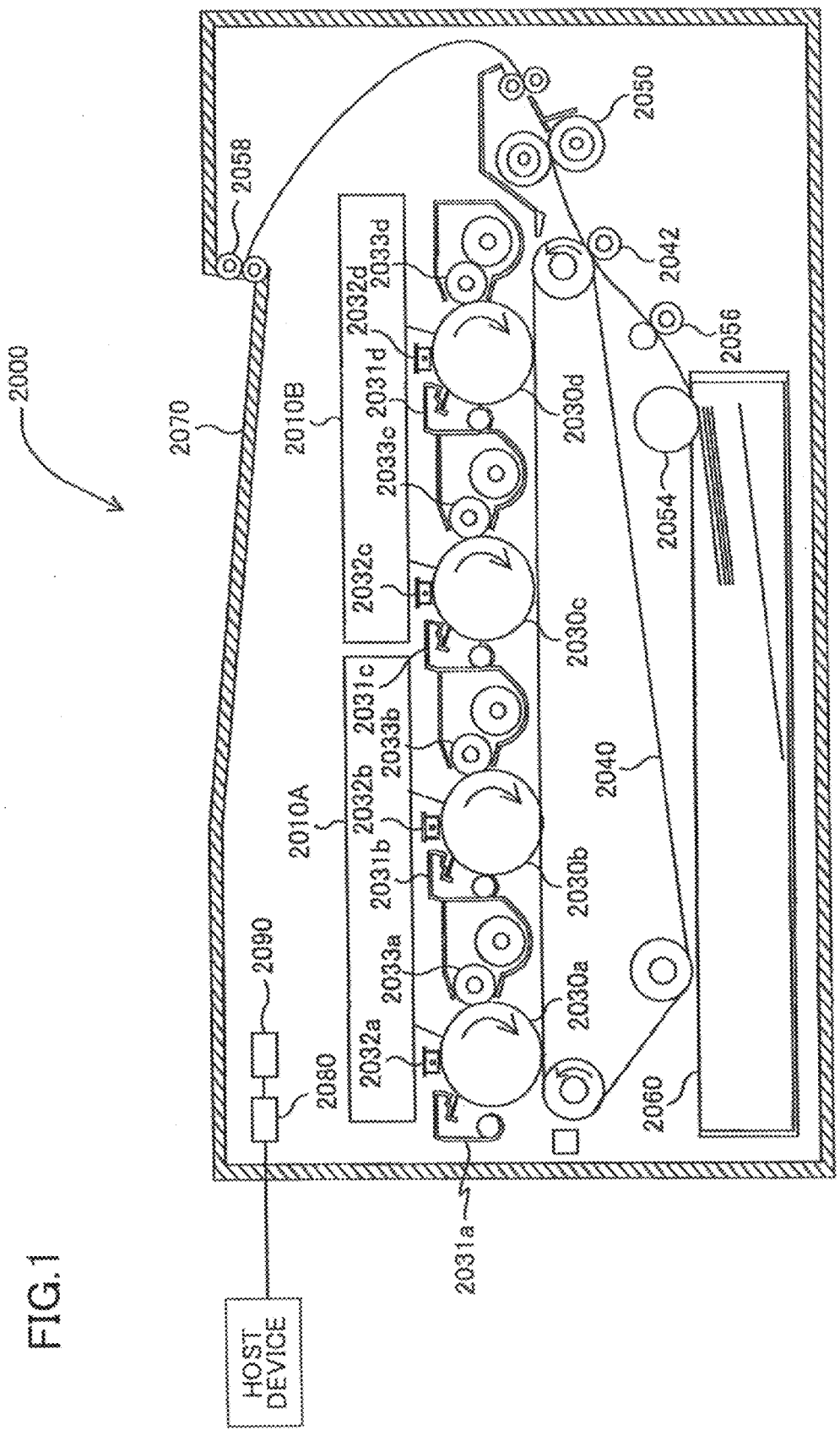
FIG. 1 is a diagram showing the composition of a color printer of an embodiment of the present disclosure.

FIG. 1 shows the outline composition of a color printer 2000 of an embodiment of the present disclosure. As shown in FIG. 1, the color printer 2000 is a tandem-type multicolor printer which forms a full color image by overlapping images of four colors (black, cyan, magenta, yellow). The color printer 2000 includes two optical scanning apparatuses (2010A, 2010B), four photoconductor drums (2030a, 2030b, 2030c, 2030d), four cleaning units (2031a, 2031b, 2031c, 2031d), four charging units (2032a, 2032b, 2032c, 2032d), four developing rollers (2033a, 2033b, 2033c, 2033d), a transfer belt 2040, a transfer roller 2042, a fixing roller 2050, a feed roller 2054, a delivery roller 2058, a sheet feed tray 2060, a sheet output tray 2070, a communication control device 2080, and a printer control device 2090 that controls the component parts of the color printer.

The communication control device 2080 controls the bidirectional communications between the color printer 2000 and a host device (for example, a personal computer) through a network.

The printer control device 2090 includes a CPU, a ROM which stores programs executable by the CPU and various data used when executing the programs, a RAM which provides a working area for the CPU, and an AD (analog-to-digital) converter which converts analog data into digital data. The printer control device 2090 controls the component parts of the color printer 2000 according to the instructions from the host device.

In the color printer 2000, the photoconductor drum 2030a, the charging unit 2032a, the developing roller 2033a, and the cleaning unit 2031a are used as a group and constitute a black image formation station (which will be called "K station") that forms an image of black. The photoconductor drum 2030b, the charging unit 2032b, the developing roller 2033b, and the cleaning unit 2031b are used as a group and constitute a cyan image formation station (which will be called "C station") that forms an image of cyan. The photoconductor drum 2030c, the charging unit 2032c, the developing roller 2033c, and the cleaning unit 2031c are used as a group and constitute a magenta image formation station (which will be called "M station") that forms an image of magenta. The photoconductor drum 2030d, the charging unit 2032d, the developing unit 2033d, and the cleaning unit 2031d are used as a group and constitute a yellow image formation station (which will be called "Y station") that forms an image of yellow.

On the surface of each of the photoconductor drums, a photosensitive layer is formed. Namely, the surface of each photoconductor drum is a target surface to be scanned, and a latent image is formed on the target surface. Each of the photoconductor drums is rotated around its horizontal rotation axis in a direction indicated by the arrow in FIG. 1 by a non-illustrated rotating mechanism.

Each of the charging units electrically charges the surface of the corresponding one of the photoconductor drums in a uniform manner respectively.

The optical scanning apparatus 2010A scans the charged surface of each of the photoconductor drum 2030a and the photoconductor drum 2030b by the light which is modulated for each color based on the corresponding one of the image information of black and the image information of cyan received from the printer control device 2090 respectively. Thereby, the latent images corresponding to the image information received are formed on the surfaces of these photoconductor drums respectively. The latent images formed are moved in the direction toward the corresponding one of the developing rollers in accordance with the rotation of the corresponding photoconductor drum.

The optical scanning apparatus 2010B scans the charged surface of each of the photoconductor drum 2030c and the photoconductor drum 2030d by the light which is modulated for each color based on the corresponding one of the image information of magenta and the image information of yellow received from the printer control device 2090 respectively. Thereby, the latent images corresponding to the image information received are formed on the surfaces of these photoconductor drums respectively. The latent images formed are moved in the direction toward the corresponding one of the developing rollers in accordance with the rotation of the corresponding photoconductor drum.

The details of each of the optical scanning apparatuses will be described later.

In the following, a scanning area of each photoconductor drum in which the image information is written will be called "effective scanning area", "image formation area", or "effective image area".

Toner from a corresponding toner cartridge (not shown) is supplied to the surface of each of the developing rollers uniformly by the rotation of the developing roller. When the toner on the surface of each developing roller touches the surface of the corresponding photoconductor drum, the toner adheres to only the portion of the photoconductor drum surface which has been irradiated with the light beam. Namely, each developing roller serves to visualize the latent image on the surface of the corresponding photoconductor drum into a toner image by applying the toner thereto. This toner image is moved in the direction toward the transfer belt 2040 in accordance with the rotation of the photoconductor drum.

The respective toner images of yellow, magenta, cyan, and black are sequentially transferred onto the transfer belt 2040 in predetermined timing, so that these toner images are overlapped to form a full color image.

A number of recording sheets is stored in the sheet feed tray 2060. The feed roller 2054 is disposed in the vicinity of the sheet feed tray 2060. The feed roller 2054 picks out a single recording sheet from the recording sheets in the sheet feed tray 2060 at a time. This recording sheet is delivered to a nip between the transfer belt 2040 and the transfer roller 2042 in predetermined timing. Thereby, the color image on the transfer belt 2040 is transferred to the recording sheet. The recording sheet to which the color image is transferred is delivered to the fixing roller 2050.

In the fixing roller 2050, heat and pressure are applied to the recording sheet so that the toner is fixed to the recording sheet. The recording sheet to which the toner is fixed is delivered to the sheet output tray 2070 through the delivery roller 2058. In this manner, the recording sheets are sequentially accumulated on the sheet output tray 2070.

Each of the cleaning units removes the remaining toner (residual toner) from the surface of the corresponding photoconductor drum. The surface of the photoconductor drum after the remaining toner is removed is returned back to the position which confronts the corresponding charging unit.

Next, the composition of the optical scanning apparatus 2010A will be explained.

Figure 2:
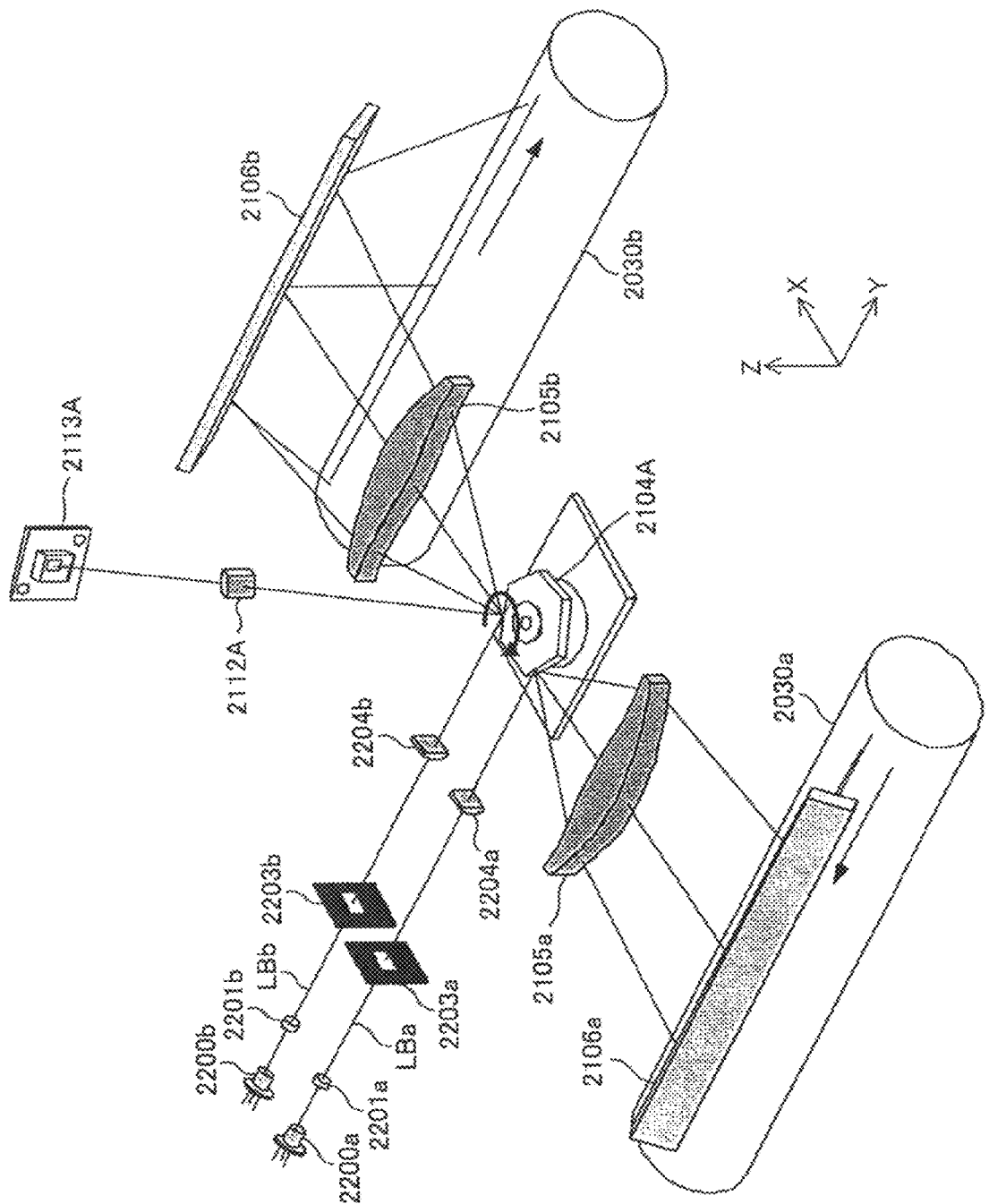
FIG. 2 is a diagram showing the composition of an optical scanning apparatus shown in FIG. 1.

As shown in FIG. 2, the optical scanning apparatus 2010A includes two light sources (2200a, 2200b), two coupling lenses (2201a, 2201b), two aperture plates (2203a, 2203b), two cylindrical lenses (2204a, 2204b), a polygon mirror 2104A, two scanning lenses (2105a, 2105b), two feedback mirrors (2106a, 2106b), a focusing lens 2112A, a sync detecting sensor 2113A, and a non-illustrated scanning control device A.

In the following, it is assumed that in an XYZ three-dimensional rectangular coordinate system, the Y axis direction is a direction parallel to the longitudinal direction (or the rotational shaft direction) of each photoconductor drum, and the Z axis direction is a direction parallel to the rotating shaft of the polygon mirror 2104A.

Each light source includes a semiconductor laser and a drive circuit which drives the semiconductor laser. The drive circuit of each light source is controlled by the scanning control device A.

In the following, a light beam emitted from the light source 2200a is called "light beam LBa", and a light beam emitted from the light source 2200b is called "light beam LBb".

The coupling lens 2201a converts the light beam LBa emitted from the light source 2200a into a generally parallel light beam. The coupling lens 2201b converts the light beam LBb emitted from the light source 2200b into a generally parallel light beam.

The aperture plate 2203a has an opening and adjusts the beam diameter of the light beam LBa from the coupling lens 2201a. The aperture plate 2203b has an opening and adjusts the beam diameter of the light beam LBb from the coupling lens 2201b.

The cylindrical lens 2204a converges the light beam LBa passed through the opening of the aperture plate 2203a with respect to the Z axis direction near the deflection reflective surface of the polygon mirror 2104A. The cylindrical lens 2204b converges the light beam LBb having passed through the opening of the aperture plate 2203b with respect to the Z axis direction near the deflection reflective surface of the polygon mirror 2104A. The optical system arranged between each light source and the polygon mirror 2104A is also called the optical system in front of the deflector.

The polygon mirror 2104A is a six-face mirror as a rotary polygon mirror, and each mirror surface serves as a deflection reflective surface. This rotary polygon mirror is uniformly rotated around the rotating shaft thereof by a non-illustrated polygon motor, and each face of the polygon mirror deflects the light from each cylindrical lens at a constant angular velocity.

In the following, it is assumed that the rotary polygon mirror is rotated clockwise. The polygon motor is controlled based on an external clock signal so that the rotational frequency of the rotary polygon mirror is set to 33300 rpm. Hence, the time for one revolution of the rotary polygon mirror is about 1.8 ms.

The light beam LBa from the cylindrical lens 2204a enters the deflection reflective surface of the polygon mirror 2104A located on the −X side of the rotating shaft of the polygon mirror 2104A, and the light beam LBb from the cylindrical lens 2204b enters the deflection reflective surface of the polygon mirror 2104A located on the +X side of the rotating shaft.

The scanning lens 2105a is located on the −X side of the polygon mirror 2104A and arranged on the optical path of the light beam LBa deflected by the polygon mirror 2104A.

The feedback mirror 2106a guides the light beam LBa from the scanning lens 2105a to the photoconductor drum 2030a. That is, the surface of the photoconductor drum 2030a is irradiated with the light beam LBa, and a light spot is formed on the surface of the photoconductor drum 2030a.

The scanning lens 2105b is located on the +X side of the polygon mirror 2104A and arranged on the optical path of the light beam LBb deflected by the polygon mirror 2104A.

The feedback mirror 2106b guides the light beam LBb from the scanning lens 2105b to the photoconductor drum 2030b. That is, the surface of the photoconductor drum 2030b is irradiated with the light beam LBb, and a light spot is formed on the surface of the photoconductor drum 2030b.

The light spot on the surface of each photoconductor drum is moved in the longitudinal direction of the photoconductor drum in accordance with the rotation of the polygon mirror 2104A. The moving direction of the light spot at this time is called "main scanning direction", and the direction of rotation of the photoconductor drum is called "sub-scanning direction".

The sync detecting sensor 2113A is arranged in a position which receives, through the focusing lens 2112A, a light beam directed to the outside of the effective scanning area of the photoconductor drum 2030b. The sync detecting sensor 2113A outputs a sync detection signal to the scanning control device A.

The sync detecting sensor 2113A is configured so that the sync detection signal is set to "low level" when the amount of received light is smaller than a predetermined value, and set to "high level" when the amount of received light is larger than the predetermined value. That is, when the sync detecting sensor 2113A receives a light beam, the sync detection signal changes from "high level" to "low level".

The scanning control device A determines a write start timing for the surface of the photoconductor drum 2030b based on the output of the sync detecting sensor 2113A (the sync detection signal).

Figure 3:
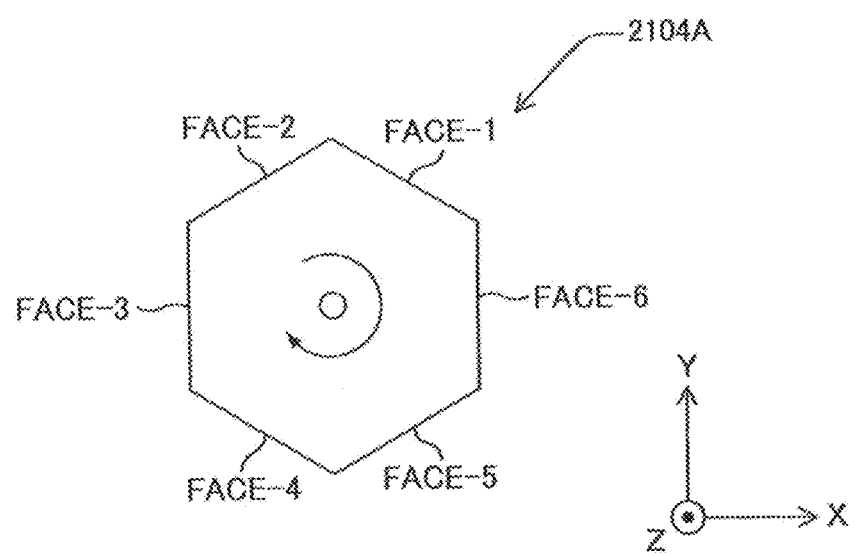
FIG. 3 is a diagram for explaining the faces of a polygon mirror.

FIG. 3 shows an example of the faces of the polygon mirror 2104A. As shown in FIG. 3, the six deflection reflective surfaces of the polygon mirror 2104A are called "face-1", "face-2", "face-3", "face-4", "face-5", and "face-6" counterclockwise.

For example, when the photoconductor drum 2030b is first scanned by the light reflected on the face-1, the photoconductor drum 2030a is next scanned by the light reflected on the face-3. Then, the photoconductor drum 2030a is scanned by the light reflected on the face-2, and the photoconductor drum 2030b is scanned by the light reflected on the face-4. Further, the photoconductor drum 2030a is scanned by the light reflected on the face-3, and the photoconductor drum 2030b is scanned by the light reflected on the face-5.

Figure 4:
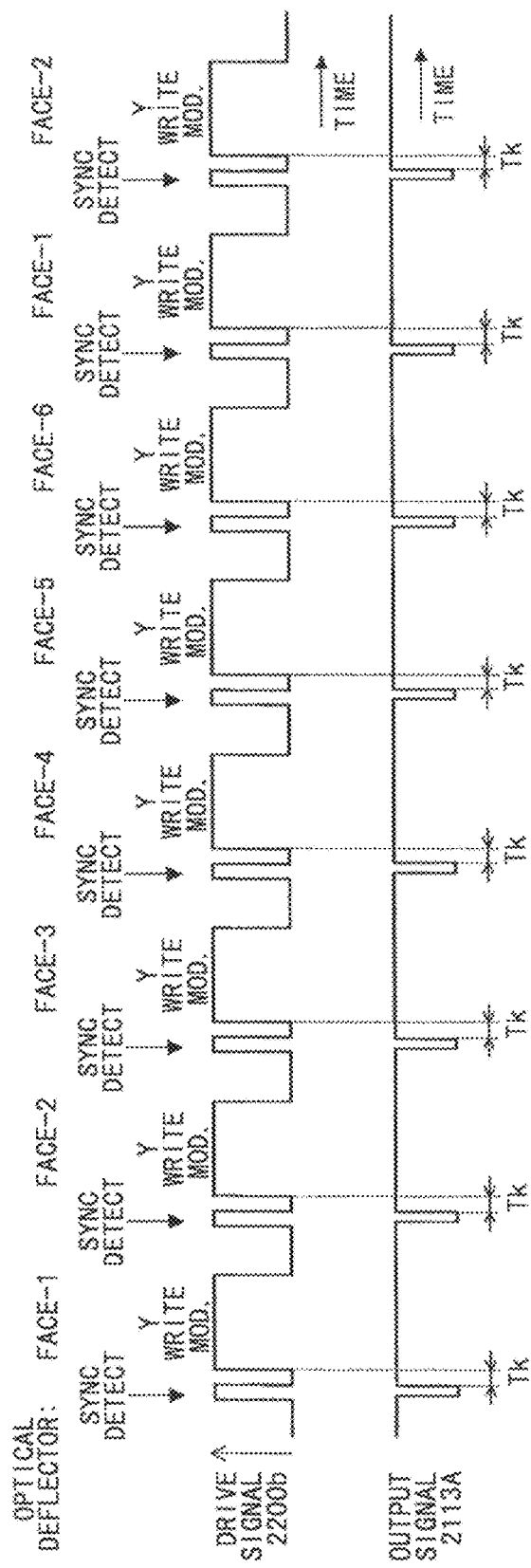
FIG. 4 is a timing chart for explaining a write start timing in a photoconductor drum.

FIG. 4 is a timing chart for explaining a write start timing in the photoconductor drum 2030b. As shown in FIG. 4, if a rise of the output of the sync detecting sensor 2113A is detected, the scanning control device A starts the writing to the photoconductor drum 2030b after progress of a time Tk from the instant of the detection. This time Tk is an interval from the timing of the rise of the sync detection signal to the write start timing, which is predetermined for each image forming device and stored in the memory of the scanning control device A.

Figure 5:
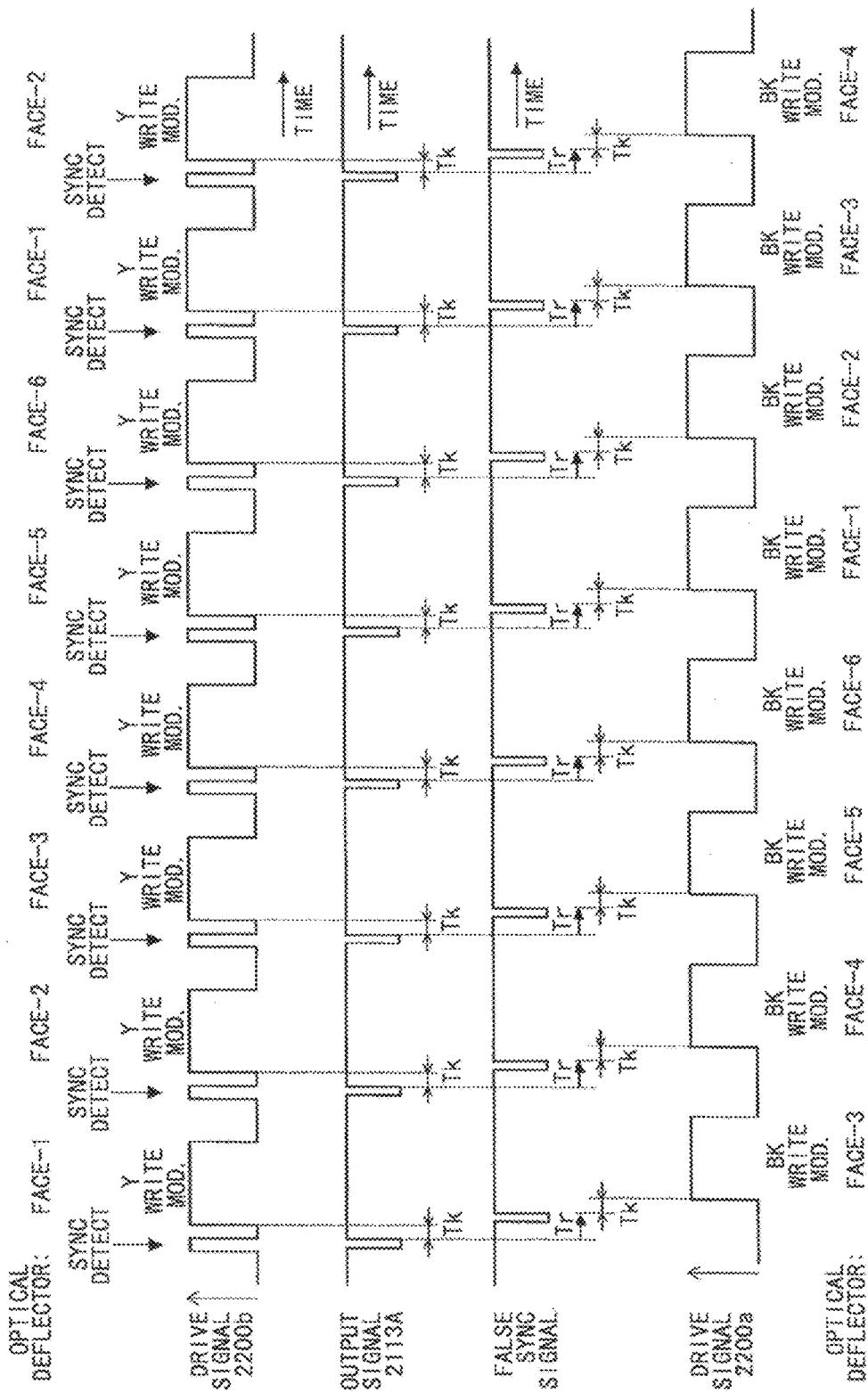
FIG. 5 is a timing chart for explaining a conventional example 1 of a false sync signal.

In this embodiment, a sync detecting sensor corresponding to the photoconductor drum 2030a is not arranged, and a sync detection signal regarding the photoconductor drum 2030a cannot be received. In this case, a method of determining the write start timing for the photoconductor drum 2030a is shown in FIG. 5. FIG. 5 shows a method of generating a false sync signal in sync with the output of the sync detecting sensor 2113A (conventional example 1). As shown in FIG. 5, this false sync signal is a signal which changes from "low level" to "high level" when a time Tr passes from the timing of a rise of the output of the sync detecting sensor 2113A. The time Tr is a time needed for ⅙ of one revolution of the polygon mirror, which is predetermined for each image forming device.

Conventionally, as shown in FIG. 5, the writing to the photoconductor drum 2030a is started after progress of the time Tk from the timing of a rise of the false sync signal. However, a manufacturing error may exist in the polygon mirror, and there is a problem that, if the polygon mirror has an error in the deflection reflective surfaces, the write start positions differ.

Figure 6:
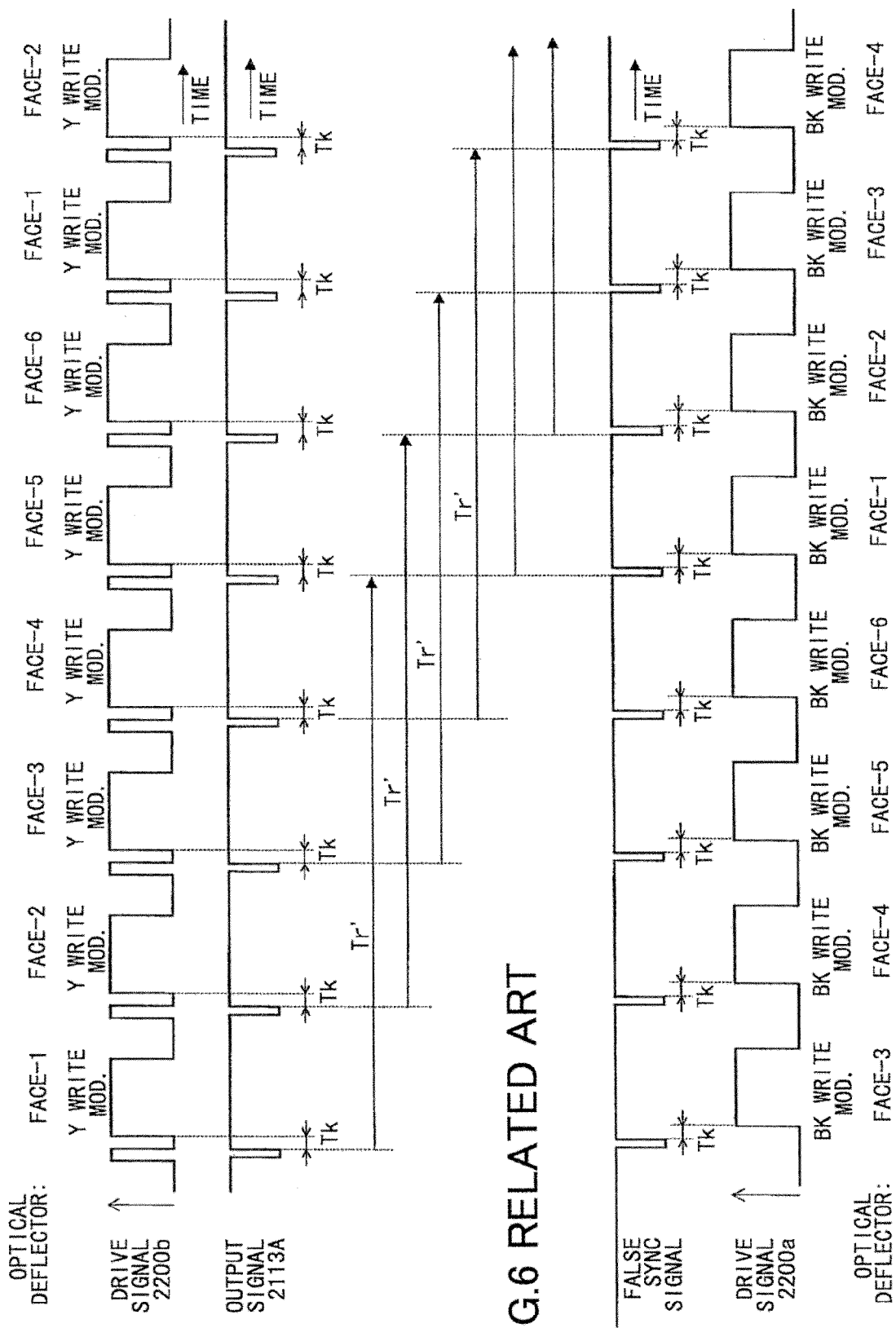
FIG. 6 is a timing chart for explaining a conventional example 2 of a false sync signal.

A first method for eliminating the problem is, as shown in FIG. 6 (conventional example 2), to determine a write start timing when scanning the photoconductor drum 2030a using the light reflected on the same deflection reflective surface based on the output of the sync detecting sensor 2113A. In FIG. 6, a time Tr' indicates an interval corresponding to an integral multiple of the time Tr above.

Figure 7:
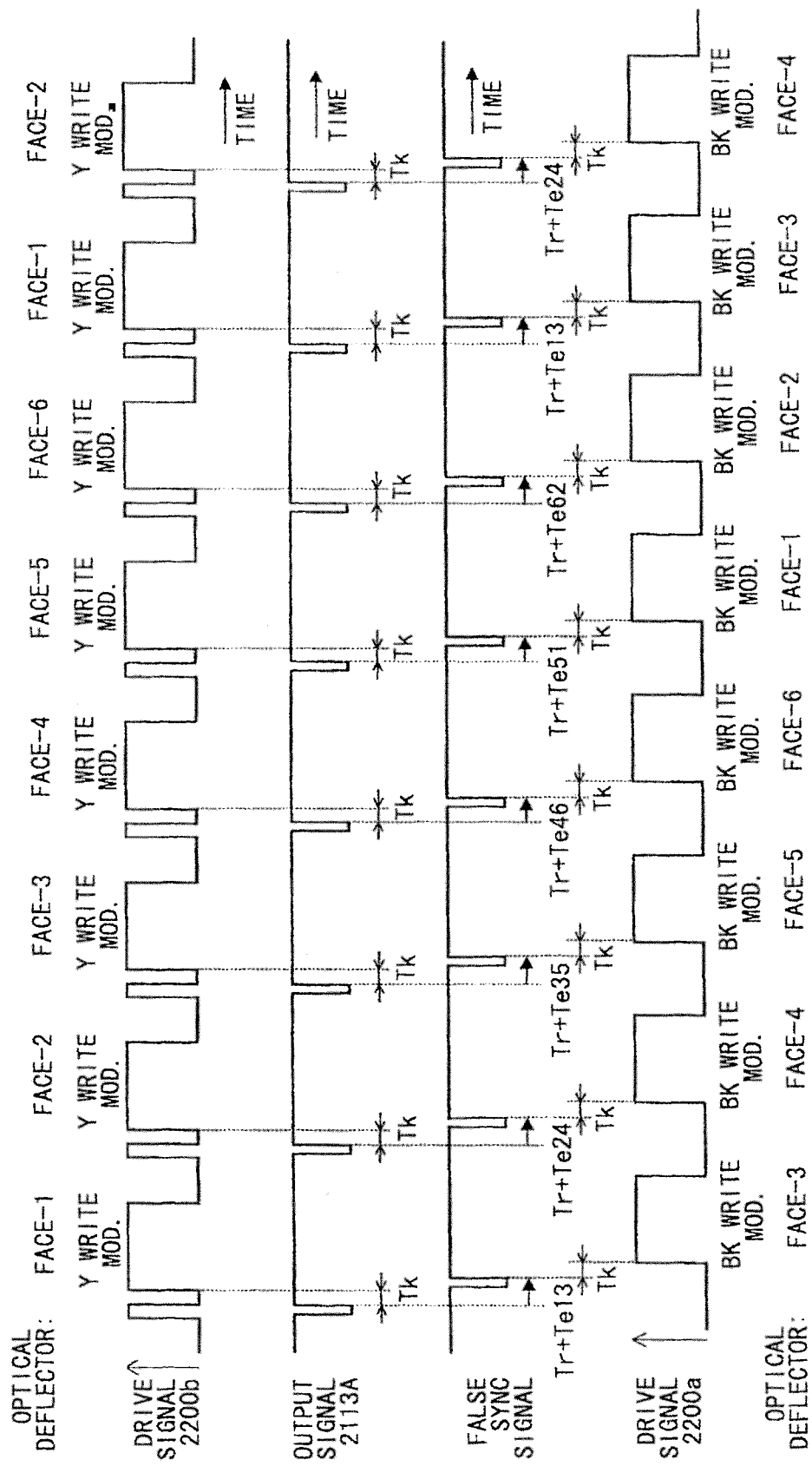
FIG. 7 is a timing chart for explaining a conventional example 3 of a false sync signal.

A second method for eliminating the problem is, as shown in FIG. 7 (conventional example 3), that time differences between the deflection reflective surfaces (Te13, Te24, Te35, Te46, Te51, Te62) are computed beforehand, the time Tr is corrected, and the write start timing for the photoconductor drum 2030a is determined by taking the time differences into consideration. In FIG. 7, Te13 denotes a time difference between the face-1 and the face-3, Te24 denotes a time difference between the face-2 and the face-4, and Te35 denotes a time difference between the face-3 and the face-5. Te46 denotes a time difference between the face-4 and the face-6, Te51 denotes a time difference between the face-5 and the face-1, and Te62 denotes a time difference between the face-6 and the face-2.

Figure 8:
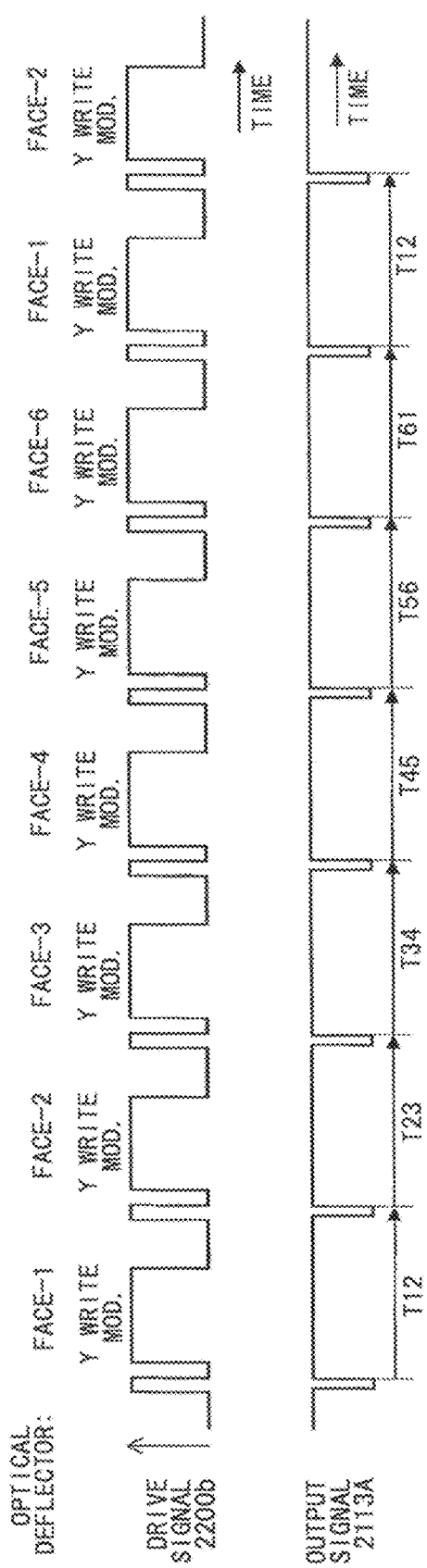
FIG. 8 is a timing chart for explaining a method of obtaining a time difference between the deflection reflective surfaces in FIG. 7.

In order to perform the method of FIG. 7, it is necessary to compute the time differences between the deflection reflective surfaces beforehand. First, in this method, as shown in FIG. 8, the following times are measured based on the output of the sync detecting sensor 2113A: a time T12 for the face-1 (as the deflection reflective surface reflecting the light beam) to be moved to the face-2; a time T23 for the face-2 (as the deflection reflective surface reflecting the light beam) to be moved to the face-3; a time T34 for the face-3 (as the deflection reflective surface reflecting the light beam) to be moved to the face-4; a time T45 for the face-4 (as the deflection reflective surface reflecting the light beam) to be moved to the face-5; a time T56 for the face-5 (as the deflection reflective surface reflecting the light beam) to be moved to the face-6; and a time T61 for the face-6 (as the deflection reflective surface reflecting the light beam) to be moved to the face-1.

Next, a difference of the time T12 and the time Tr is computed and the time difference Te12 between the face-1 and the face-2 is set to the computed difference. A difference of the time T23 and the time Tr is computed and the time difference Te23 between the face-2 and the face-3 is set to the computed difference. A difference of the time T34 and the time Tr is computed and the time difference Te34 between the face-3 and the face-4 is set to the computed difference. A difference of the time T45 and the time Tr is computed and the time difference Te45 between the face-4 and the face-5 is set to the computed difference. A difference of the time T56 and the time Tr is computed and the time difference Te56 between face-5 and face-6 is set to the computed difference. A difference of the time T61 and the time Tr is computed and the time difference Te61 between the face-6 and the face-1 is set to the computed difference.

A time difference Te13 is determined by a sum of the time difference Te12 and the time difference Te23. A time difference Te24 is determined by a sum of the time difference Te23 and the time difference Te34. A time difference Te35 is determined by a sum of the time difference Te34 and the time difference Te45. A time difference Te46 is determined by a sum of the time difference Te45 and the time difference Te56. A time difference Te51 is determined by a sum of the time difference Te56 and the time difference Te61. A time difference Te62 is determined by a sum of the time difference Te61 and the time difference Te12.

In any of the above-mentioned methods, the elapsed time from the reception of the light beam at the sync detecting sensor 2113A to the write start timing for the photoconductor drum 2030a is longer than the elapsed time in the case where the sync detecting sensor corresponding to the photoconductor drum 2030a is disposed.

The inventors of the present application have examined the image quality of an image forming device including an optical scanning apparatus in which a false sync signal is generated to determine the write start timing, and have discovered that the image quality is affected by the rotation irregularity of the rotary polygon mirror. Moreover, the inventors have discovered that the larger the elapsed time from the reception of the light beam at the sensor to the write start timing, the larger the influence by the rotation irregularity of the rotary polygon mirror.

Figure 9:
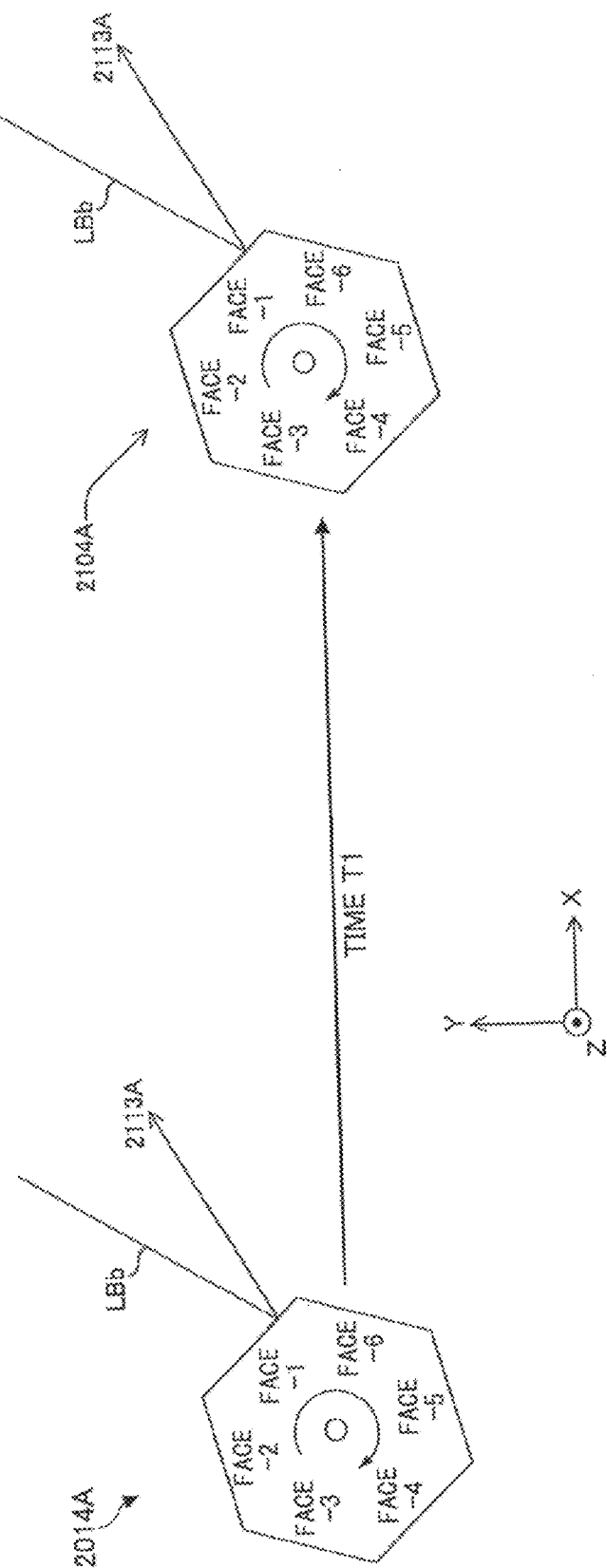
FIG. 9 is a diagram for explaining a time T1.

As an example, as shown in FIG. 9, a time from the reception of the light beam reflected on one deflection reflective surface (the face-1 in FIG. 9) at the sync detecting sensor 2113A to the reception of the light beam reflected again on the same deflection reflective surface is set to T1. Namely, this time T1 is a measured value of a time for one revolution of the rotary polygon mirror.

Figure 10:
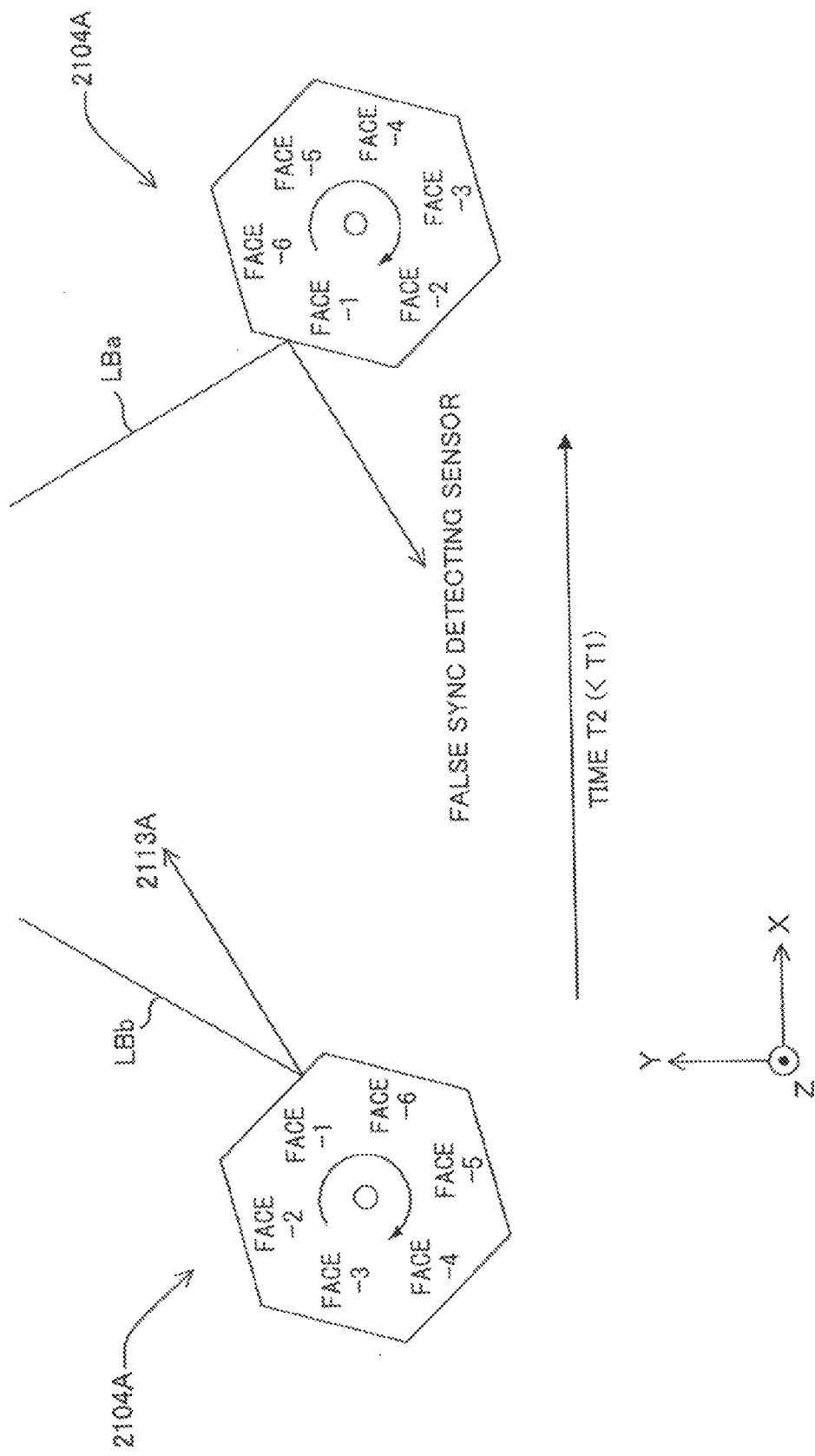
FIG. 10 is a diagram for explaining a time T2.

As an example, as shown in FIG. 10, it is assumed that a virtual sync detecting sensor corresponding to the photoconductor drum 2030a (which sensor is indicated as a false sync detecting sensor in FIG. 10) is arranged in the position which outputs the false sync signal as shown in FIG. 5. In this case, a time from the reception of the light beam reflected on one deflection reflective surface (the face-1 in FIG. 10) at the sync detecting sensor 2113A to the reception of the light beam reflected on the same deflection reflective surface at the false sync detecting sensor is set to T2 (<T1).

Figure 11:
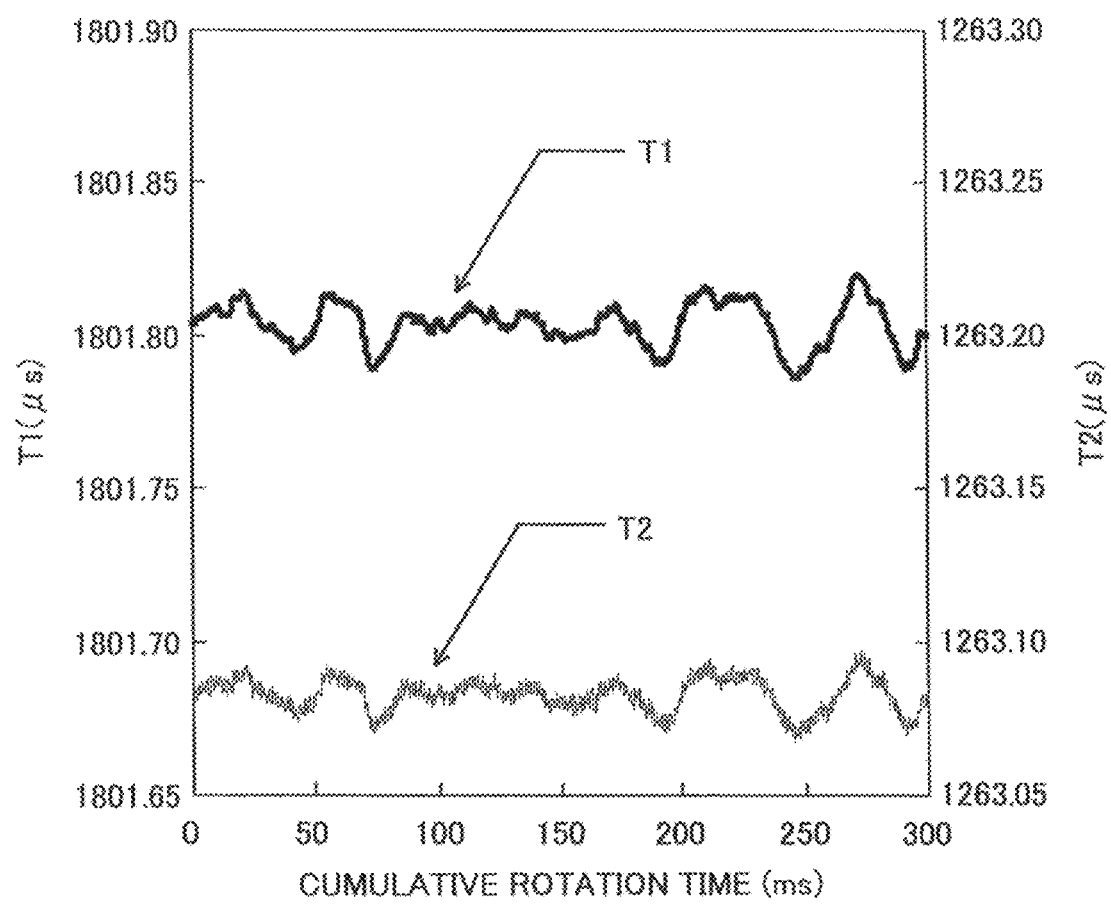
FIG. 11 is a diagram for explaining measurement data of time T1 and time T2.

Conventionally, it was considered that both the time T1 and the time T2 have a constant value. The inventors have measured the time T1 and the time T2 experimentally. FIG. 11 shows the measurement data (1000 measurement data pieces) of T1 until the cumulative rotation time of the rotary polygon mirror reaches 300 ms, and the measurement data (1000 measurement data pieces) of T2 measured in sync with the measurement of T1.

As is apparent from FIG. 11, T1 and T2 were not constant and both were varied. It can be understood that variations in T1 and T2 are due to the rotation irregularity of the rotary polygon mirror.

In this example, the average of the 1000 measurement data pieces of T1 was 1801.804 μs and the average of the 1000 measurement data pieces of T2 was 1263.083 μs. Even if the cumulative rotation time is extended beyond 300 ms, there was no significant difference in the values of these averages.

In the following, "T1ave" denotes the average of plural measurement data pieces of T1, and "T2ave" denotes the average of plural measurement data pieces of T2. A difference $\Delta T1$ of T1 and T1ave, and a difference $\Delta T2$ of T2 and T2ave are represented by the following formulas:

$$\Delta T1 = T1 - T1\text{ave} \tag{1}$$

$$\Delta T2 = T2 - T2\text{ave} \tag{2}$$

In addition, a difference $\Delta T2a$ of T2 and T2ave when the T2ave is corrected by considering the rotation irregularity of the rotary polygon mirror is represented by the following formula.

$$\Delta T2a = T2 - T2\text{ave}(T1 - /T1\text{ave}) \tag{3}$$

Figure 12:
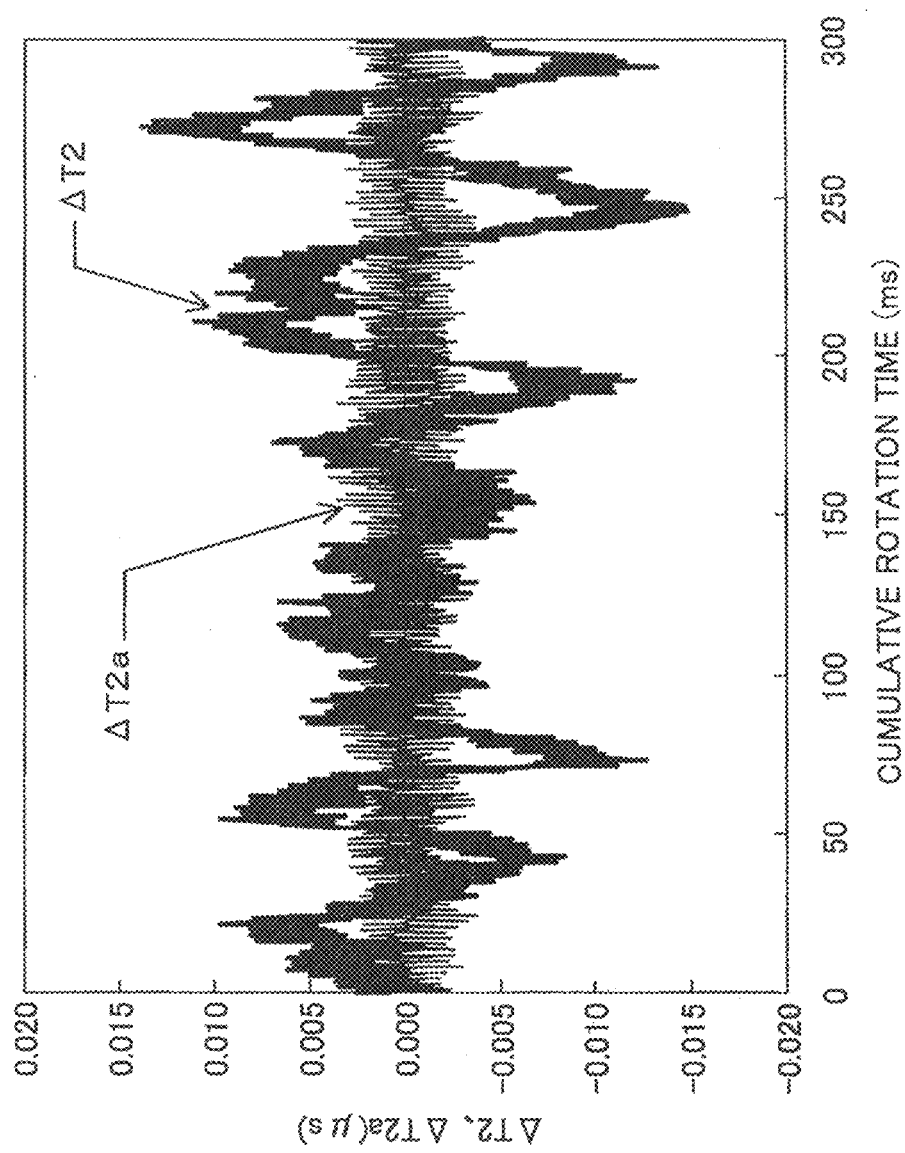

FIG. 12 shows the computation results of $\Delta T2$ and $\Delta T2a$ described above. As shown in FIG. 12, the variations of ±0.015 μs (=±15 ns) were present for $\Delta T2$, and they were reduced to the variations of ±0.004 μs (=±4 ns) which were present for $\Delta T2a$.

According to this experiment, it can be understood that 73% (=1−4/15) of the variations in T2 were due to the rotation irregularity. It was confirmed that the variations in T2 are greatly dependent on the variations in T1 (rotation irregularity).

If T2 is set up to meet the condition $\Delta T2a = 0$ (i.e., the following equation (4) is given), the influence of the rotation irregularity in T2 can be reduced.

$$T2 - T2\text{ave}(T1/T1\text{ave}) = 0 \tag{4}$$

If the above equation (4) is modified, the following equation (5) is obtained.

$$T2 = (T2\text{ave}/T1\text{ave})T1 \tag{5}$$

According to the experiments, T1ave=1801.804 μs and T2ave=1263.083 μs, the following formula (6) is obtained from the above equation (5):

$$T2 = 0.7010 \times T1 \tag{6}$$

Figure 13B:
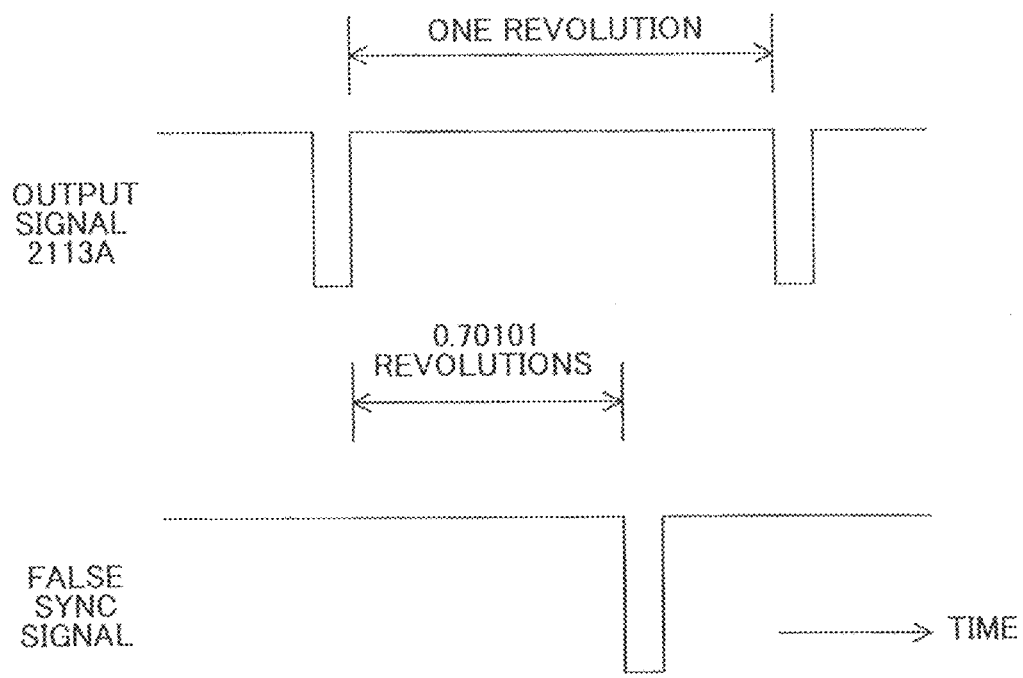

This shows that, if the false sync signal is changed from low level to high level at the timing of 0.70101 revolutions of the rotary polygon mirror after the reception of the light beam reflected on one deflection reflective surface (e.g., the face-1 in FIG. 10) by the sync detecting sensor 2113A, the influence of the rotation irregularity can be prevented (see FIG. 13A and FIG. 13B).

However, in the image forming device, no sync detecting sensor corresponding to the photoconductor drum 2030*a* is arranged, and the measurement data of T2ave cannot be obtained.

To eliminate the problem, the above equation (5) is rewritten into the following equation (7) using a coefficient k.

$$T2 = k \times T1 \quad (7)$$

Figure 14:
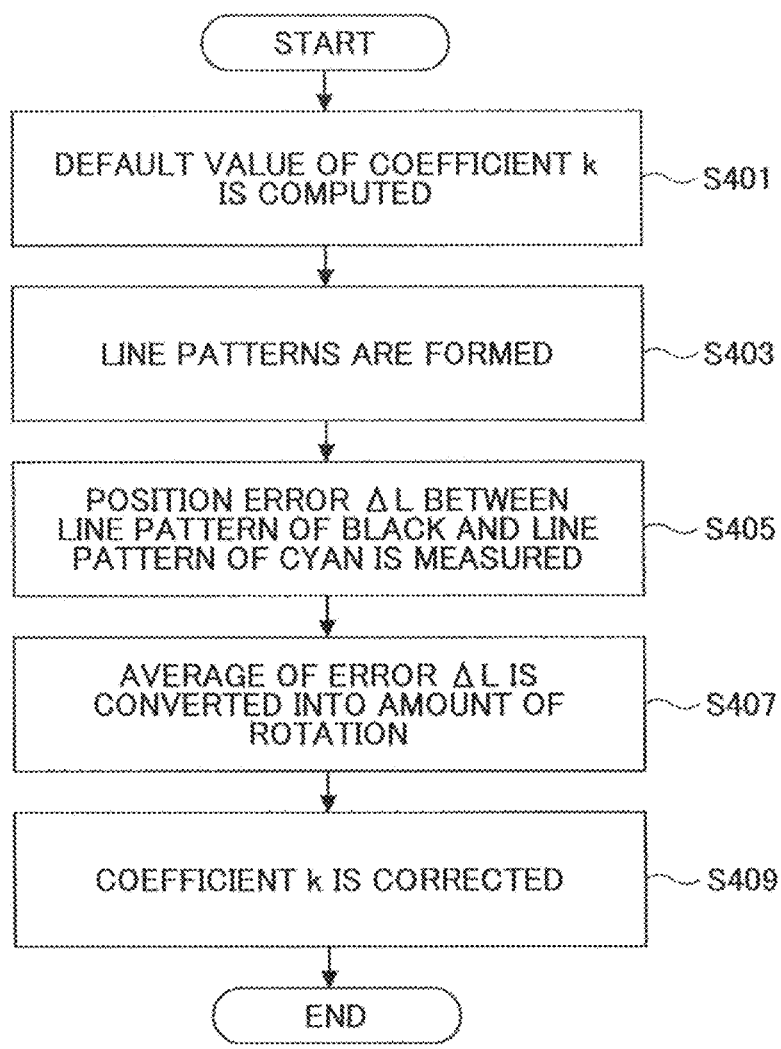
FIG. 14 is a flowchart for explaining a method of correcting a coefficient k.

FIG. 14 is a flowchart for explaining a method of determining a coefficient k in the image forming device.

As shown in FIG. 14, at step S401, a default value of the coefficient k indicating a time for one revolution of the rotary polygon mirror from a time the sync detecting sensor 2113A receives the light beam reflected on one deflection reflective surface (for example, the face-1) to a time the above-described false sync detecting sensor receives the light beam reflected on the deflection reflective surface is computed.

Figure 15:
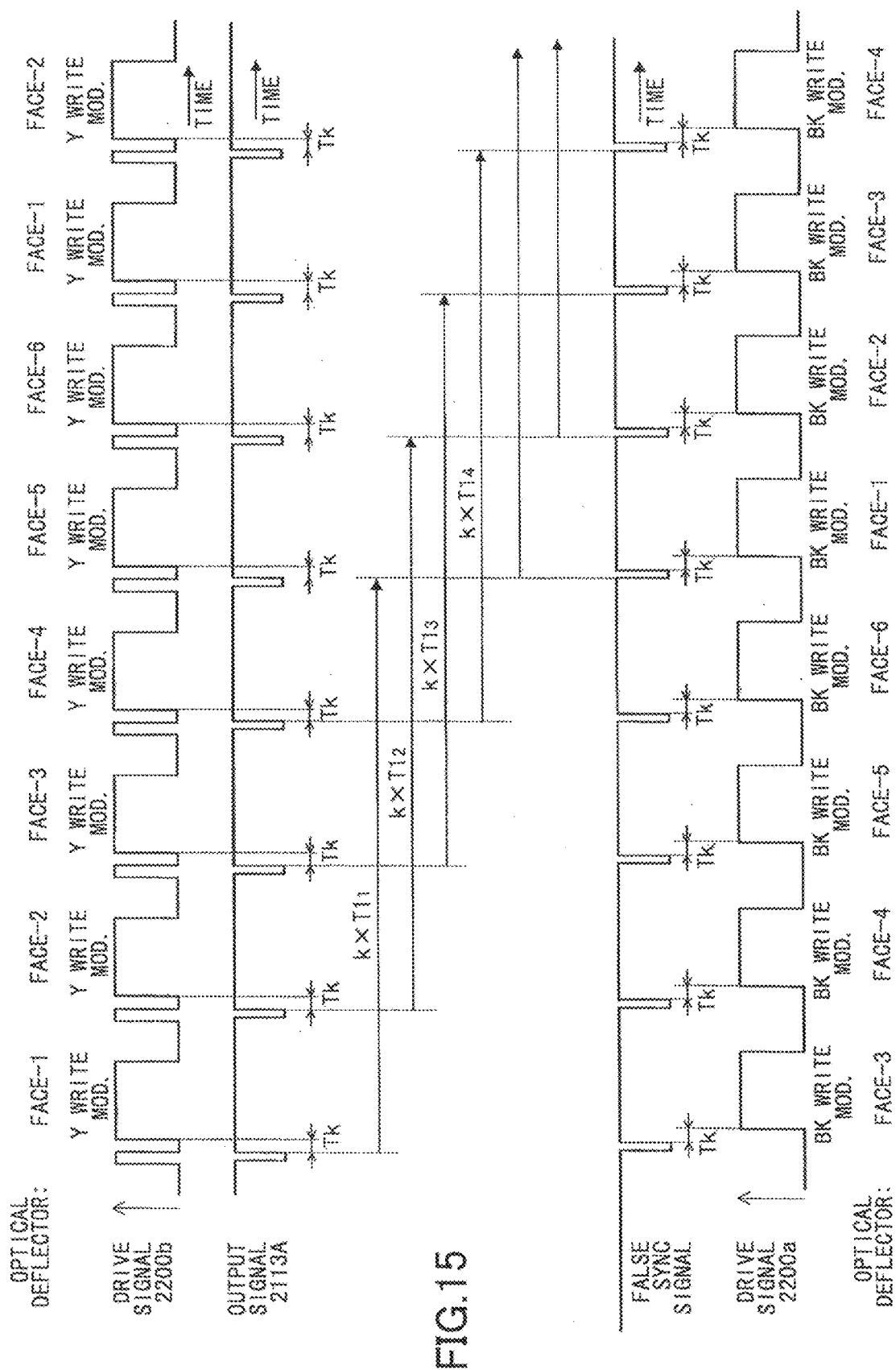
FIG. 15 is a diagram for explaining the method of correcting the coefficient k.
Figure 16:
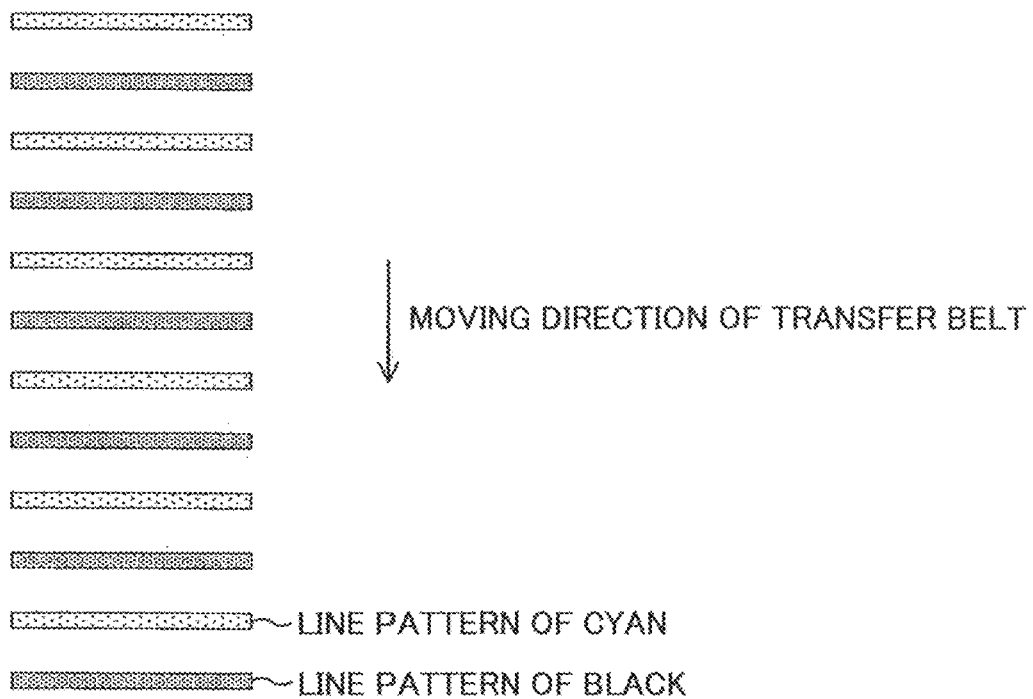
FIG. 16 is a diagram for explaining an example of line patterns.

At step S403, as shown in FIG. 15, a false sync signal is generated using the default value of the coefficient k, and the line patterns (see FIG. 16) which are the same as those used in the known color matching correction process (see Japanese Laid-Open Patent Publication No. 2011-197134) are formed. In FIG. 15, $T1_1$-$T1_4$ denote the measurement values of T1 obtained at the preceding cycle.

Figure 17:
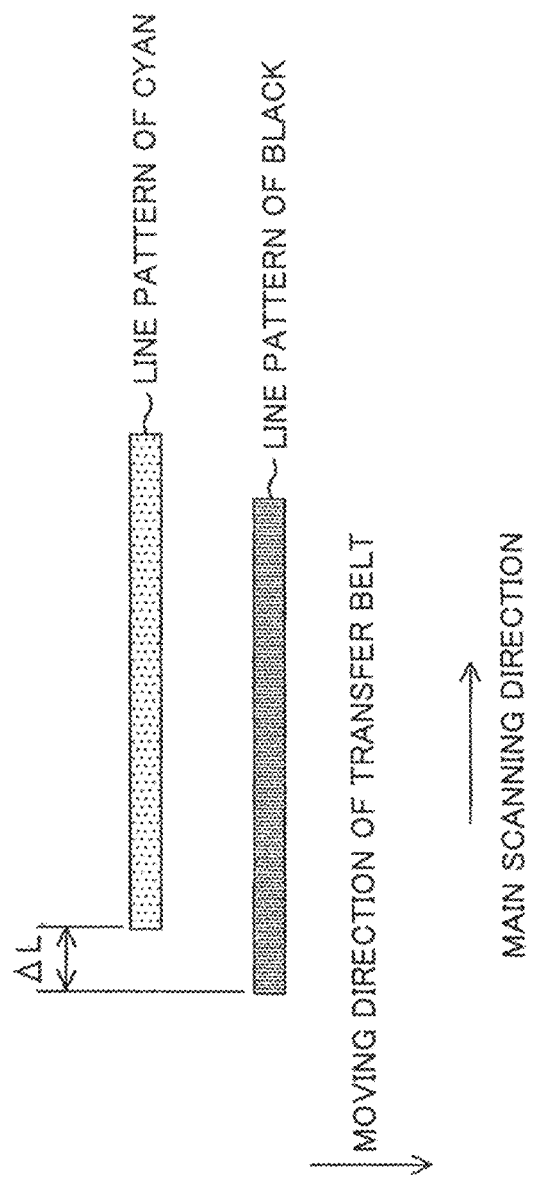
FIG. 17 is a diagram for explaining an amount of deviation ΔL of the line patterns.

At step S405, a difference $\Delta L$ (see FIG. 17) in the position in the main scanning direction between the line pattern of black and the line pattern of cyan is measured using the sensors (not shown) used in the above-mentioned known color matching correction process.

At step S407, the average of the above-mentioned $\Delta L$ is converted into an amount of rotation of the polygon mirror.

At step S409, the coefficient k is corrected based on the amounts of rotation so as to set the average of the above-mentioned $\Delta L$ to 0. The corrected coefficient k is used as the coefficient k of the above equation (7) for the image forming device.

Upon power-up, the printer control device 2090 performs an image process control procedure if any of the following events take place: (1) the stop time of the photoconductor drum is over 6 hours; (2) the inside temperature of the device has changed by 10 degrees C. or more; (3) the relative humidity of the device has changed by 50% or more; (4) the number of printed sheets has reached a predetermined number in the printing job; (5) the number of times of rotation of the developing roller has reached a predetermined number; and (6) the total running distance of the transfer belt has reached a predetermined distance.

Hence, the printer control device 2090 may be configured to perform the above method of determining the coefficient k during execution of the image process control procedure. In this case, the corrected coefficient k obtained at the preceding cycle may be used, instead of the default value. Thereby, the false sync signal can be generated with a higher level of accuracy.

When the above-mentioned second method is used, the false sync signal can be generated with a higher level of accuracy by taking the rotation irregularity into consideration.

Figure 18:
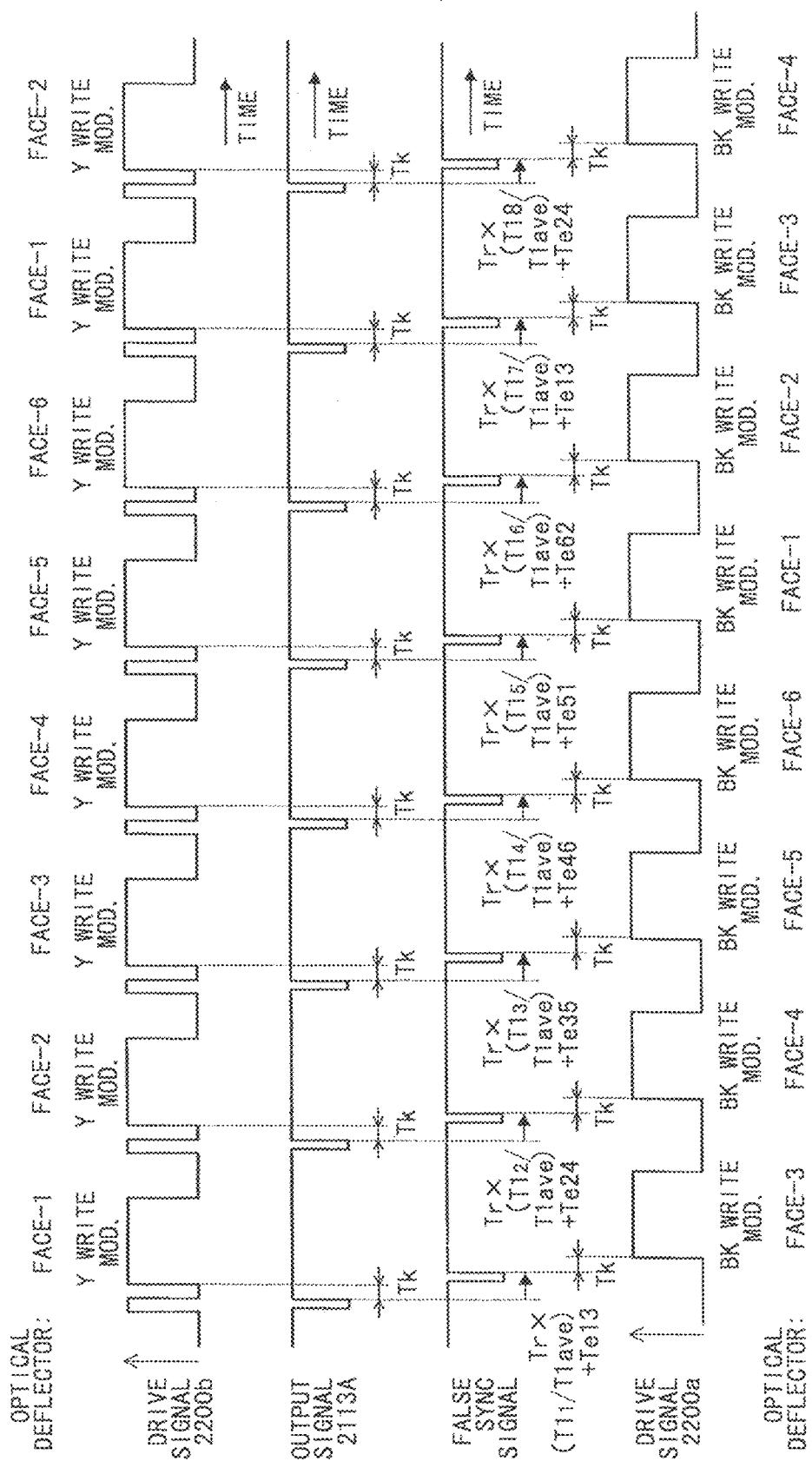
FIG. 18 is a diagram for explaining correction of the rotation irregularity by a second method.

As shown in FIG. 18, Tr×(T1/T1ave) is used instead of Tr. In FIG. 18, $T1_1$-$T1_8$ denote the measurement values of T1 obtained at the preceding cycle.

It is expected that, due to a detection error of the sync detecting sensor 2113A or the like, an unusual value is included in the measured values of T1. When the measurement values of T1 obtained at the preceding cycle do not fall within a predetermined range, the measurement values of T1 obtained before the preceding cycle may be used. Alternatively, plural sets of the measurement values of T1 for plural cycles may be stored as history information, and the average of such values may be used.

Figure 19:
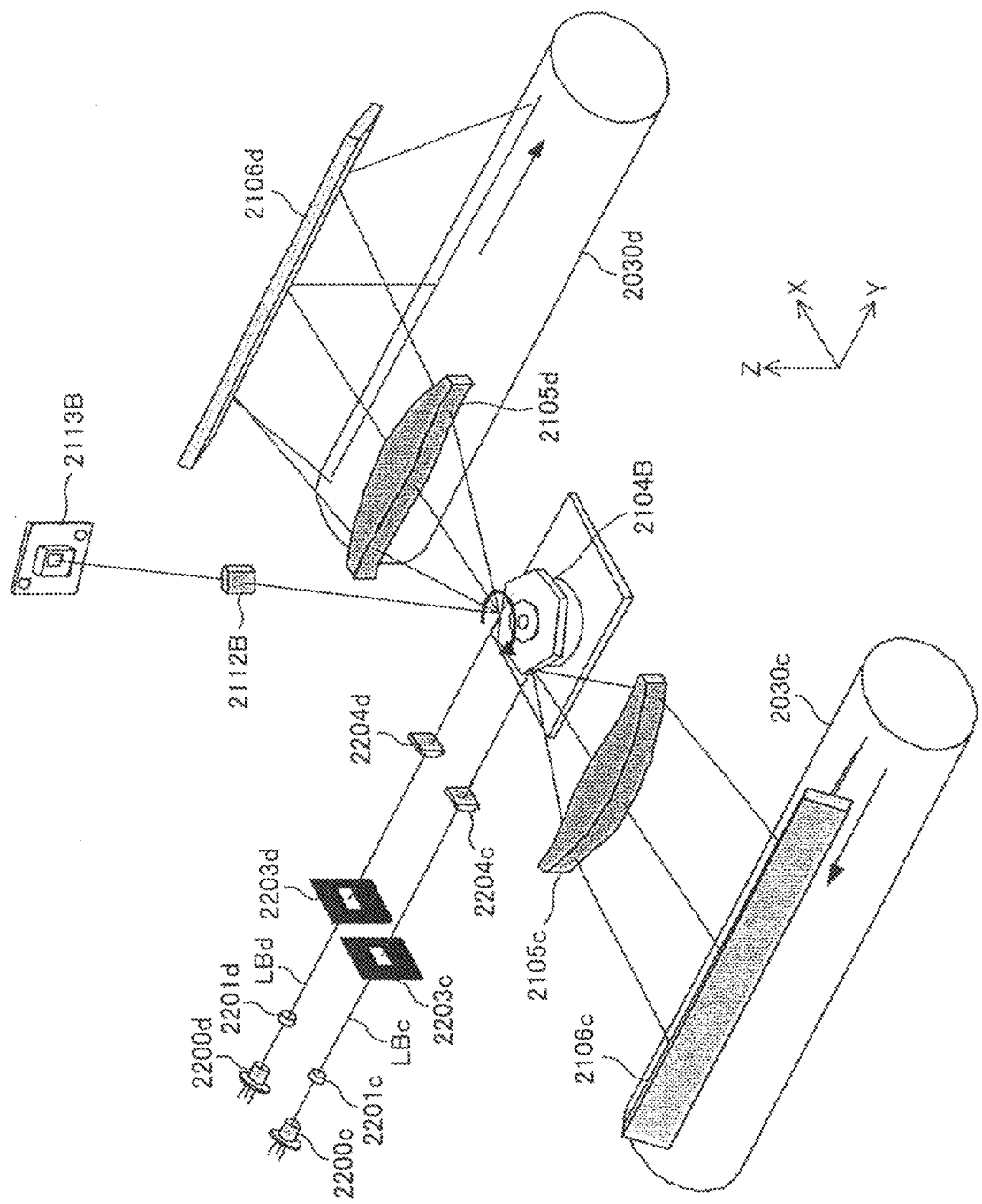
FIG. 19 is a diagram for explaining an optical scanning apparatus in FIG. 1.

Next, the composition of the optical scanning apparatus 2010B will be described. As shown in FIG. 19, this optical scanning apparatus 2010B includes two light sources (2200*c*, 2200*d*), two coupling lenses (2201*c*, 2201*d*), two aperture plates (2203*c*, 2203*d*), two cylindrical lenses (2204*c*, 2204*d*), a polygon mirror 2104B, two scanning lenses (2105*c*, 2105*d*), two feedback mirrors (2106*c*, 2106*d*), a focusing lens 2112B, a sync detecting sensor 2113B, and a non-illustrated scanning control device B.

Each light source includes a semiconductor laser and a drive circuit which drives the semiconductor laser. Each drive circuit is controlled by the scanning control device B.

In the following, a light beam emitted from the light source 2200*c* is called "light beam LBc", and a light beam emitted from the light source 2200*d* is called "light beam LBd".

The coupling lens 2201*c* converts the light beam LBc emitted from the light source 2200*c* into a generally parallel light beam. The coupling lens 2201*d* converts the light beam LBd emitted from the light source 2200*d* into a generally parallel light beam.

The aperture plate 2203*c* has an opening and adjusts the beam diameter of the light beam LBc from the coupling lens 2201*c*. The aperture plate 2203*d* has an opening and adjusts the beam diameter of the light beam LBd from the coupling lens 2201*d*.

The cylindrical lens 2204*c* converges the light beam LBc having passed through the opening of aperture plate 2203*c* with respect to the Z axis direction near the deflection reflective surface of the polygon mirror 2104B. The cylindrical lens 2204*d* converges the light beam LBd passed through the opening of the aperture plate 2203*d* with respect to the Z axis direction near the deflection reflective surface of the polygon mirror 2104B. The optical system arranged between each light source and the polygon mirror 2104B is also called the optical system in front of the deflector.

The polygon mirror 2104B is a six-face mirror as a rotary polygon mirror, and each mirror surface serves as a deflection reflective surface. This polygon mirror is uniformly rotated around the center of the rotating shaft of the polygon mirror 2104B parallel to the Z axis direction, and each face of the polygon mirror deflects the light from each cylindrical lens at a constant angular velocity. In the following, it is assumed that the polygon mirror is rotated clockwise.

The light beam LBc from the cylindrical lens 2204*c* enters the deflection reflective surface located on the −X side of the rotating shaft of the polygon mirror 2104B, and the light beam LBd from the cylindrical lens 2204*d* enters the deflection reflective surface located on the +X side of the rotating shaft.

The scanning lens 2105*c* is located on the −X side of the polygon mirror 2104B, and arranged on the optical path of the light beam LBc deflected by the polygon mirror 2104B.

The feedback mirror 2106*c* guides the light beam LBc from the scanning lens 2105*c* to the photoconductor drum 2030*c* by reflection. That is, the surface of the photoconductor drum 2030*c* is irradiated with the light beam LBc, and a light spot is formed on the photoconductor drum 2030*c* surface.

The scanning lens 2105*d* is located on the +X side of the polygon mirror 2104B, and arranged on the optical path of the light beam LBd deflected by the polygon mirror 2104B.

The feedback mirror 2106d guides the light beam LBd from the scanning lens 2105d to the photoconductor drum 2030d by reflection. That is, the surface of the photoconductor drum 2030d is irradiated with the light beam LBd and a light spot is formed on the photoconductor drum 2030d surface.

The light spot on the surface of each photoconductor drum is moved in the longitudinal direction of the photoconductor drum in accordance with the rotation of the polygon mirror 2104B. The moving direction of the light spot at this time is called main scanning direction, and the direction of rotation of the photoconductor drum is called sub-scanning direction.

The sync detecting sensor 2113B is arranged in a position which receives, through the focusing lens 2112B, a light beam directed to the outside of the effective scanning area of the photoconductor drum 2030d. The sync detecting sensor 2113B outputs a sync detection signal to the scanning control device B.

The scanning control device B determines a write start timing for the surface of the photoconductor drum 2030d based on the sync detection signal output from the sync detecting sensor 2113B.

Similar to the scanning control device A, the scanning control device B generates a false sync signal based on a measured value of a time for one revolution of the rotary polygon mirror of the sync detection signal output from the sync detecting sensor 2113B, and determines the write start timing for the surface of the photoconductor drum 2030d.

As described above, according to the foregoing embodiment, the optical scanning apparatus includes two light sources, two coupling lenses, two aperture plates, two cylindrical lenses, a polygon mirror, two scanning lenses, two feedback mirrors, a focusing lens, a sync detecting sensor, and a scanning control device. The scanning control device determines the write start timing for the surface of the photoconductor drum corresponding to the sync detecting sensor based on the output of the sync detecting sensor. The scanning control device determines the write start timing for the surface of the photoconductor drum with which no sync detecting sensor is arranged, based on the output of the sync detecting sensor and the measured value of the time for one revolution of the rotary polygon mirror.

In this case, by taking into consideration the rotation irregularity of the polygon mirror, the write start timing for the surface of the photoconductor drum with which no sync detecting sensor is arranged can be determined. It is possible to determine the write start timing for the photoconductor drum with which no sync detecting sensor is arranged with a high level of accuracy. As a result, the variations of the write start position on the target surface can be reduced.

The color printer 2000 is provided with the optical scanning apparatus 2010A and the optical scanning apparatus 2010B. As a result, the color printer 2000 can increase the image quality.

Figure 20:
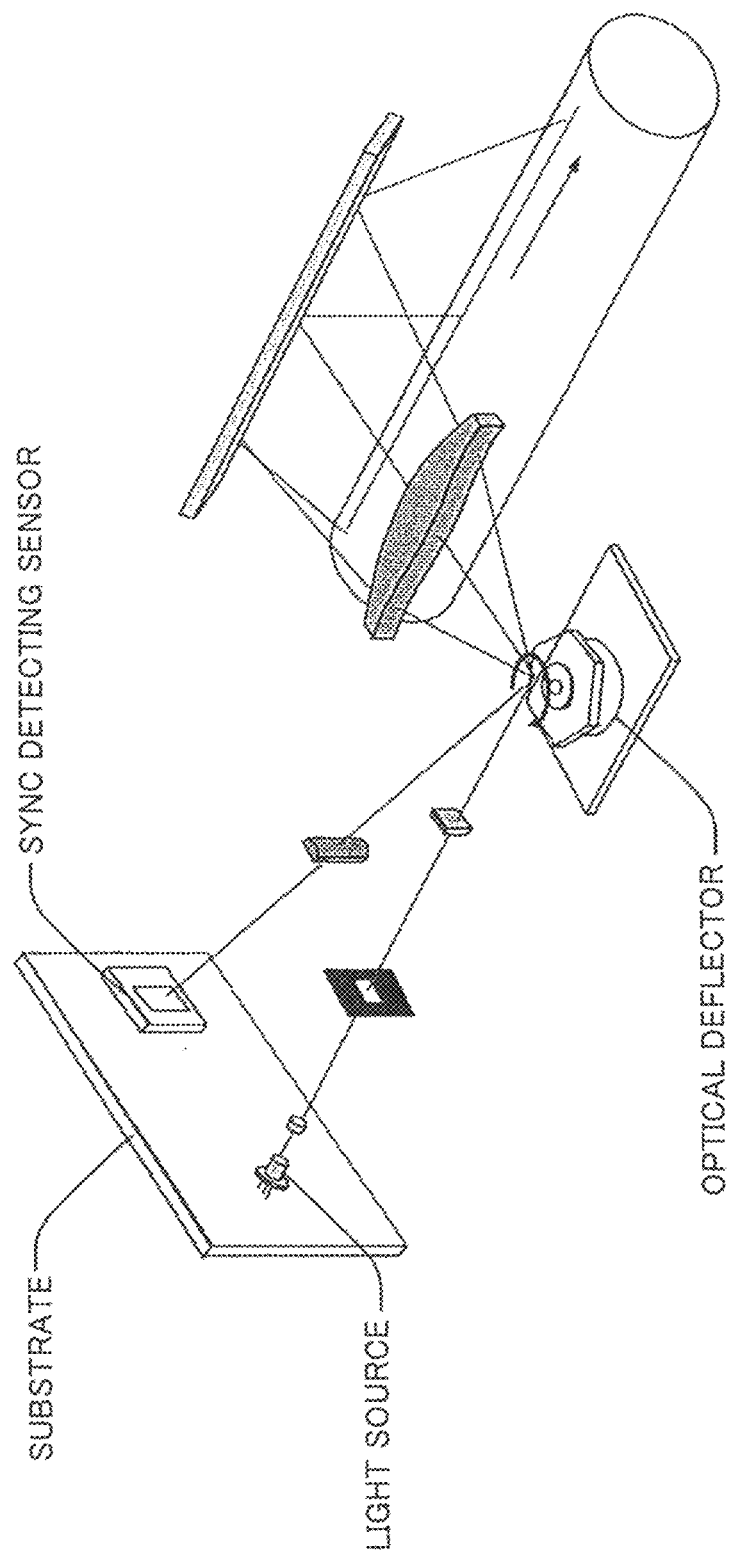
FIG. 20 is a diagram for explaining a case where a light source and a sync detecting sensor are mounted on the same substrate.
Figure 21:
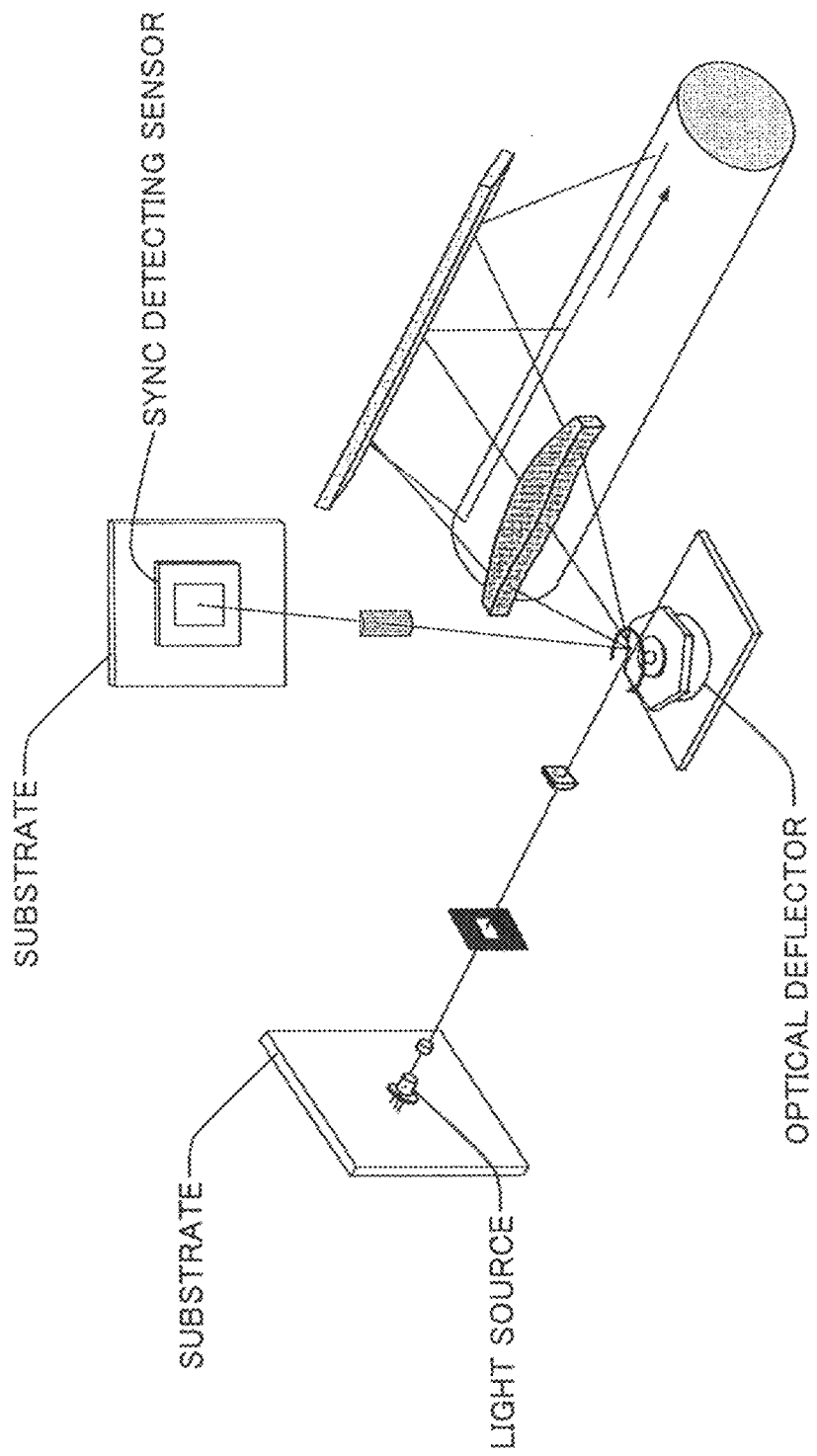
FIG. 21 is a diagram for explaining a case where a light source and a sync detecting sensor are mounted on different substrates.
Figure 22A:
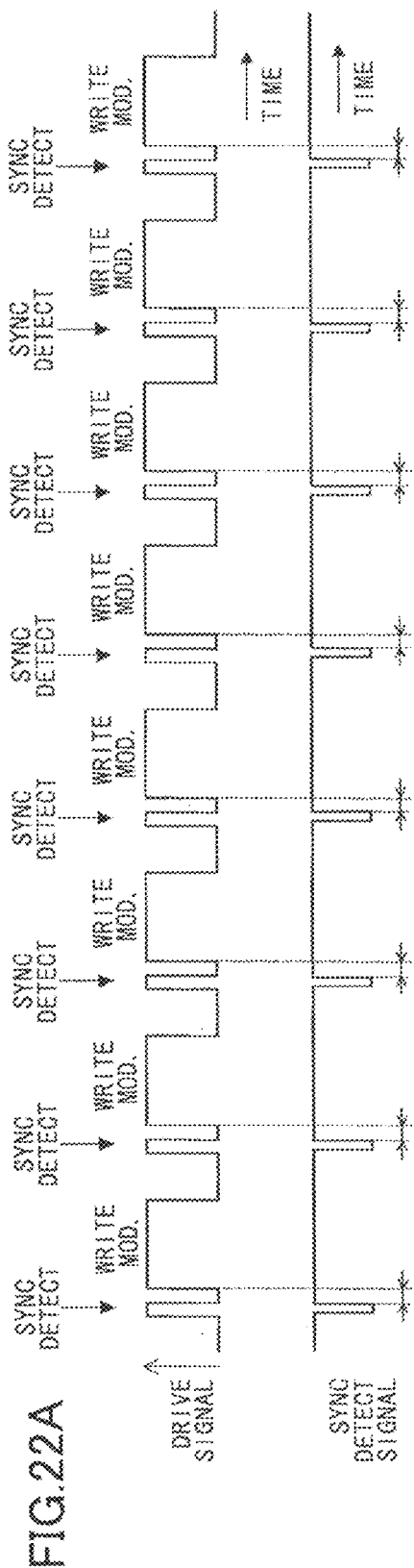
FIG. 22A is a timing chart for explaining the case of FIG. 21.
Figure 22B:
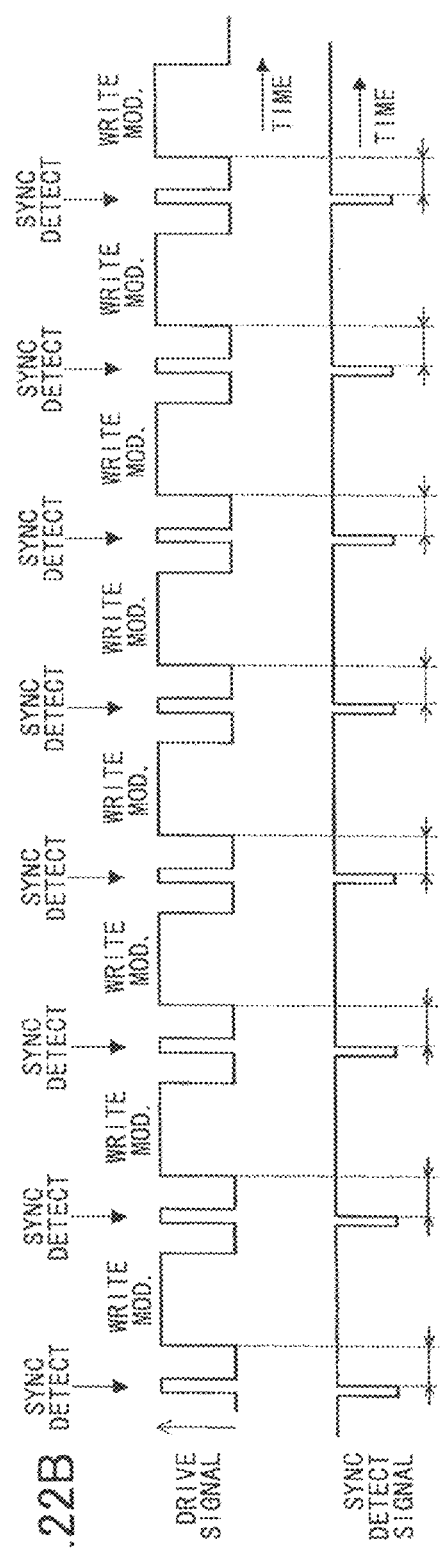
FIG. 22B is a timing chart for explaining the case of FIG. 20.

For the purpose of the cost reduction or miniaturization, a sync detecting sensor may be mounted on a substrate on which the light source is mounted (see FIG. 20). In this case, the time from the reception of a light beam by the sync detecting sensor to the write start timing is larger than that in the case where a sync detecting sensor is mounted on another substrate different from the substrate on which the light source is mounted (see FIG. 21), as shown in FIG. 22A and FIG. 22B. The timing chart of FIG. 22A illustrates the case of FIG. 21, and the timing chart of FIG. 22B illustrates the case of FIG. 20.

The case in which the sync detecting sensor is mounted on the substrate on which the light source is mounted is susceptible to the influence of rotation irregularity, and there is a possibility that the write start position is shifted. In this case, the time from the reception of the light beam at the sync detecting sensor to the write start timing is corrected by considering the rotation irregularity as in the above-mentioned embodiment, and the variations of the write start position can be reduced.

Figure 23:
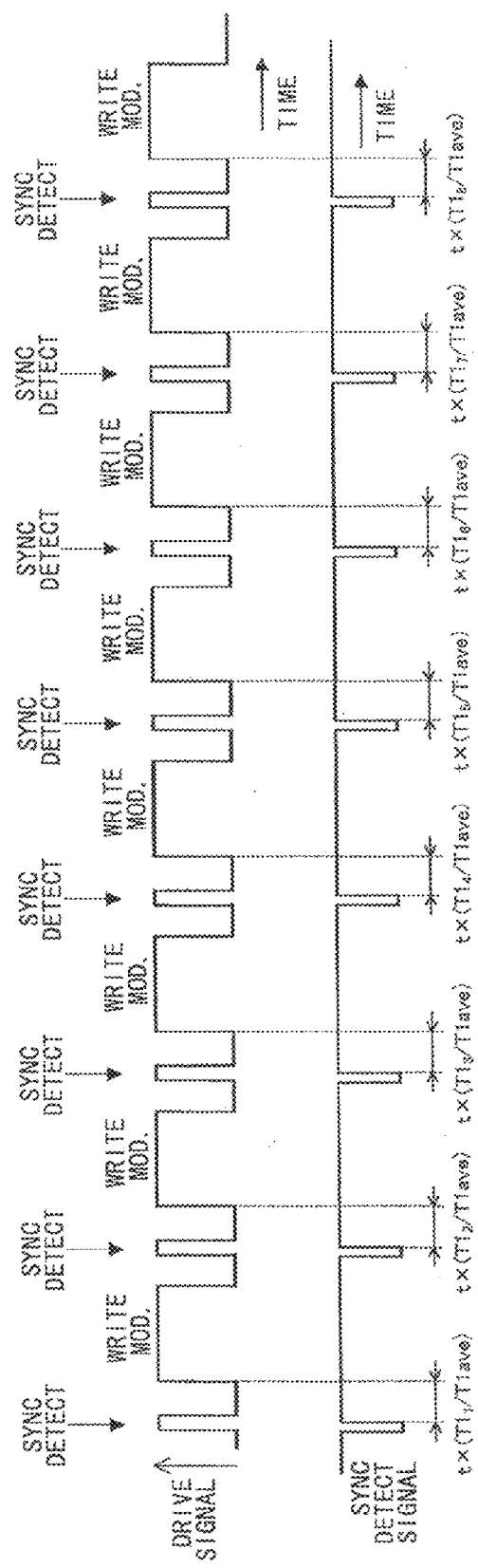
FIG. 23 is a timing chart for explaining a time from a sync detection instant to a write start instant when taking the rotation irregularity into consideration.

Specifically, as shown in FIG. 23, "tx(T1/T1ave)" is used as the time from the reception of the light beam at the sync detecting sensor to the write start timing, instead of the time "t" computed according to the related art. In FIG. 23, $T1_1$-$T1_8$ denote the measurement values of T1 obtained at the preceding cycle.

Alternatively, a surface emission-type laser array having plural emitting parts may be used as the semiconductor laser in each light source in the above-mentioned embodiment.

Alternatively, the optical scanning apparatus 2010A and the optical scanning apparatus 2010B in the above-mentioned embodiment may be unified.

In the above-mentioned embodiment, the color printer 2000 including the four photoconductor drums has been explained as an example of the image forming device of the present disclosure. However, the present disclosure is not limited to this embodiment. For example, the image forming device of the present disclosure is applicable to a printer having two photoconductor drums or a printer having five photoconductor drums.

In the above-mentioned embodiment, the case where the optical scanning apparatus is used in the color printer has been explained as an example of the present disclosure. However, the present disclosure is not limited to this embodiment. For example, the present disclosure is applicable to other image forming devices, such as a copying machine, a facsimile machine, or a multi-function peripheral.

Figure 24:
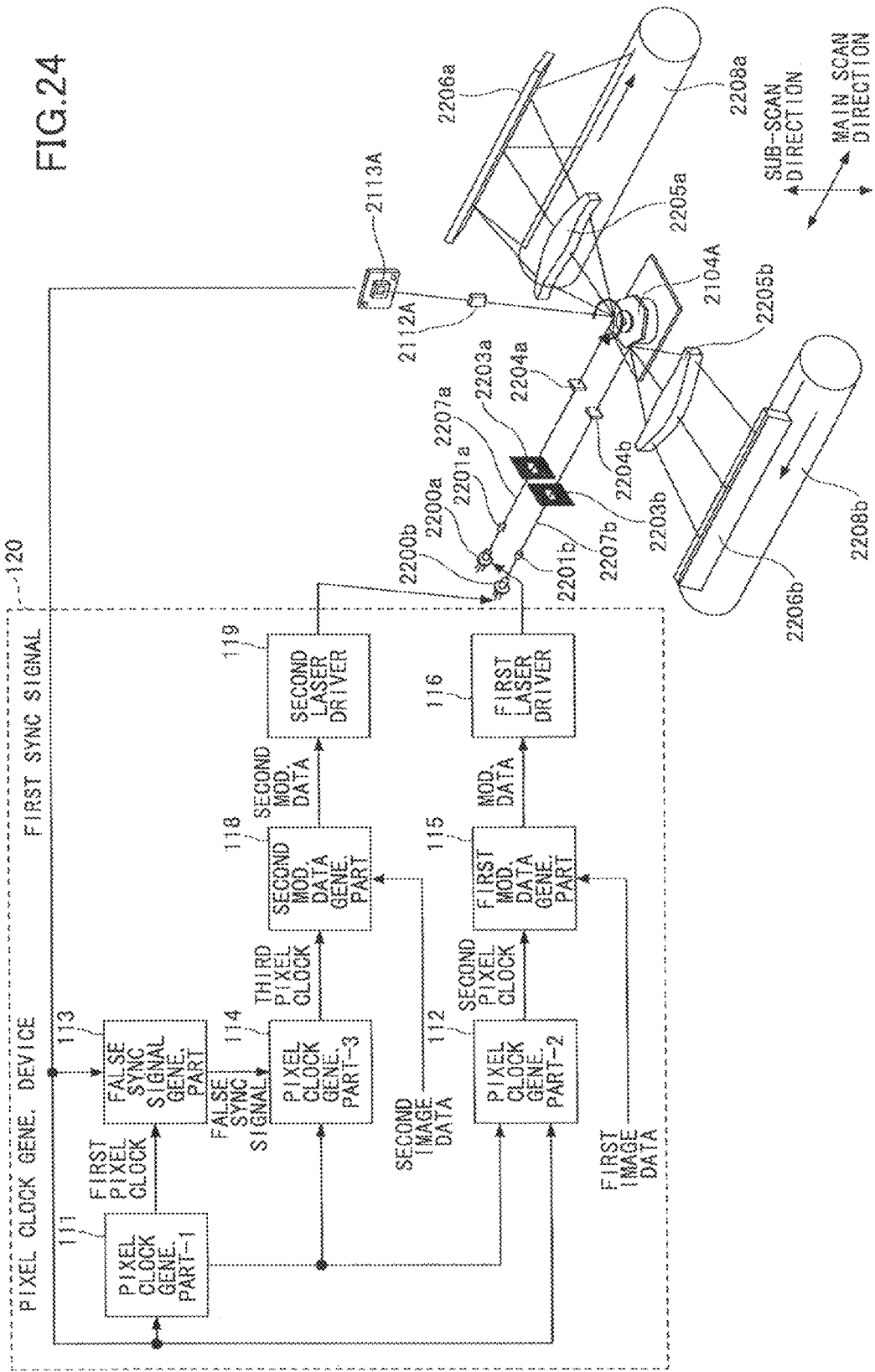
FIG. 24 is a diagram showing the composition of the image forming device of the first embodiment.

Next, a first embodiment of the present disclosure will be described. FIG. 24 is a diagram showing the composition of the image forming device of the first embodiment of the present disclosure.

As shown in FIG. 24, this image forming device includes two light sources (2200a, 2200b), two coupling lenses (2201a, 2201b), two aperture plates (2203a, 2203b), two cylindrical lenses (2204a, 2204b), a polygon mirror (2104A), two scanning lenses (2205a, 2205b), two feedback mirrors (2206a, 2206b), two photoconductors 2208a and 2208b, a focusing lens 2112A, a sync detecting sensor 2113A, and a pixel clock generating device 120.

The pixel clock generating device 120 includes a pixel clock generating part-1 (111), a false sync signal generating part 113, a pixel clock generating part-2 (112), a pixel clock generating part-3 (114), a first modulation data generating part 115, a second modulation data generating part 118, a first laser driver 116, and a second laser driver 119.

A laser incident light beam 2207a from the light source 2200a enters the polygon mirror 2104A, and in sync with the rotation of the polygon mirror 2104A, passes through the scanning lens 2205a, so that the surface of the photoconductor 2208a is scanned by the light beam. On the other hand, a laser incident light beam 2207b from the light source 2200b enters the polygon mirror 2104A, and in sync with the rotation of the polygon mirror 2104A, passes through the scanning lens 2205b, so that the surface of the photoconductor 2208b is scanned by the light beam. Thereby, an electrostatic latent image according to the output of the light source 2200a is formed on the surface of photoconductor 2208a and an electrostatic latent image according to the output of the light source 2200b is formed on the surface of photoconductor 2208b.

The sync detecting sensor 2113A is disposed at an end portion of the photoconductor 2208a. The laser beam reflected by the polygon mirror 2104A enters the sync detecting sensor 2113A before the scanning of a scanning line by the laser beam is performed on the surface of the photoconductor 2208a. The sync detecting sensor 2113A detects the timing of a start of the scanning. The timing of the start of the scanning is detected by the sync detecting sensor 2113A is supplied to the pixel clock generating part-1 (111) and the false sync signal generating part 113 of the pixel clock generating device 120 as a first sync signal that is present periodically in sync with the scanning of the photoconductor.

The pixel clock generating part-1 (111) generates a first pixel clock and a frequency correction value based on the first sync signal. The false sync signal generating part 113 generates a false sync signal based on the first sync signal and the first pixel clock. The pixel clock generating part-2 (112) corrects the initial frequency setting value by the frequency correction value and generates a second pixel clock in sync with the first sync signal. The pixel clock generating part-3 (114) corrects the initial frequency setting value by the frequency correction value and generates a third pixel clock in sync with the false sync signal.

Based on the first image data, the first modulation data generating part 115 outputs first modulation data to the first laser driver 116, the first modulation data being synchronized with the second pixel clock. The first laser driver 116 drives the light source 2200a according to the first modulation data, and the light source 2200a emits a laser beam. Based on the second image data, the second modulation data generating part 118 outputs second modulation data to the second laser driver 119, the second modulation data being synchronized with the third pixel clock. The second laser driver 119 drives the light source 2200b according to the second modulation data, and the light source 2200b emits a laser beam.

Figure 25:
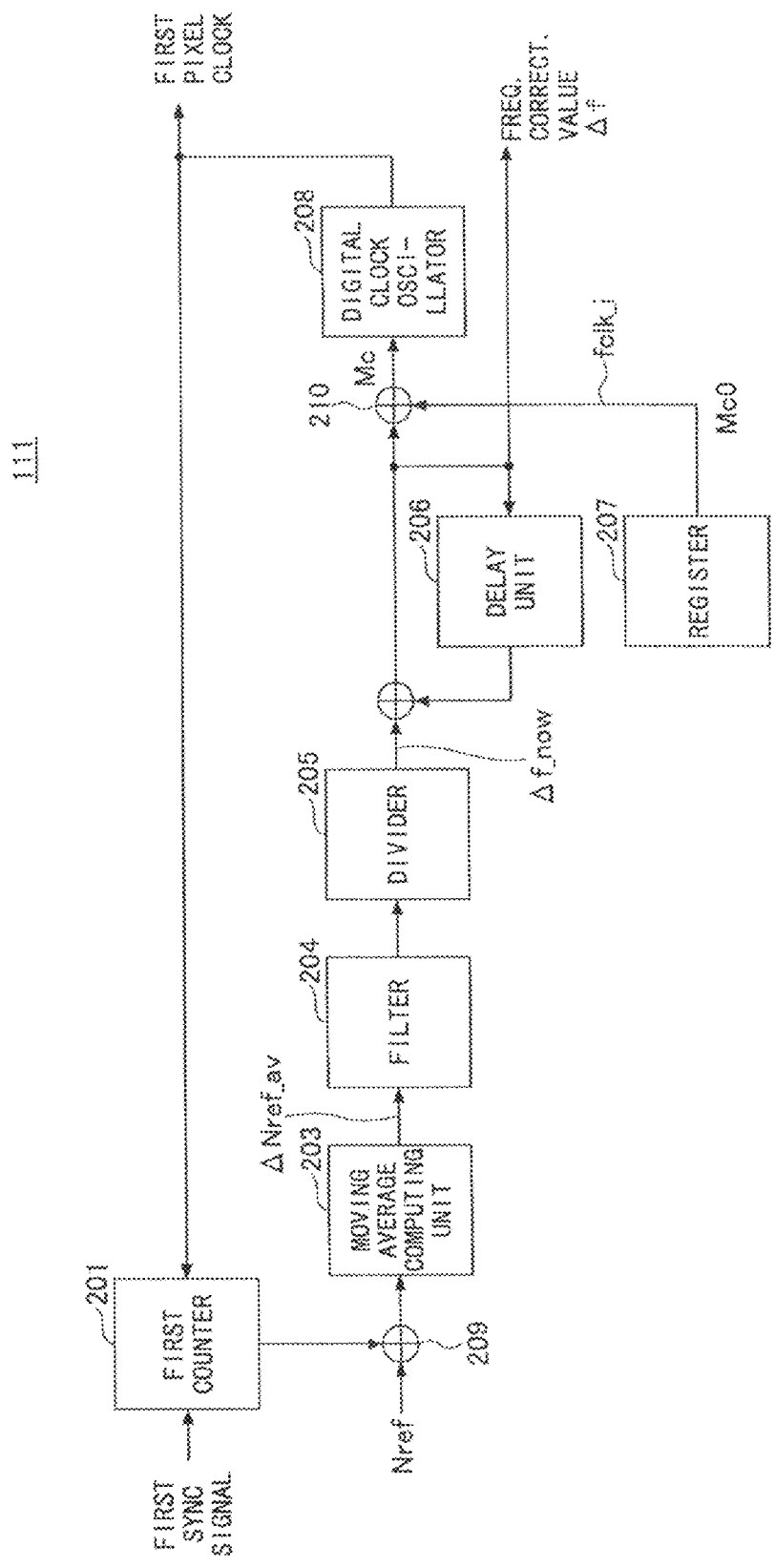
FIG. 25 is a block diagram showing the composition of a pixel clock generating part-1.

FIG. 25 is a block diagram showing the composition of the pixel clock generating part-1 (111).

As shown in FIG. 25, the pixel clock generating part-1 (111) includes a first counter 201, a moving-average computing unit 203, a filter 204, a divider 205, a delay unit 206, a register 207, a digital clock oscillator 208, a comparator 209, and an adder 210.

The first counter 201 outputs a counted value of the first pixel clock indicating the interval of the first sync signal corresponding to the interval in which one main scanning line for the polygon mirror's one face amount is scanned. The comparator 209 compares the counted value with a reference number Nref of the polygon mirror's one face amount, and supplies a difference of the counted value and the reference number Nref to the moving-average computing unit 203.

Assuming that $E_R$ denotes a ratio of effective scanning period, v denotes a photoconductor linear velocity, L denotes an effective write width, $\rho_m$ denotes a picture element density of main scanning direction, $\rho_s$ denotes a picture element density of sub-scanning direction, and M denotes the number of writing beams, the reference number Nref for the polygon mirror's one face amount is represented by the following formula:

$$Nref = \frac{vL}{E_R} \frac{\rho_m \rho_s}{25.4^2 M}$$

For example, when the number of the faces of the polygon mirror is four, the moving-average computing unit 203 computes the moving average of the difference values for the polygon mirror's four face amount. The computed value of the moving average of the difference values for the polygon mirror's four face amount is smoothed by the filter 204, and divided by Nref at the divider 205, so that it is converted into the error Δf now per period of one pixel. The delay unit 206 adds the error Δf now per period of one pixel to the frequency correction value Δf as a control value. The adder 210 outputs the sum value of the frequency correction value Δf and the initial frequency fclk_i stored in the register 207. Then, the first pixel clock is generated by the digital clock oscillator 208. By this feedback control, the error per period of one pixel is made to fall within a predetermined range. When the error is within the predetermined range, the frequency correction value Δf at that time is supplied to the pixel clock generating part-2 (112) and the pixel clock generating part-3 (114).

The value of Nref and the initial frequency fclk_i of the register 207 may be determined by the ratio $E_R$ of effective scanning period, the photoconductor linear velocity v, the effective write width L, the picture element density $\rho_m$ of main scanning direction, the picture element density $\rho_s$ of sub-scanning direction, and the writing beam number M of the image forming device concerned.

Figure 26:
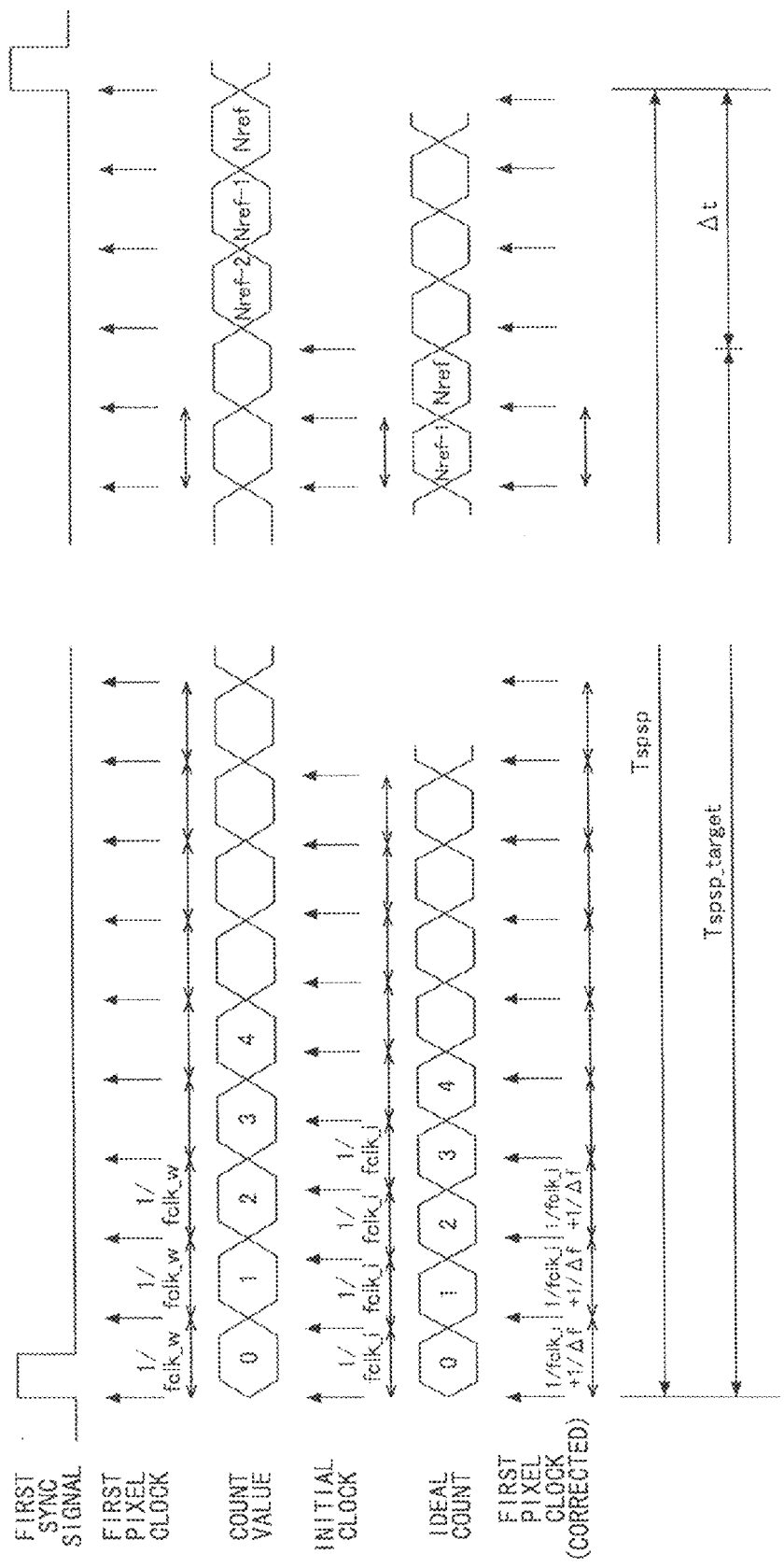
FIG. 26 is a timing chart for explaining operation of the pixel clock generating part-1.

FIG. 26 is a timing chart for explaining operation of the pixel clock generating part-1 (111).

In the example of FIG. 26, the interval Tspsp of the first sync signal for the polygon mirror's one face received from the PD 110 is varied as the rotational speed of the polygon mirror 100 and an error arises. If fclk_w denotes the frequency of the first control clock as a control value, the period of the first pixel clock is represented by 1/fclk_w. The frequency fclk_w is controlled to make the counted value of the first pixel clock equal to the reference number Nref. At this time, the following relationship is met.

$Tspsp = Nref/fclk\_w$

On the other hand, if Tspsp_target denotes the target period determined for each model of the image forming device and fclk_i denotes the initial frequency, the following relationship is met.

$Tspsp\_target = Nref/fclk\_i$

If Δf denotes the error of the frequency, the following condition is met.

$1/\Delta f = 1/fclk\_w - 1/fclk\_i$

The time error Δt by the error of the scanning speed is $\Delta t = Tspsp - Tspsp\_target$ $= Nref(1 - /fclk\_w - 1/fclk\_i)$ $= Nref/\Delta f.$ Namely, it is possible to correct the frequency of the first pixel clock according to the rotational error of the polygon mirror by comparing the rotational error for one revolution of the polygon mirror with the reference number Nref (when no error between the faces of the polygon mirror exists) multiplied by the number of faces of the polygon mirror.

When scanning the photoconductor using a common polygon mirror, a similar frequency error Δf arises in the second pixel clock and the third pixel clock. Therefore, it is possible to correct the frequency of each pixel clock according to the rotational error for one revolution of the polygon mirror by applying the frequency error Δf the second pixel clock and the third pixel clock as a correction value.

Figure 27:
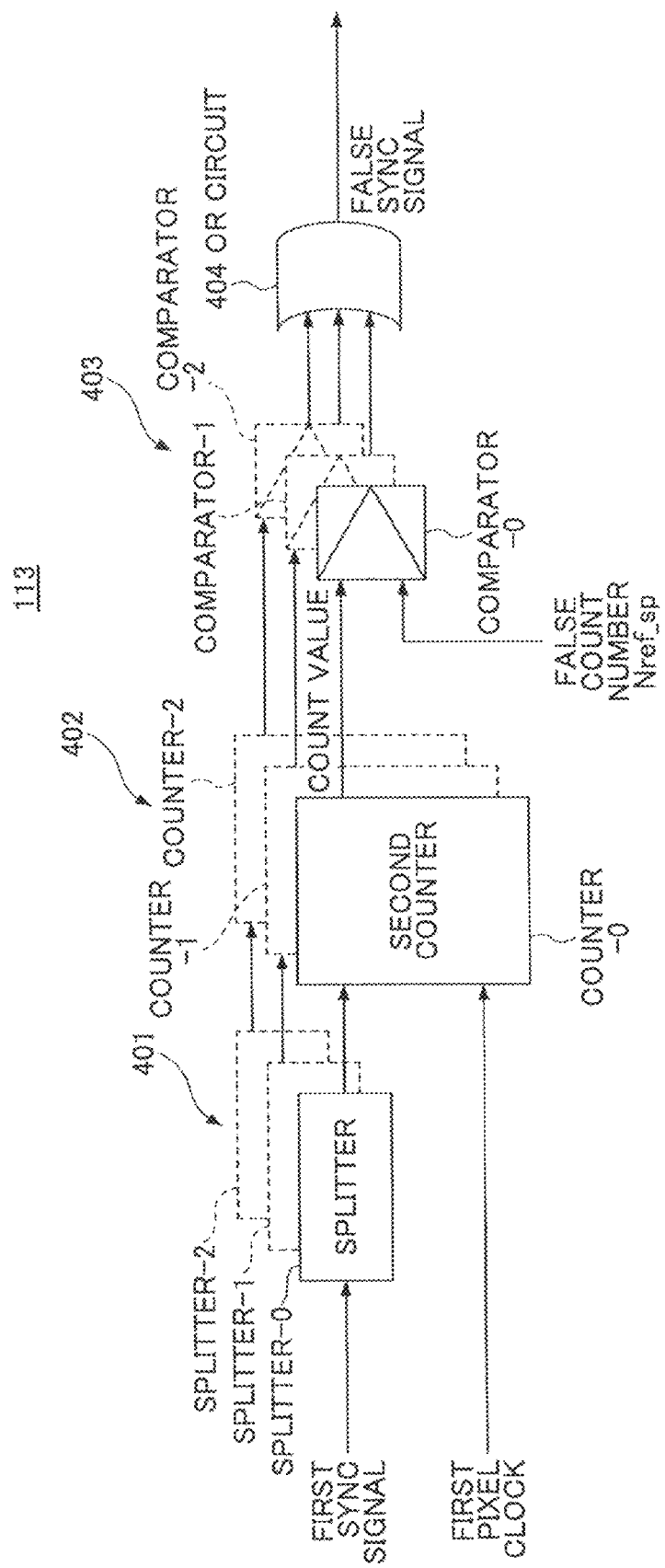
FIG. 27 is a block diagram showing the composition of a false signal generating part.

FIG. 27 is a block diagram showing the composition of the false signal generating part 113. As shown in FIG. 27, the false sync signal generating part 113 includes a splitter 401, a second counter 402, a comparator 403, and an OR circuit 404.

The first sync signal from the PD 110 is distributed to the splitter 401 for the faces of the polygon mirror. For example, the first sync signal of the 0th face of the polygon mirror is distributed to the splitter 401-0, and the second counter 402-0 counts the number of the first pixel clocks (or the pixel number) starting from the first sync signal of the 0th face. Similarly, the first sync signal of the first face of the polygon mirror is distributed to the splitter 401-1, and the second counter 402-1 counts the number of the first pixel clocks (or the pixel number) starting from the first sync signal of the first face. The first sync signal of the second face of the polygon mirror is distributed to the splitter 401-2, and the second counter 402-2 counts the number of the first pixel clocks (or the pixel number) starting from the first sync signal of the second face. The counted value after the counting is carried out is compared with a predetermined false sync count number Nref_ps by the comparator 403. The output of the comparator 403 is asserted when the counted value=the false sync count number Nref_ps. The OR circuit 404 takes the OR of the asserted outputs of the respective comparators and outputs a false sync signal indicating the OR result.

In the example of FIG. 27, the polygon mirror having the four faces, the splitter (the splitters 0-2), the counter (the counters 0-2), and the comparator (the comparators 0-2) are illustrated. The number of the elements necessary for each of the splitter 401, the second counter 402, and the comparator 402 is smaller than the number of faces of the polygon mirror. The number and combination of the elements, such as the counter, may be appropriately selected by the number of faces of the polygon mirror used.

Figure 28:
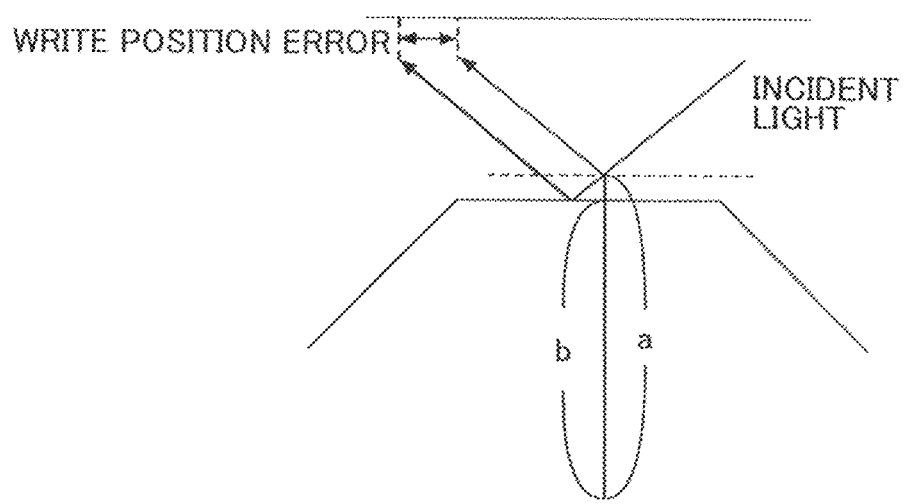
FIG. 28 is a diagram for explaining an error for each of the faces of the polygon mirror.

Next, an error of the radius of the inscribed circle of a polygon mirror which may cause a deviation of a write start position on a target surface to be scanned will be described. FIG. 28 is a diagram for explaining an error for each of the faces of the polygon mirror.

In FIG. 28, "a" denotes a distance from the center of a first polygon mirror to the face of the first polygon mirror, and "b" denotes a distance from the center of a second polygon mirror to the face of the second polygon mirror. If the incident light enters at the same position but the center-to-face distances of the polygon mirrors differ, the light beam is reflected at different positions on the polygon mirror faces, and the write positions on the photoconductor surfaces differ. Hence, if a false sync signal is generated with respect to the polygon mirror face which is the same as the face of the polygon mirror where the counting is started, the above-described error does not arise. Therefore, the false sync count number Nref_ps must be determined such that a false sync signal is generated with respect to the polygon mirror face which is the same as the face of the polygon mirror where the counting is started. The false sync count number Nref_ps is stored in a non-illustrated register. In addition, there may be a case in which a mirror angle error of the polygon mirror is taken into consideration.

The write start positions of the photoconductor drum 103 and the photoconductor drum 104 may be shifted due to the errors specific to the scanning optical system, such as mounting positions of the scanning lenses 101 and 102, and manufacture errors of lens curved surfaces. As disclosed in Japanese Laid-Open Patent Publication No. 2004-102276, there is known a method of detecting a write start position. In this method, predetermined positioning marks are used as reference marks when combining the images of the photoconductor drums 103 and 104, and detected by positioning sensors, so that the amount of deviation is computed based on the detection results of the sensors.

The false sync count number Nref_ps is set up based on the computation result of the amount of deviation so as to correct the error for each scanning optical system.

Figure 29:
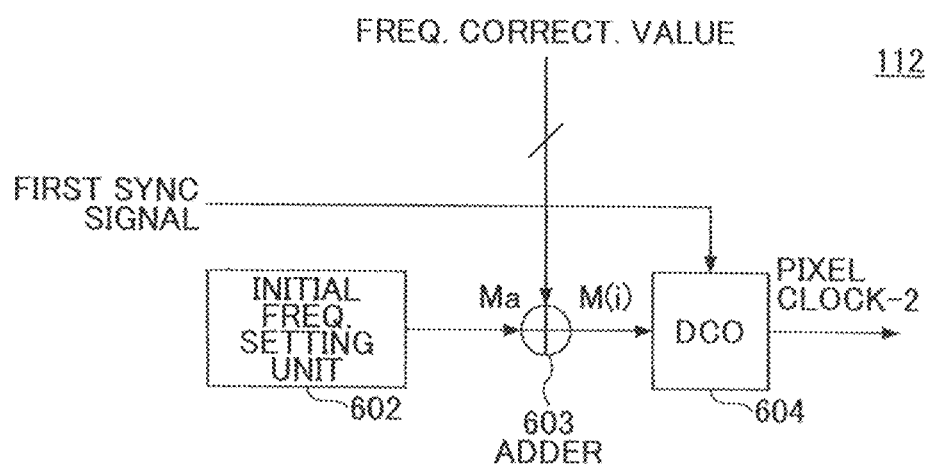
FIG. 29 is a block diagram showing the composition of a pixel clock generating part 2.

FIG. 29 is a block diagram showing the composition of the pixel clock generating part-2 (112). The composition of the pixel clock generating part-2 (112) will be described. In this respect, the pixel clock generating part-3 (114) has the same composition as the pixel clock generating part-2 (112), and a description thereof will be omitted.

As shown in FIG. 29, the pixel clock generating part-2 (112) includes an initial frequency setting unit 602, an adder 603, and a digital control oscillator (DCO) 604. The initial frequency setting unit 602 stores an initial value of the frequency of the pixel clock 2. The adder 603 adds the frequency correction value generated by the first pixel clock generating part to the initial frequency, so that the rotational error of the polygon mirror is corrected. The adder 603 outputs the resulting frequency setting value (in which the rotational error of the polygon mirror is corrected) to the digital control oscillator 604. Taking the phase synchronization to the first sync signal, the digital control oscillator (DCO) 604 generates the second pixel clock based on the frequency set up by the adder.

In the pixel clock generating part-2 (112), an initial value different from that of the first pixel clock generating part can be set up, and it is possible to perform the setting of the initial value so as to correct the deviation of the write end position due to the error for each scanning optical system. When the image forming device uses plural light sources, it is advantageous that the initial value of the frequency can be set up separately, in order to prevent the error for each scanning optical system. There is known a method of detecting a write end position as disclosed in Japanese Laid-Open Patent Publication No. 2004-102276. In this method, the predetermined positioning marks are used as reference marks when combining the images of the photoconductor drums 103 and 104, detected by the positioning sensors, and the amount of deviation is computed based on the detection results of the sensors. The initial value of the frequency is set up based on the computation result of the amount of deviation.

Since the write end position may be varied over time, it is preferred to set up the initial value of the frequency appropriately.

Figure 30:
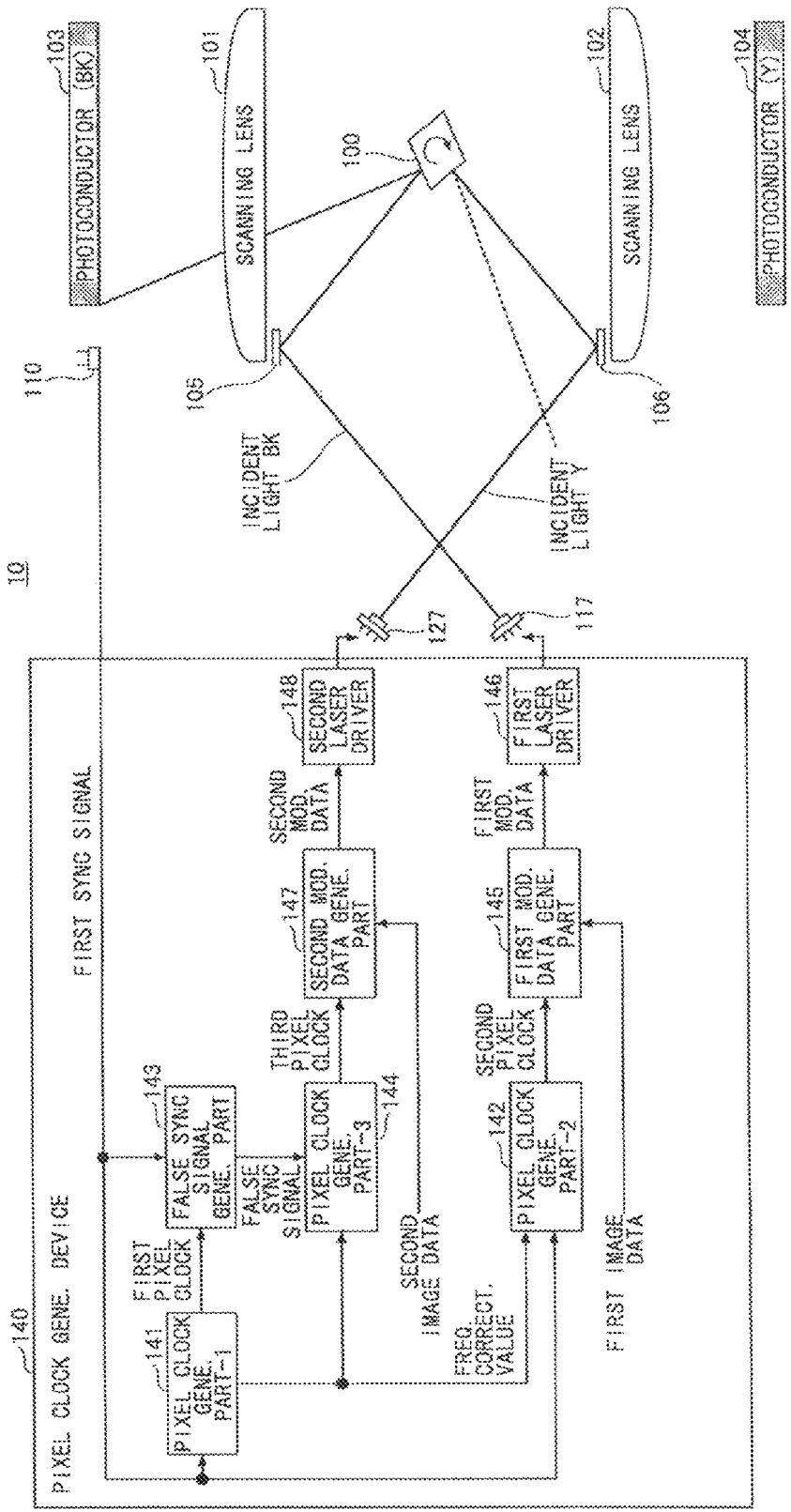
FIG. 30 is a diagram showing the composition of the image forming device of the second embodiment.

Next, a second embodiment of the present disclosure will be described. FIG. 30 is a diagram showing the composition of the image forming device of the second embodiment of the present disclosure.

As shown in FIG. 30, the image forming device 10 of the second embodiment includes two light sources (LD 117, LD 127), two photoconductor drums (103, 104), and one sync detecting sensor (PD 110).

Specifically, as shown in FIG. 30, the image forming device 10 includes a polygon mirror 100, scanning lenses 101 and 102, photoconductor drums 103 and 104, incidence mirrors 105 and 106, a PD (photodetector) 110, a pixel clock generating device 140, and light sources (LD 117 and LD 127). The pixel clock generating device 140 includes a first pixel clock generating part 141, a false sync signal generating part 143, a second pixel clock generating part 142, a third pixel clock generating part 144, a first modulation data generating part 145, a second modulation data generating part 147, a first laser driver 146, and a second laser driver 148.

The laser incident light beam Bk from the light source 117 is reflected by the incidence mirror 105 to enter the polygon mirror 100, and in sync with the rotation of the polygon mirror 100, passes through the scanning lens 101, so that the surface of the photoconductor (Bk) 103 is scanned by the light beam.

On the other hand, the incident light beam Y from the light source 127 is reflected by the incidence mirror 106 to enter the polygon mirror 100, and in sync with the rotation of the polygon mirror 100, passes through the scanning lens 102, so that the surface of the light photoconductor (Y) 104 is scanned by the light beam. Thereby, electrostatic latent images according to the outputs of the light source 117 and the light source 127 are formed on the photoconductor drum 103 and the photoconductor drum 104, respectively.

The PD 110 is arranged at one end portion of the photoconductor drum 103. The laser beam reflected by the polygon mirror 100 enters the PD 110 before the scanning of a scanning line by the laser beam is performed on the surface of the photoconductor drum 103, and the timing of a start of the scanning is detected by the PD 110. The timing of the start of the scanning detected by the PD 110 is supplied to the pixel clock generating part-1 (141) of the pixel clock generating device 140, and the false sync signal generating part 143 as a first sync signal in sync with the scanning of the photoconductor drum.

The pixel clock generating part-1 (141) generates a first pixel clock and a frequency correction value based on the first sync signal. The false sync signal generating part 143 generates a false sync signal based on the first sync signal and the first pixel clock. The pixel clock generating part-2 (142) corrects a predetermined initial frequency setting value by the frequency correction value, and generates a second pixel clock in sync with the first sync signal. The pixel clock generating part-3 (144) corrects a second predetermined initial frequency setting value (which is separate from the initial frequency setting value set by the pixel clock generating part-2 (142)) by the frequency correction value, and generates a third pixel clock in sync with the false sync signal.

Based on the first image data, the first modulation data generating part 145 outputs first modulation data in sync with the second pixel clock to the first laser driver 146. The first laser driver 146 drives the light source 117 according to the first modulation data, and the light source 117 emits a laser beam. Based on the second image data, the second modulation data generating part 147 outputs second modulation data in sync with the third pixel clock to the second laser driver 148. The second laser driver 148 drives the light source 127 according to the second modulation data, and the light source 127 emits a laser beam.

In the second embodiment, the polygon mirror having the four faces is used, and the two of the faces of the polygon mirror are used to perform the scanning of the two photoconductors as shown in FIG. 30. However, the PD 110 is arranged only at one of the two photoconductors, and the scanning of the photoconductor with which no PD is arranged can be started in sync with the false sync signal which is delayed by a predetermined time from the first sync signal obtained from the PD 110.

Figure 31:
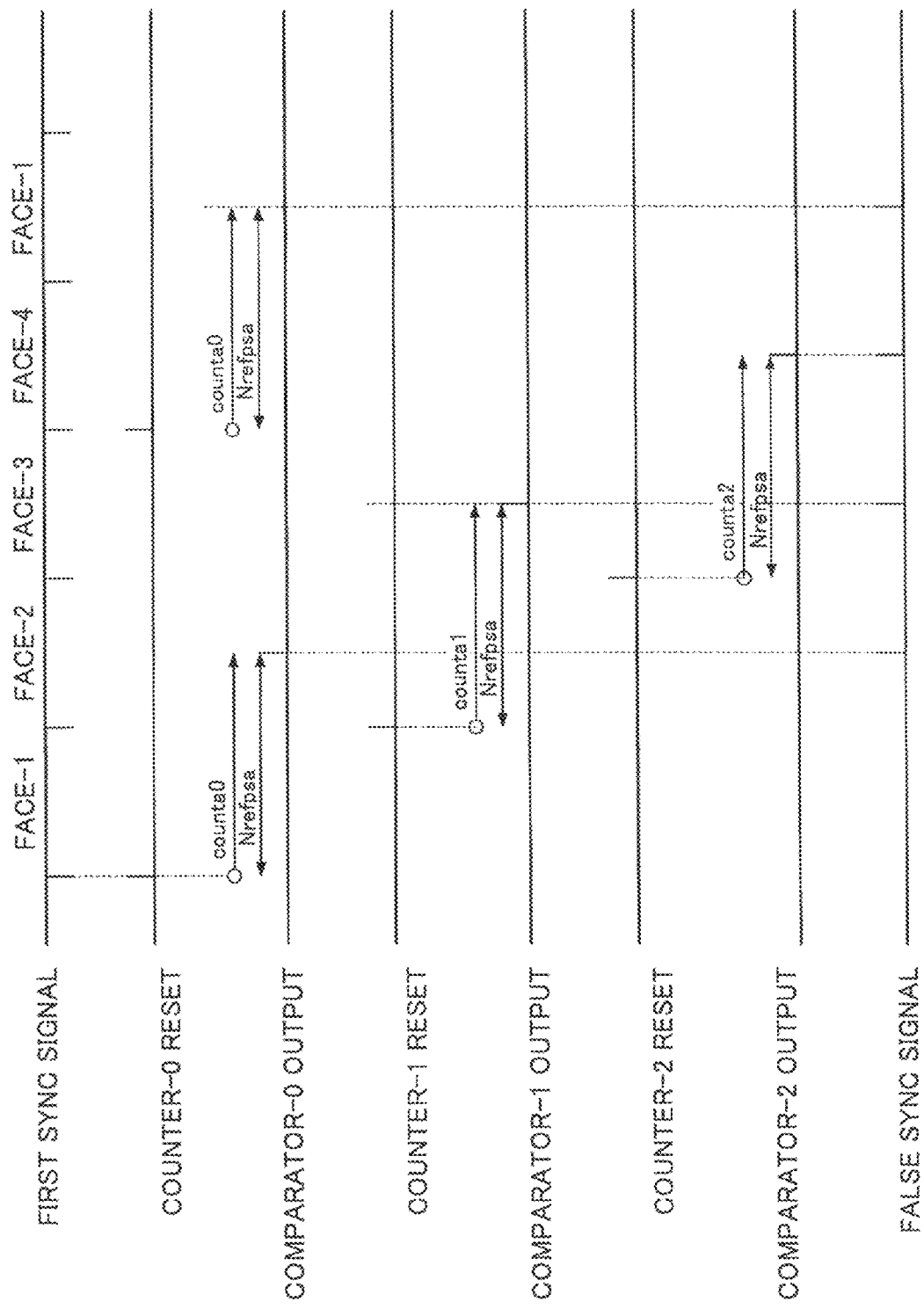
FIG. 31 is a timing chart for explaining operation of the false sync signal generating part in the second embodiment.

FIG. 31 is a timing chart for operation of the false sync signal generating part in the second embodiment. In the example of FIG. 31, three counters (counters 0 to 2) are used to illustrate the case where the two photoconductors are scanned by the two of the faces in the polygon mirror.

As shown in FIG. 31, the first sync signal is asserted in sync with the scanning of the photoconductor drum 103 at the time of the scan start of the face-4 of the polygon mirror. The counters 0-2 are reset one by one by the first sync signal for the three faces, and the counting is started by the first pixel clock.

If the counter 0 is reset for the face-1, the scan start timing of the photoconductor drum 104 using the face-1 is the timing set up by the false sync count number Nref_ps of the comparator 1 after one or more of the faces of the polygon mirror are rotated. The timing of the false sync signal is generated so that the light source 127 writes on the photoconductor drum 104 for the same face of the polygon mirror as the face of the polygon mirror used when the light source 117 writes on the photoconductor drum 103.

As described above, in the second embodiment, the frequency of the first pixel clock is controlled according to the rotational speed irregularity of the polygon mirror, a false sync signal is generated based on the first pixel clock with the controlled frequency, and the start position of the light beam on the opposite side is fixed. The error for the faces of the polygon mirror can be eliminated by generating the false sync signal. By setting up the initial frequency for each pixel clock generating part, the error of each scanning optical system can be corrected, and the error of the write end position can be corrected.

The image modulation data is synchronized with the second pixel clock based on the image data, and the image modulation data is output as the light beam in the laser drive circuit.

Figure 32:
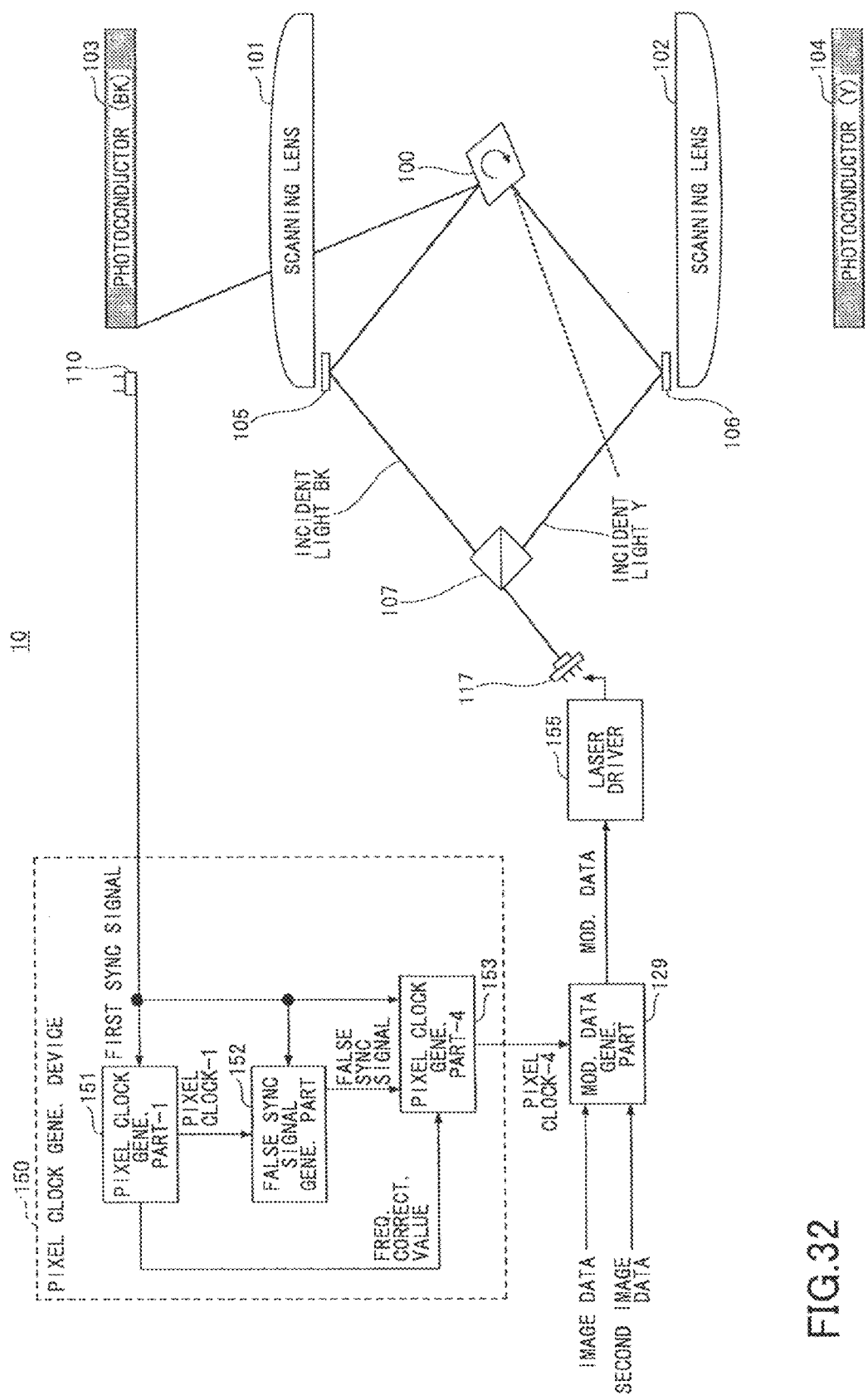
FIG. 32 is a diagram showing the composition of the image forming device of the third embodiment.

Next, a third embodiment of the present disclosure will be described. FIG. 32 is a diagram showing the composition of the image forming device 10 of the third embodiment of the present disclosure.

As shown in FIG. 32, the image forming device 10 of the third embodiment includes one light source, two photoconductor drums, and one sync detecting sensor (PD 110).

Apart from the second embodiment, in the image forming device 10 of the third embodiment, the laser beam emitted from the LD 117 is deflected by an optical beam division unit 107 to generate incident light Y and incident light Bk. The function of the pixel clock generating part-2 (142) to generate the second pixel clock 124 and the function of the pixel clock generating part-3 (144) to generate the third pixel clock 129 as shown in FIG. 30 are performed in this embodiment as follows. The pixel clock generating part-4 (153) in the third embodiment of FIG. 32 changes the frequency of the pixel clock 4 for one of the period the surface of the photoconductor drum 103 is scanned and the period the surface of the photoconductor drum 104 is scanned. The fifth modulation data generating part 129 in the third embodiment of FIG. 32 is provided, instead of the first data modulation part 145 and the second modulation data generating part 147 in the embodiment of FIG. 30. The fifth laser driver (155) in the third embodiment of FIG. 32 is provided, instead of the first laser driver (146) and the second laser driver (148) in the embodiment of FIG. 30.

In the third embodiment of FIG. 32, the image forming device 10 includes a polygon mirror 100, two scanning lenses 101 and 102, two photoconductor drums 103 and 104, two incidence mirrors 105 and 106, an optical beam division unit 107, a PD 110, a pixel clock generating device 150, a modulation data generating part-5 (129), a laser driver 5 (155), and a light source (LD) 117.

The pixel clock generating device 150 includes a pixel clock generating part-1 (151), a false sync signal generating part 152, and a pixel clock generating part-4 (153). The laser beam from the light source 117 is divided into incident light Bk (the first light beam) and incident light Y (the second light beam) by the optical beam division unit 107.

The incident light Bk and the incident light Y enter the face where they were reflected by the incidence mirrors 105 and 106, surfaces of the polygon mirrors 100, passing through the scanning lenses 101 and 102, and scanned onto the photoconductor (Bk) 103 and the photoconductor (Y) 104, respectively. Thereby, the electrostatic latent images according to the output of the light source 117 are formed on the photoconductor drums 103 and 104, respectively.

The PD 110 is arranged at an end portion of the photoconductor drum 103. The laser beam reflected by the polygon mirror 100 enters the PD 110, before carrying out one-line scanning of the photoconductor drum 103, and the timing of a start of the scanning is detected by the PD 110.

The timing of the start of the scanning detected by the PD 110 is supplied to the pixel clock generating part-1 (151), false sync signal generating part 152, and pixel clock generating part-4 (153) of pixel clock generating device 150 as the first periodic sync signal united with the scanning of the photoconductor.

The pixel clock generating part-1 (151) generates pixel clock 1 and a frequency correction value based on the first sync signal. The false sync signal generating part 152 generates a false sync signal based on the first sync signal and the pixel clock 1.

The pixel clock generating part-4 (153) generates the pixel clock 4 by the frequency correction value of the first sync signal and the false sync signal. Based on the image data, the modulation data generating part-5 (129) generates the modulation data in sync with pixel clock 4 and outputs the same to the laser driver 5 (155), so that the light source 117 is driven according to the modulation data of the laser driver 5 (155) to output a laser beam.

The scanning optical system of FIG. 32 is arranged to divide the laser beam into incident light Bk and incident light Y using the light beam division unit 107 which uses a half mirror.

Figure 33:
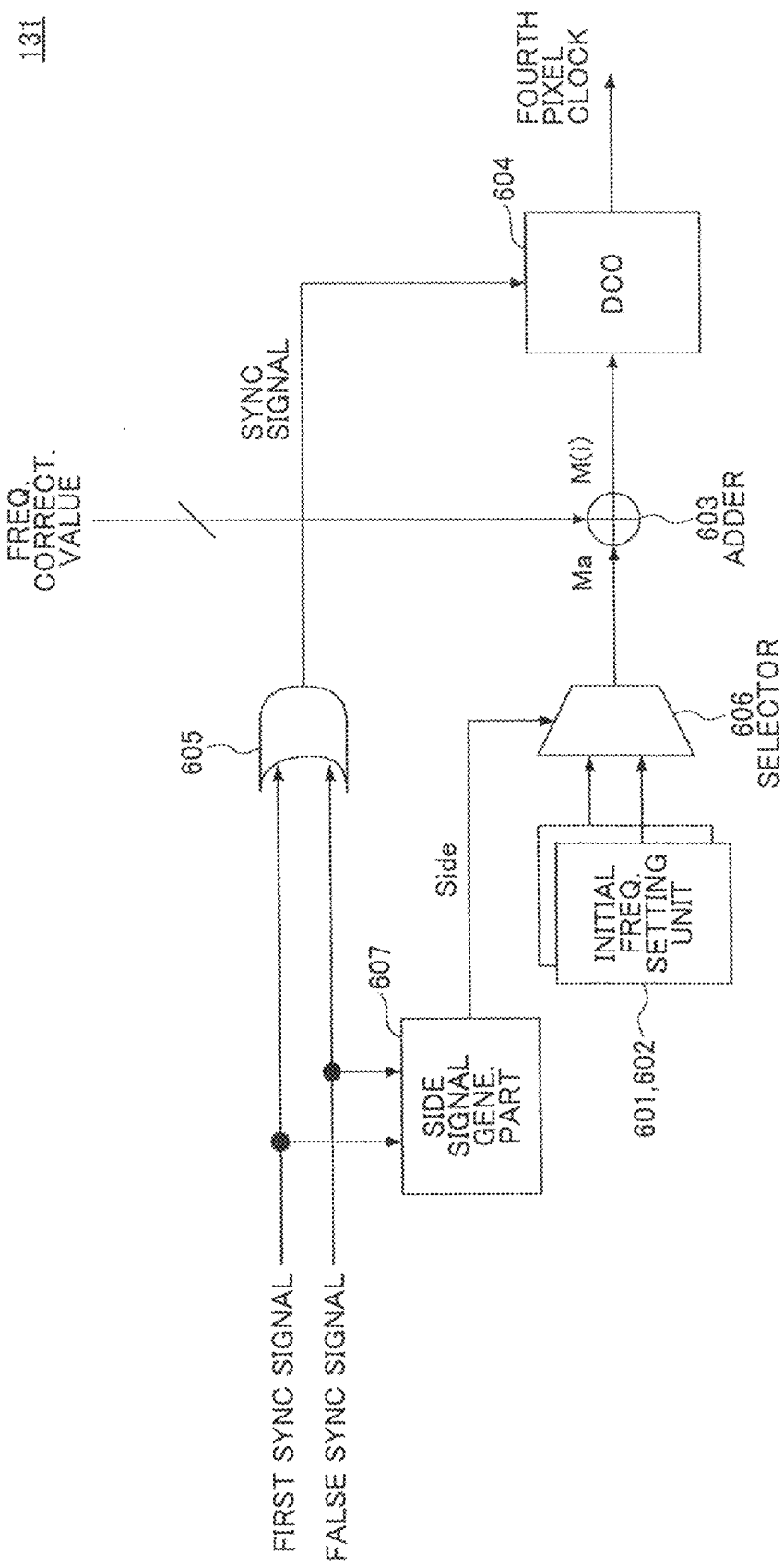
FIG. 33 is a block diagram showing the composition of a pixel clock generating part 4.

FIG. 33 is a block diagram showing the composition of the pixel clock generating part-4 (153). As shown in FIG. 33, the pixel clock generating part-4 (153) includes an initial frequency setting unit 601 which sets up the initial frequency of pixel clock 4 to scan the photoconductor drum 103, an initial frequency setting unit 602 which sets up the initial frequency of pixel clock 4 to scan the photoconductor drum 104, an adder 603, an OR circuit 605, a digital control oscillator (DCO) 604, a selector 606, and a side signal generating part 607.

The side signal generating part 607 detects which of the photoconductor drums 103 and 104 is scanned, and changes a side signal to H or L according to the first sync signal and the false sync signal. The initial frequency setting unit 601 holds the first initial frequency setting value, and the initial frequency setting unit 602 holds the second initial frequency setting value.

The adder 603 adds the frequency correction value generated by the first pixel clock generating part 112 and one of the initial frequency setting values selected by the selector 606. In the phase sync with the sync signal, the digital control oscillator (DCO) 604 generates the pixel clock 4.

Figure 34:
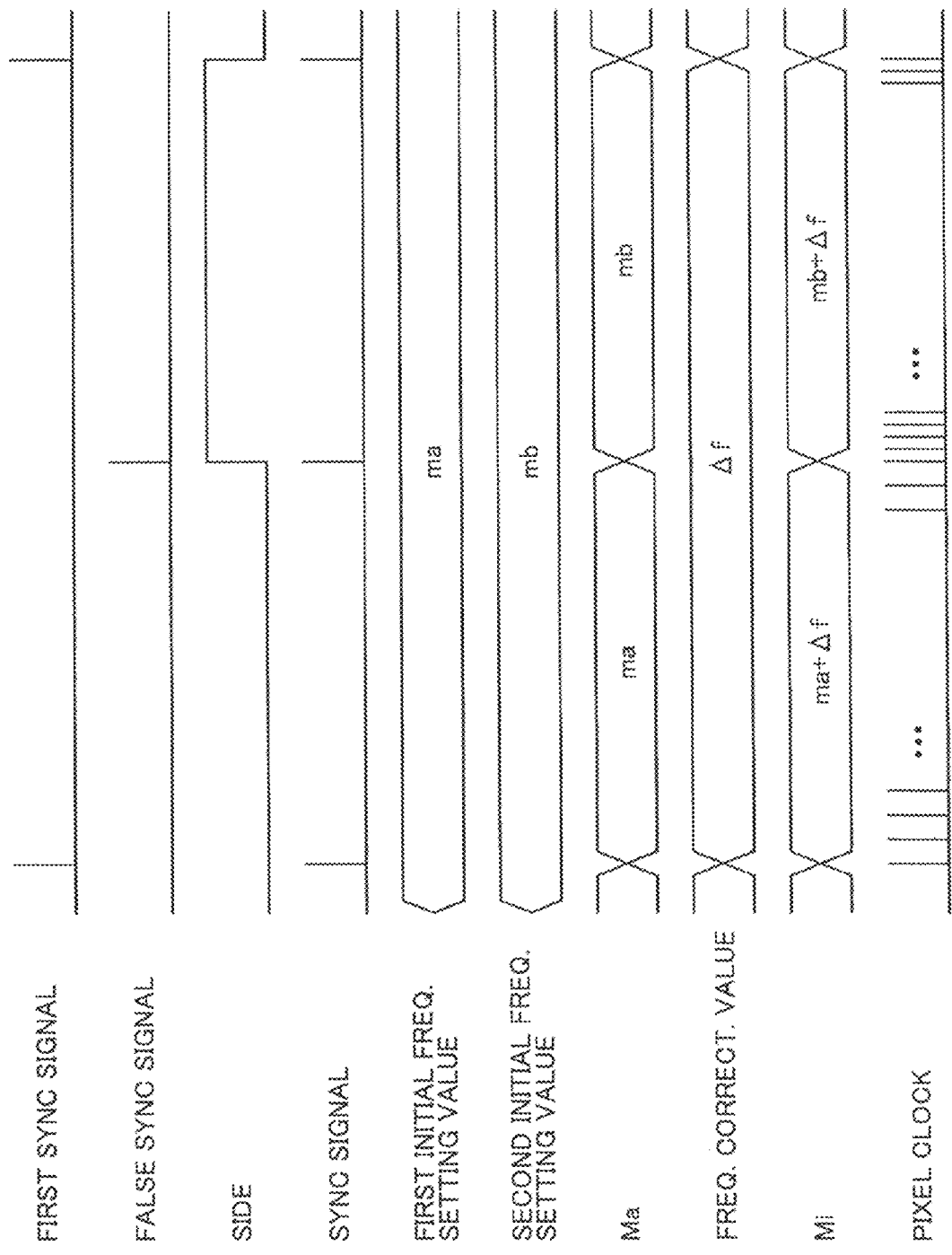
FIG. 34 is a diagram for explaining the relationship between a pixel clock and image data.

FIG. 34 is a timing chart for explaining operation of the pixel clock generating part-4 (153).

As shown in FIG. 34, the first sync signal is asserted when the incident light Bk is detected by the PD 110. The false sync signal is asserted in the above-mentioned timing after the first sync signal is asserted. The side signal is changed to a high (H) level if the false sync signal is asserted, and changed to a low (K) level if the first sync signal is asserted. The sync signal is the sum of the first sync signal and the false sync signal. The first initial frequency setting value and the second initial frequency setting value are stored in the register.

Ma denotes one of the setting value ma of the first initial frequency and the setting value mb of the second initial frequency which is selected by the side signal. When the side signal is at a low (L) level, ma of the first initial frequency is selected, and mb of the second initial frequency is selected when the side signal is at a high (H) level.

Mi denotes a frequency setting value of the pixel clock which is defined by the formula: Mi=(Ma+frequency correction value $\Delta f$). Hence, the frequency setting value Mi of the pixel clock is set to Mi=ma+$\Delta f$ or Mi=mb+$\Delta f$ in accordance with the side signal. The frequency of the pixel clock is updated to Mi=ma+$\Delta f$ or Mi=mb+$\Delta f$ by the sync signal, and in the phase in sync with the sync signal, the digital control oscillator 604 outputs the pixel clock 4.

Because the pixel clock generating part-4 (153) and the pixel clock generating part-1 (151) can be set up to different initial frequency values, the setting of the initial frequency value can be performed to eliminate the error of each scanning optical system. According to the third embodiment, the initial value of frequency can be set up to eliminate the error of each scanning optical system, and it is possible to correct the error of the write end positions.

As mentioned above, in the third embodiment, the write start position of the light beam on the opposite side is fixed by controlling the frequency of the pixel clock 1 according to the rotational speed irregularity of the polygon mirror, and the false sync signal is generated based on the pixel clock 1 with the controlled frequency. The error of each face of the polygon mirror can be disregarded by generating the false sync signal for the face of the polygon mirror which is the same as that of the first sync signal. By setting up plural initial frequencies individually with a single LD, the error for each scanning optical system can be corrected, and the error of the write end position can be corrected.

Figure 35:
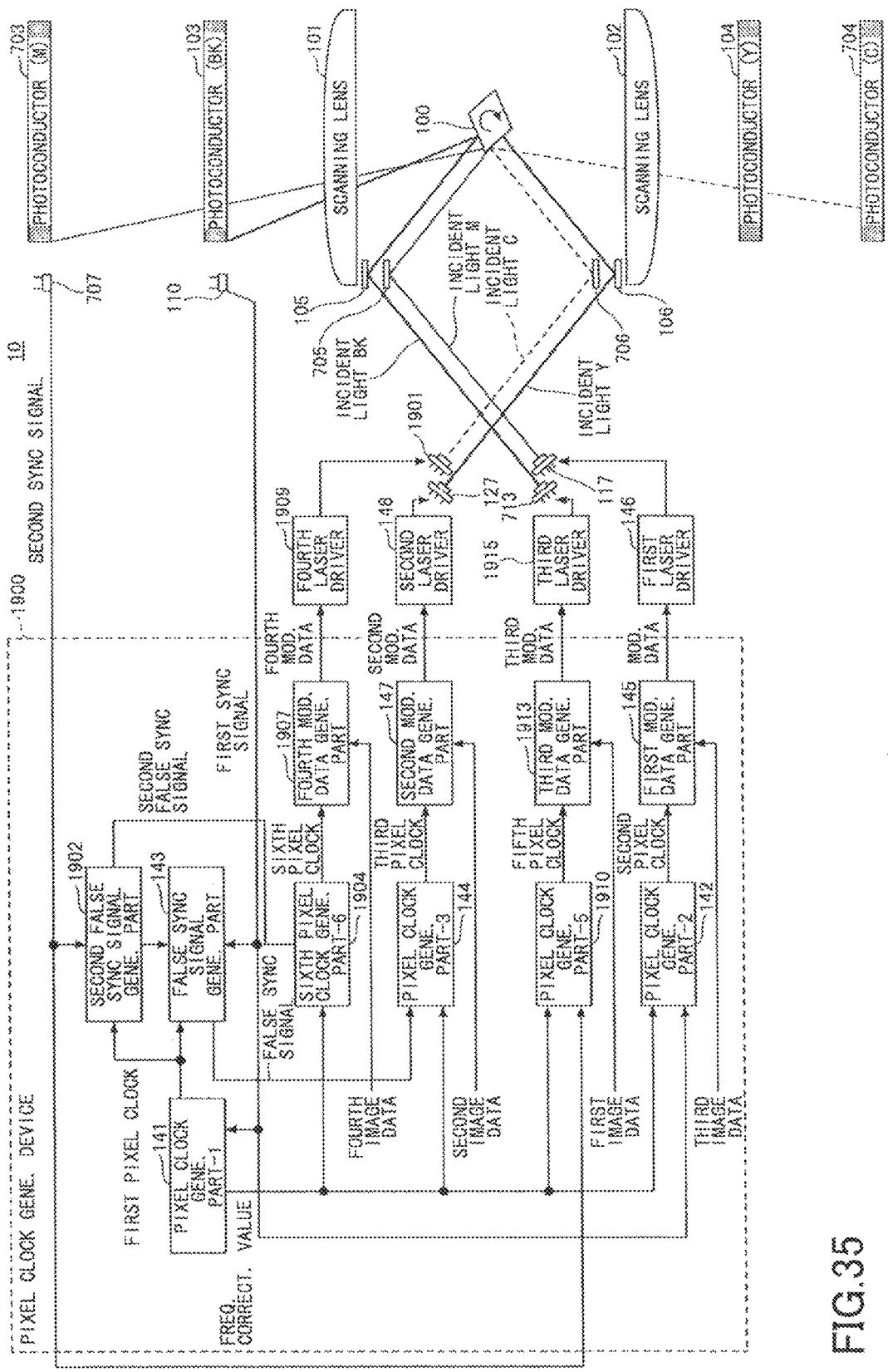
FIG. 35 is a diagram showing the composition of the image forming device of the fourth embodiment.

Next, a fourth embodiment of the present disclosure will be described. FIG. 35 is a diagram showing the composition of the image forming device 10 of the fourth embodiment of the present disclosure.

As shown in FIG. 35, the image forming device 10 of the fourth embodiment includes four write laser diodes, four photoconductor drums, and two sync detecting sensors.

When compared with the image forming device 10 of the second embodiment shown in FIG. 30, the image forming device 10 shown in FIG. 35 further includes photoconductor drums 703 and 704, incidence mirrors 705 and 706, a PD 707, a third laser driver 1915, a fourth laser driver 1909, and light sources 713 and 1901 which are extended as the optical system. The pixel clock generating device 1900 further includes a second false sync signal generating part 1902, a clock generating part-5 (1910), a third modulation data generating part 1913, a pixel clock generating part-6 (1904), and a fourth modulation data generating part 1907.

The incident light M and the incident light Bk pass through the scanning lens 101 in common, and the incident light Y and the incident light C pass through the scanning lens 102 in common.

The pixel clock generating part-2 (142), the pixel clock generating part-3 (144), the first modulation data generating part 145, the second modulation data generating part 147, the first laser driver 146, and the second laser driver 148 in the fourth embodiment are essentially the same as the pixel clock 2 (142), the pixel clock generating part-3 (144), the first modulation data generating part 145, the second modulation data generating part 147, the first laser driver 146, and the second laser driver 148 in the second embodiment which have been described above with reference to FIG. 30, and a description thereof will be omitted.

The pixel clock generating part-5 (1910) and the sixth pixel clock generating part (1904) in the fourth embodiment are essentially the same as the pixel clock 2 (142) and the pixel clock generating part-3 (144) in the second embodiment, and a description thereof will be omitted. The third modulation data generating part 1913 and the fourth modulation data generating part 1907 in the fourth embodiment are essentially the same as the first modulation data generating part 145 and the second modulation data generating part 147 in the second embodiment, and a description thereof will be omitted. Further, the third laser driver 1915 and the fourth laser driver 1909 in the fourth embodiment are essentially the same composition as the first laser driver 146 and the second laser driver 148 in the second embodiment, and a description thereof will be omitted.

Figure 36:
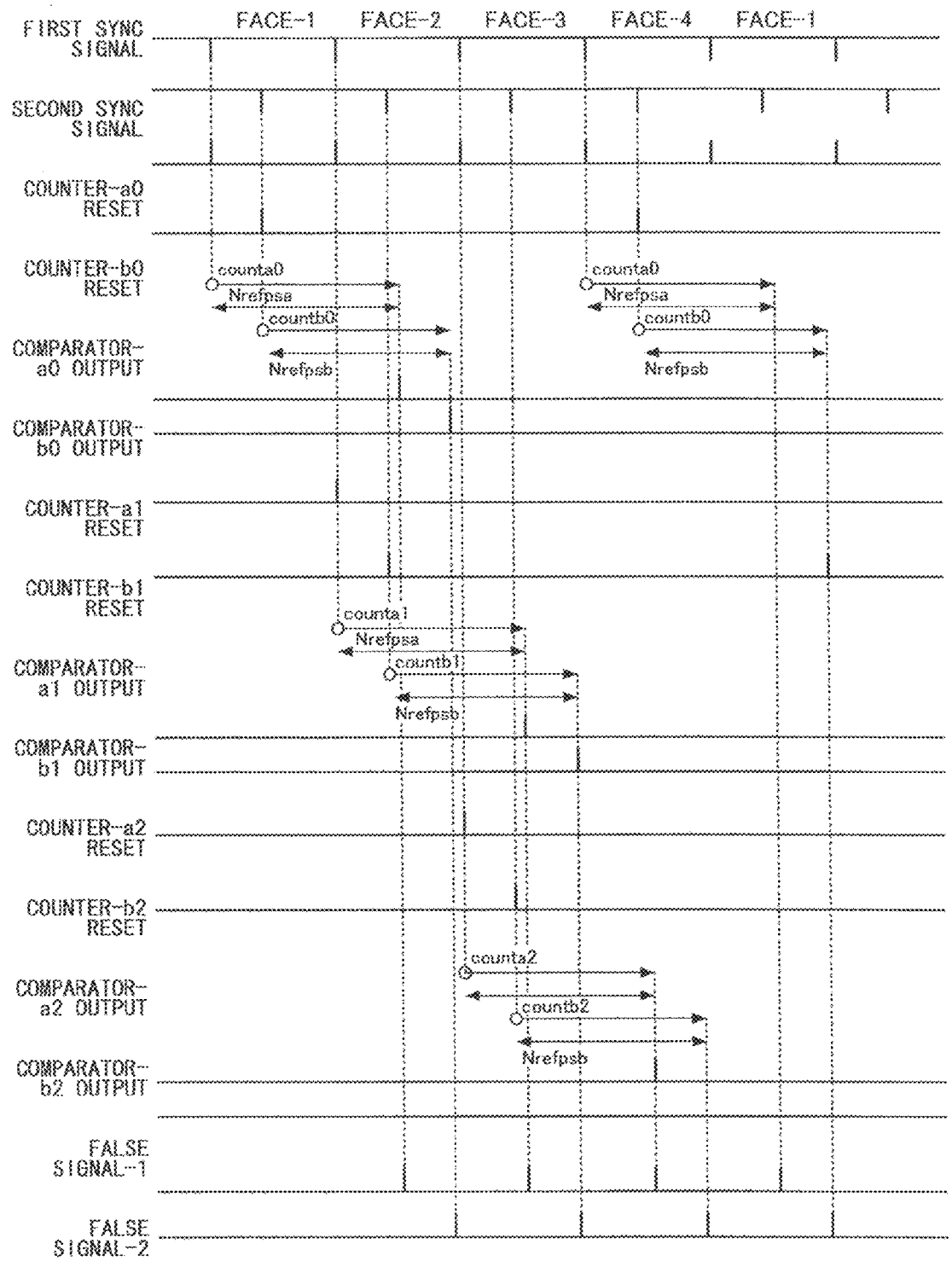
FIG. 36 is a timing chart for explaining operation of the false sync signal generating part in the fourth embodiment.

FIG. 36 is a timing chart for explaining operation of the false sync signal generating part in the fourth embodiment.

When compared with the timing chart in the second embodiment in FIG. 31, in the operation of the false sync signal generating part shown in FIG. 36, with respect to the LD 117 and the LD 713, the first sync signal from the PD 110 and the second sync signal from the PD 707 are input to cause the comparators a0-a2 and b0-b2 and the counters a0-a2 and b0-b2 to operate so that the first false sync signal and the second false sync signal are generated, respectively. Other operations of the false sync signal generating part in the fourth embodiment are essentially the same as in the timing chart of FIG. 31, and a description thereof will be omitted.

In the timing chart of FIG. 36, the timing when the false sync signal is generated is the same as the timing the surface of the photoconductor drum 104 is scanned by the light beam from the same face of the polygon mirror 100 when the light beam from the LD 117 scans the surface of the photoconductor drum 103. The timing when the second false sync signal is generated is the same as the timing the surface of the photoconductor drum 704 is scanned by the light beam from the same face of the polygon mirror 100 when the light beam from the LD 713 scans the surface of the photoconductor drum 703.

In the fourth embodiment, the frequency of the first pixel clock is controlled according to the rotational speed irregularity of the polygon mirror, and a false sync signal is generated based on the controlled frequency of the first pixel clock, so that the write start position of the light beam for the opposite side of the opposed scanning sides is fixed.

In the fourth embodiment, the first false sync signal is generated for the same face as that of the first sync signal, and the errors for the respective faces of the polygon mirror can be disregarded. Similarly, the second false sync signal is generated for the same face as that of the second sync signal, and the errors for the respective faces of the polygon mirror can be disregarded. The setting of the initial frequency is performed for each LD, and the error for each scanning optical system can be corrected. Even if the number of photoconductor drums is increased to be larger than that in the second embodiment, the error of the write end position can be corrected.

Figure 37:
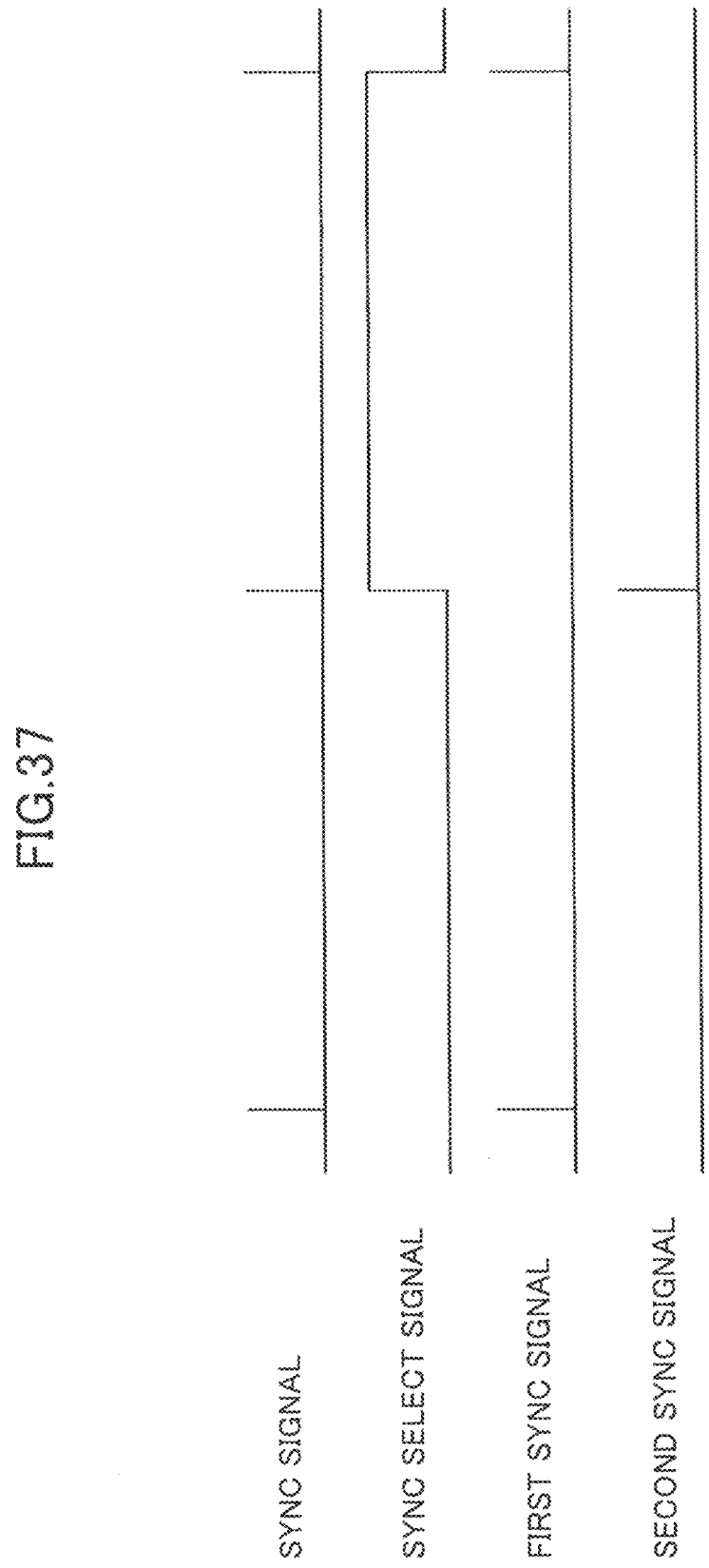
FIG. 37 is a timing chart in which a first sync signal and a second sync signal are separated from a sync signal.

Next, a timing chart in which a sync signal detected by the PD 707 is divided into a first sync signal and a second sync signal will be described with reference to FIG. 37. FIG. 37 is a timing chart in which the first sync signal and the second sync signal are separated from the sync signal.

As shown in FIG. 37, the sync signal detected by the PD 707 is allocated to either the first sync signal or the second sync signal in accordance with a sync select signal obtained from the CPU or the control unit of the host device. In the example of FIG. 37, when the sync select signal is at a low level L, the sync signal is separated to the first sync signal, and when the sync select signal is at a high level H, the sync signal is separated to the second sync signal.

With the use of the sync select signal obtained from the control unit of the host device or the CPU, the sync signal can be separated into the first sync signal and the second sync signal even if a single PD is used in common.

Figure 38:
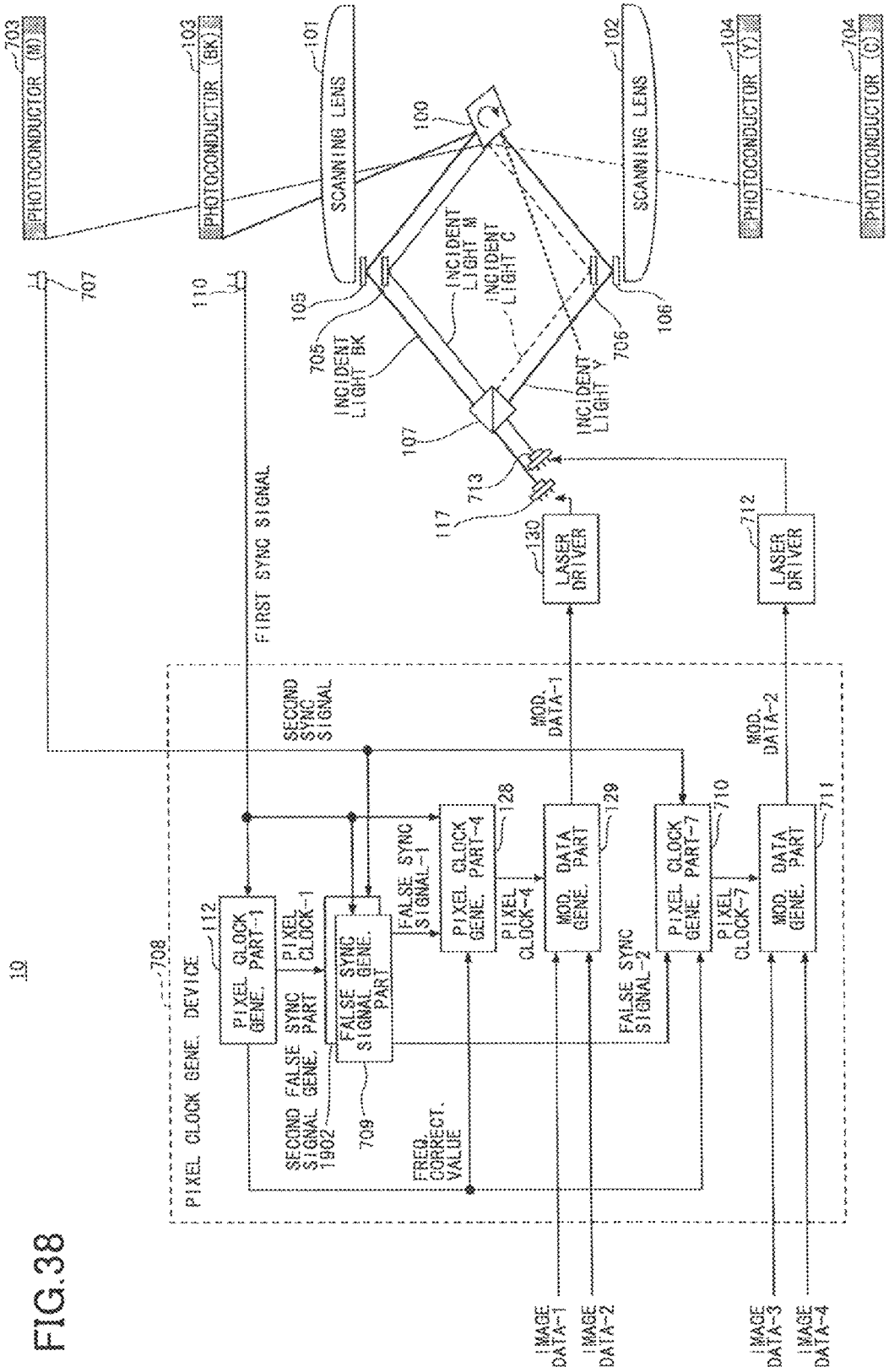
FIG. 38 is a diagram showing the composition of the image forming device of the fifth embodiment.

Next, a fifth embodiment of the present disclosure will be described. FIG. 38 is a diagram showing of the composition of the image forming device 10 of the fifth embodiment of the present disclosure.

As shown in FIG. 38, the image forming device 10 of the fifth embodiment includes two light sources, four photoconductor drums, and two sync detecting sensors.

When compared with the image forming device of the third embodiment in FIG. 32, the image forming device 10 shown in FIG. 38 further includes photoconductor drums 703 and 704, incidence mirrors 705 and 706, a PD 707, a laser driver 712, a light source 713, and a modulation data generating part 711 that outputs the second modulation data to the laser driver 712.

The LD 713 which is disposed at a position distant from the LD 117 is illustrated in FIG. 38. However, in the actual optical system, the LD 713 may be disposed at the position distant from the LD 117 in the sub-scanning direction. The incident light M and the incident light Bk pass through the scanning lens 101 in common, and the incident light Y and the incident light C pass through the scanning lens 102 in common.

In the fifth embodiment, the same operation as the third embodiment is performed. However, in the fifth embodiment, the setting of an initial frequency is performed for each of the pixel clock generating part-4 (128) and the pixel clock generating part-7 (710), and the error for each scanning optical system can be corrected.

The pixel clock generating part-4 (128) and the pixel clock generating part-7 (710) have the same composition as the pixel clock generating part-4 (131) shown in FIG. 33, and a description thereof will be omitted. The pixel clock generating part-4 (128) generates a pixel clock 4 which is a reference clock of the incident light Bk and the incident light Y, and the pixel clock generating part-7 (710) generates a seventh pixel clock which is a reference clock of the incident light M and the incident light C.

The polygon mirror 100 can be shared by the pixel clock generating part-4 (128) and the pixel clock generating part-7 (710), and rotation irregularity of each pixel clock generating part is equal. Hence, the pixel clock generating part-1

(112) can be used with these pixel clock generating parts, and it is possible to provide a simple structure of the circuit.

The operation of the false sync signal generating part in the fifth embodiment is essentially the same as the operation in the timing chart of FIG. 36 regarding the fourth embodiment, and a description thereof will be omitted.

Figure 39:
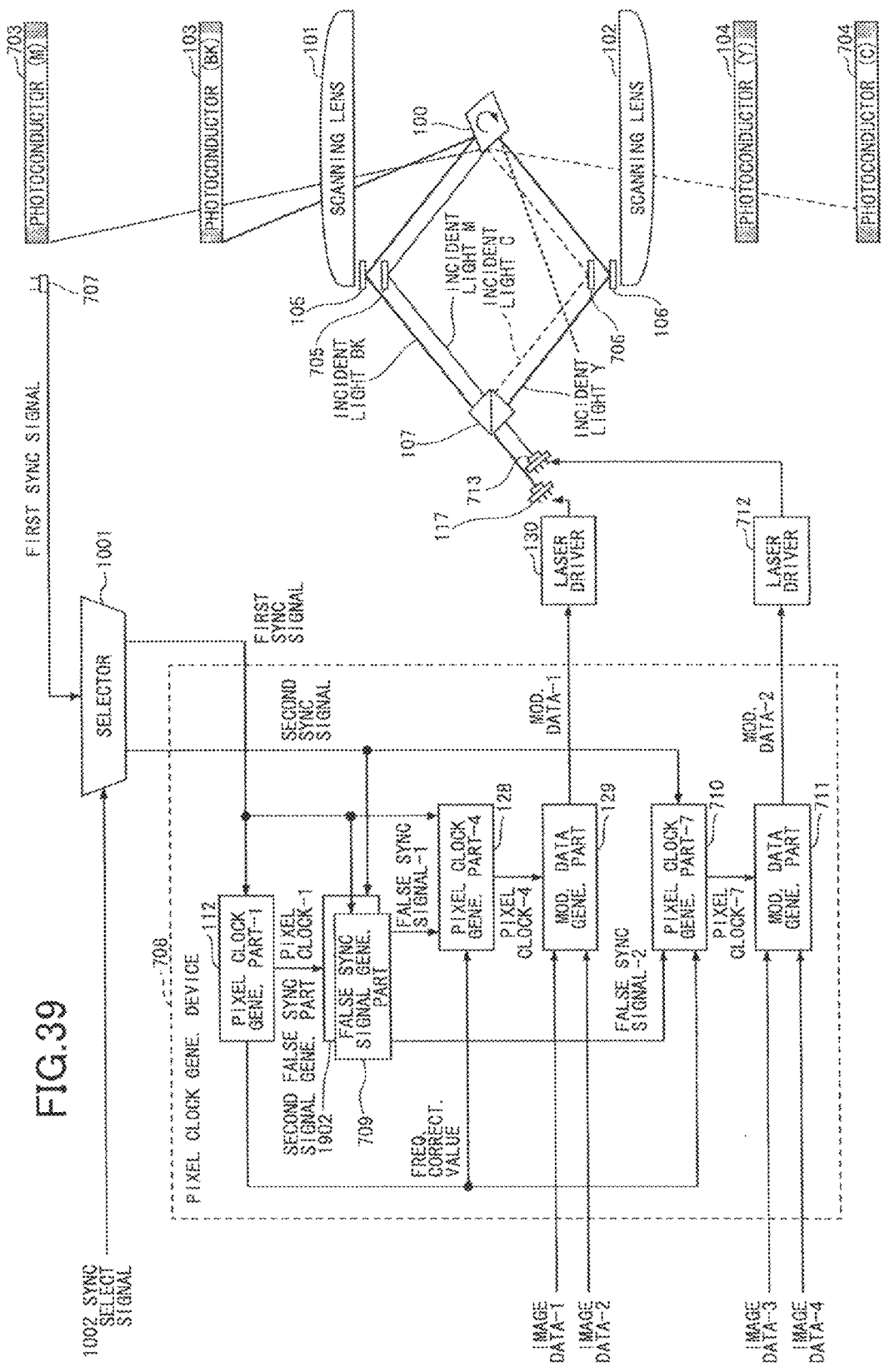
FIG. 39 is a diagram showing the composition of the image forming device of the sixth embodiment.

Next, a sixth embodiment of the present disclosure will be described. FIG. 39 is a diagram showing the composition of an image forming device of the sixth embodiment of the present disclosure.

In the image forming device in FIG. 39, the PD 110 in the image forming device of the fifth embodiment shown in FIG. 38 is omitted, only the PD 707 remains, and a selector 1001 is installed.

As shown in FIG. 39, the first sync signal from the PD 707 is shared by the false sync signal generating part 709 and the pixel clock generating part-7 (710). Although the single PD 707 is used, the write timing of the LD 117 and the write timing of the LD 713 differ from each other, and the false sync signal generating part uses the false sync signal generating part 709 and the second false sync signal generating part 1902, similar to the fifth embodiment.

The LD 713 which is disposed at a position distant from the LD 117 is illustrated in FIG. 39. However, in the actual optical system, the LD 713 may be disposed in the vicinity of the LD 117.

In the sixth embodiment, the same operation as the fifth embodiment is performed. However, the setting of an initial frequency is performed for each of the pixel clock generating part-4 (128) and the pixel clock generating part-7 (710), and the error for each scanning optical system can be corrected.

The pixel clock generating part-4 (128) and the pixel clock generating part-7 (710) have the same composition as the pixel clock generating part-4 (131) shown in FIG. 33, and a description thereof will be omitted. The pixel clock generating part-4 (128) generates a pixel clock 4 which is a reference clock of the incident light Bk and the incident light Y. The pixel clock generating part-7 (710) generates a seventh pixel clock which is a reference clock of the incident light M and the incident light C. The polygon mirror 100 is shared by the pixel clock generating part-4 (128) and the pixel clock generating part-7 (710), and rotation irregularities of the pixel clock generating parts are equal. Hence, the first pixel clock generating part 112 can be used with these pixel clock generating parts, and it is possible to provide a simple structure of the circuit.

Figure 40:
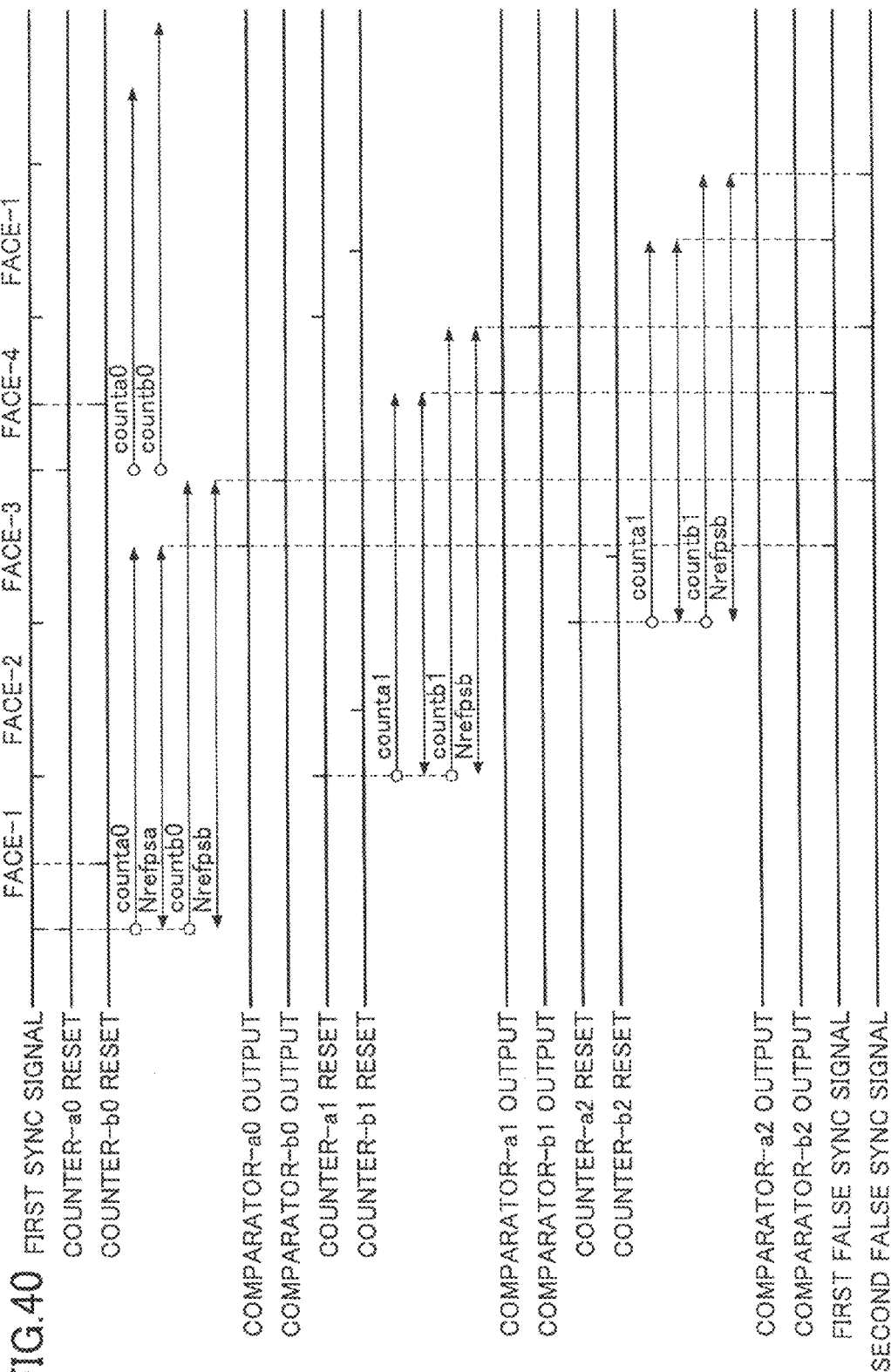
FIG. 40 is a timing chart for explaining operation of the false sync signal generating part in the sixth embodiment.

FIG. 40 is a timing chart for explaining operation of the false sync signal generating part in the sixth embodiment. The operation of the false sync signal generating part shown in FIG. 40 is essentially the same as shown in FIG. 36, and the first sync signal from the PD 110 is used to cause the comparators a0-a2 and b0-b2 and the counters a0-a2 and b0-b2 to operate so that the first false signal and the second false signal are generated.

According to the optical scanning apparatus of the present disclosure, even when a sync signal generating unit (PD) is arranged only on one side of the opposed scanning sides, based on the sync signal of the sync signal generating unit, a false sync signal for the opposite side of the opposed scanning sides is generated with high precision. Therefore, the above-mentioned errors are corrected and the write start position and the write end position can be corrected with high precision.

The present disclosure is not limited to the specifically disclosed embodiments, and variations and modifications may be made without departing from the scope of the present disclosure.

The present application is based upon and claims the benefit of priority of Japanese Patent Application No. 2011-277161, filed on Dec. 19, 2011, Japanese Patent Application No. 2012-023572, filed on Feb. 7, 2012, and Japanese Patent Application No. 2012-265706, filed on Dec. 4, 2012, the contents of which are incorporated herein by reference in their entirety.

What is claimed is:

1. An optical scanning apparatus, comprising:
a light source;
an optical deflector having a rotary polygon mirror to deflect a light beam from the light source;
a scanning optical system configured to focus the light beam deflected by the optical deflector on a target surface to be scanned;
a sync detecting sensor configured to determine a write start timing on the target surface; and
a processor configured to
measure a time from a reception of the light beam reflected on a first reflective surface, among a plurality of reflective surfaces of the rotary polygon mirror, at the sync detecting sensor to another reception of the light beam reflected again on the first reflective surface at the sync detecting sensor, and
correct detection data of the sync detecting sensor based on the measured time,
wherein the detection data of the sync detecting sensor corresponding to the first reflective surface is corrected using only the light beam reflected on the first reflective surface.

2. The optical scanning apparatus according to claim 1, wherein the processor is configured to determine a different write start timing on a different target surface based on the corrected detection data.

3. The optical scanning apparatus according to claim 2, wherein the processor is configured to determine a first write start timing on a first target surface based on the detection data of the sync detecting sensor, and determine a second write start timing on a second target surface based on the corrected detection data, and
wherein a face of the rotary polygon mirror which deflects the light beam used to determine the first write start timing is same as the face of the rotary polygon mirror which deflects the light beam used to determine the second write start timing.

4. The optical scanning apparatus according to claim 1, wherein the processor is configured to determine the write start timing on the target surface based on the corrected detection data.

5. The optical scanning apparatus according to claim 4, wherein the light source and the sync detecting sensor are mounted on a single substrate.

6. The optical scanning apparatus according to claim 1, wherein the processor is configured to correct the detection data of the sync detecting sensor in accordance with a formula: (the corrected detection data)=(the measured time needed for one revolution of the rotary polygon mirror)/(an average value of history data of the measured time).

7. The optical scanning apparatus according to claim 6, wherein the measured time needed for one revolution of the rotary polygon mirror equals a first measured value obtained during a preceding cycle of the rotary polygon mirror when the first measured value falls within a predetermined range, and wherein the measured time needed for one revolution of the rotary polygon mirror equals a second measured value obtained during a cycle before the preceding cycle of the rotary polygon mirror when the first measured value does not fall within the predetermined range.

8. The optical scanning apparatus according to claim 7, wherein the second measured value falls within the predetermined range.

9. An image forming device comprising:
a photoconductive drum; and
the optical scanning apparatus according to claim 1,
wherein the optical scanning apparatus is arranged to optically scan the photoconductive drum by the light beam.

10. The optical scanning apparatus according to claim 1, further comprising:
a coupling lens that converts the light beam from the light source into a parallel light beam.

11. The optical scanning apparatus according to claim 10, further comprising:
an aperture plate that adjusts a beam diameter of the parallel light beam received from the coupling lens.

12. The optical scanning apparatus according to claim 11, further comprising:
a cylindrical lens that converges the parallel light beam passed through an opening of the aperture plate, wherein
the rotary polygon mirror receives the converged light beam.

13. The optical scanning apparatus according to claim 1, wherein each face of the rotary polygon mirror deflects the light beam at a constant angular velocity.

14. The optical scanning apparatus according to claim 1, wherein the sync detecting sensor is set to a low level when an amount of received light is smaller than a predetermined threshold, and is set to a high level when the amount of received light is larger than the predetermined threshold.

* * * * *